US012308036B2

(12) United States Patent
Villemoes et al.

(10) Patent No.: US 12,308,036 B2
(45) Date of Patent: *May 20, 2025

(54) APPARATUS AND METHOD FOR PROCESSING AN INPUT AUDIO SIGNAL USING CASCADED FILTERBANKS

(71) Applicants: Fraunhofer-Gesellschaft zur Foerderung der angewandten Forschung e.V., Munich (DE); Dolby International AB, Amsterdam Zuid-Oost (NL)

(72) Inventors: Lars Villemoes, Jaerfaella (SE); Per Ekstrand, Saltsjoebaden (SE); Sascha Disch, Fuerth (DE); Frederik Nagel, Nuremberg (DE); Stephan Wilde, Wendelstein (DE)

(73) Assignees: Fraunhofer-Gesellschaft zur Foerderung der angewandten Forschung e.V., Munich (DE); Dolby International AB, Amsterdam Zuid-Oost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,158

(22) Filed: Dec. 27, 2023

(65) Prior Publication Data

US 2024/0135939 A1 Apr. 25, 2024

Related U.S. Application Data

(63) Continuation of application No. 18/048,810, filed on Oct. 21, 2022, now Pat. No. 11,894,002, which is a
(Continued)

(51) Int. Cl.
*G10L 19/008* (2013.01)
*G10L 19/02* (2013.01)
(Continued)

(52) U.S. Cl.
CPC ........ *G10L 19/008* (2013.01); *G10L 19/0204* (2013.01); *G10L 21/038* (2013.01); *G10L 21/04* (2013.01)

(58) Field of Classification Search
CPC . G10L 19/008; G10L 19/0204; G10L 21/038; G10L 21/00; G10L 21/04
See application file for complete search history.

(56) References Cited

U.S. PATENT DOCUMENTS 5,455,888 A 10/1995 Iyengar et al.
6,549,884 B1 4/2003 Laroche et al.
(Continued)

FOREIGN PATENT DOCUMENTS

CN 1511312 A 7/2004
CN 101471072 A 7/2009
(Continued)

OTHER PUBLICATIONS

Nagel, F et al., "A Harmonic Bandwidth Extension Method for Audio Codecs", ICASSP International Conference on Acoustics, Speech and Signal Processing. IEEE CNF. Taipei, Taiwan, Apr. 2009, 145-148 (Year: 2009) (Year: 2009).*
(Continued)

*Primary Examiner* — Angela A Armstrong
(74) *Attorney, Agent, or Firm* — Perkins Coie LLP; Michael A. Glenn

(57) ABSTRACT

An apparatus for processing an input audio signal relies on a cascade of filterbanks, the cascade having a synthesis filterbank for synthesizing an audio intermediate signal from the input audio signal, the input audio signal being represented by a plurality of first subband signals generated by an analysis filterbank, wherein a number of filterbank channels of the synthesis filterbank is smaller than a number of channels of the analysis filterbank. The apparatus further-
(Continued)

more has a further analysis filterbank for generating a plurality of second subband signals from the audio intermediate signal, wherein the further analysis filterbank has a number of channels being different from the number of channels of the synthesis filterbank, so that a sampling rate of a subband signal of the plurality of second subband signals is different from a sampling rate of a first subband signal of the plurality of first subband signals.

7 Claims, 29 Drawing Sheets

Related U.S. Application Data continuation of application No. 16/878,313, filed on May 19, 2020, now Pat. No. 11,495,236, which is a continuation of application No. 16/016,284, filed on Jun. 22, 2018, now Pat. No. 10,770,079, which is a continuation of application No. 15/459,520, filed on Mar. 15, 2017, now Pat. No. 10,032,458, which is a continuation of application No. 13/604,364, filed on Sep. 5, 2012, now Pat. No. 9,792,915, which is a continuation of application No. PCT/EP2011/053315, filed on Mar. 4, 2011.

(60) Provisional application No. 61/312,127, filed on Mar. 9, 2010.

(51) Int. Cl.
*G10L 21/038* (2013.01)
*G10L 21/04* (2013.01)

(56) References Cited

U.S. PATENT DOCUMENTS

| | | | | |
|---|---|---|---|---|
| 6,766,300 | B1 | 7/2004 | Laroche | |
| 6,895,375 | B2 | 5/2005 | Malah et al. | |
| 7,337,108 | B2 | 2/2008 | Florencio et al. | |
| 7,483,758 | B2 | 1/2009 | Liljeryd et al. | |
| 7,680,552 | B2 | 3/2010 | Liljeryd et al. | |
| 7,917,360 | B2 | 3/2011 | Rogers | |
| 8,296,159 | B2 | 10/2012 | Neuendorf et al. | |
| 8,412,365 | B2 | 4/2013 | Liljeryd et al. | |
| 8,543,232 | B2 | 9/2013 | Liljeryd et al. | |
| 9,245,534 | B2 | 1/2016 | Liljeryd et al. | |
| 9,318,127 | B2 | 4/2016 | Disch et al. | |
| 9,792,915 | B2 * | 10/2017 | Villemoes | G10L 21/038 |
| 10,032,458 | B2 * | 7/2018 | Villemoes | G10L 21/038 |
| 10,770,079 | B2 * | 9/2020 | Villemoes | G10L 19/008 |
| 11,495,236 | B2 * | 11/2022 | Villemoes | G10L 19/0204 |
| 11,894,002 | B2 * | 2/2024 | Villemoes | G10L 19/008 |
| 2003/0093279 | A1 | 5/2003 | Malah et al. | |
| 2003/0187663 | A1 | 10/2003 | Truman et al. | |
| 2004/0028244 | A1 | 2/2004 | Tsushima et al. | |
| 2004/0125878 | A1 | 7/2004 | Liljeryd et al. | |
| 2004/0131203 | A1 | 7/2004 | Liljeryd et al. | |
| 2004/0176961 | A1 | 9/2004 | Manu et al. | |
| 2005/0018796 | A1 | 1/2005 | Sande et al. | |
| 2006/0239473 | A1 | 10/2006 | Kjorling et al. | |
| 2007/0071116 | A1 | 3/2007 | Oshikiri | |
| 2007/0078650 | A1 | 4/2007 | Rogers et al. | |
| 2007/0285815 | A1 | 12/2007 | Herre et al. | |
| 2008/0222228 | A1 | 9/2008 | Halle | |
| 2009/0041111 | A1 | 2/2009 | Liljeryd et al. | |
| 2009/0063140 | A1 * | 3/2009 | Villemoes | G10L 19/0204 704/211 |
| 2009/0234646 | A1 | 9/2009 | Kjorling et al. | |
| 2009/0276069 | A1 | 11/2009 | Rogers | |
| 2010/0003543 | A1 | 1/2010 | Zhou | |
| 2010/0085102 | A1 | 4/2010 | Lee et al. | |
| 2010/0114583 | A1 | 5/2010 | Lee et al. | |
| 2010/0211399 | A1 | 8/2010 | Liljeryd et al. | |
| 2011/0004479 | A1 | 1/2011 | Ekstrand et al. | |
| 2011/0054885 | A1 | 3/2011 | Nagel et al. | |
| 2011/0208517 | A1 | 8/2011 | Zopf | |
| 2012/0195442 | A1 | 8/2012 | Villemoes et al. | |
| 2012/0213378 | A1 | 8/2012 | Liljeryd et al. | |
| 2013/0339037 | A1 | 12/2013 | Liljeryd et al. | |

FOREIGN PATENT DOCUMENTS

| | | | |
|---|---|---|---|
| EP | 1940023 | A2 | 7/2008 |
| EP | 2214165 | A2 | 4/2010 |
| JP | S55-107313 | A | 8/1980 |
| JP | 2001521648 | A | 11/2001 |
| JP | 2004-053895 | A | 2/2004 |
| JP | 2004-053940 | A | 2/2004 |
| JP | 2004-206129 | A | 7/2004 |
| JP | 2005-128387 | A | 5/2005 |
| JP | 2005-521907 | A | 7/2005 |
| JP | 2007-017628 | A | 1/2007 |
| JP | 2007-101871 | A | 4/2007 |
| JP | 2009-519491 | A | 5/2009 |
| RU | 2251795 | C2 | 5/2005 |
| TW | 200939211 | A | 9/2009 |
| TW | 201007701 | A | 2/2010 |
| WO | 1998057436 | A2 | 12/1998 |
| WO | 2002084645 | A2 | 10/2002 |
| WO | 2005/040749 | A1 | 5/2005 |
| WO | 2009078681 | A1 | 6/2009 |
| WO | 2009095169 | A1 | 8/2009 |
| WO | 2009112141 | A1 | 9/2009 |
| WO | 2010003543 | A1 | 1/2010 |
| WO | 2010003557 | A1 | 1/2010 |
| WO | 2010069885 | A1 | 6/2010 |
| WO | 2010086461 | A1 | 8/2010 |

OTHER PUBLICATIONS

ISO/IEC JTC 1 Directives, 5th Edition, Version 3.0, Apr. 5, 2007 (Apr. 5, 2007), pp. 1-212, XP055182104 [retrieved on Apr. 10, 2015].

AES, 60 East 42nd Street, Room 2520 New York 10165-2520, USA, (Oct. 28, 2004), XP040372550 [X] 1,15,16 p. 2, col. r, line 19-line 37 figure 1 , N,I.

AES, 60 East 42nd Street, Room 2520 New York 10165-2520, USA, (May 20, 2006), XP040373090 [X] 1, 15,16 section 2.3: "Nonlinear processing" figure 4.

Audio Subgroup: "MPEG Audio CE Methodology", Apr. 25, 2009 (Apr. 25, 2009), XP055182357 [retrieved on Apr. 13, 2015].

Webmaster: "Geneva Meeting—Document Register 93. MPEG meeting; Jul. 26, 2010-Jul. 30, 2010; Geneva; (Motion Picture Expert Group or ISO/IEC JTC1/SC29/WG11)", Jul. 29, 2010 (Jul. 29, 2010), XP055182371, [retrieved on Apr. 13, 2015].

Webmaster: "Guangzhou Meeting—Document Register. 94. MPEG meeting; Oct. 11, 2010-Oct. 15, 2010; Guangzhou; (Motion Picture Expert Group or ISO/IEC JTC1/SC29/WG11)", Jan. 15, 2011 (Jan. 15, 2011), XP055182374, [retrieved on Apr. 13, 2015].

Nagel, Fet al., "A Harmonic Bandwidth Extension Method for Audio Codecs", ICASSP International Conference on Acoustics, Speech and Signal Processing. IEEE CNF. Taipei, Taiwan, Apr. 2009, 145-148 (Year: 2009), 2009.

HoDs:"MPEG 101", International Organization for Standardization, ISO/IEC JTC 1/SC 29/WG11, XP055182379, [retrieved on Apr. 13, 2015]., Jan. 31, 2005 (Jan. 31, 2005), 39 pages.

ISO/IEC 14496-3, 4.6.18.4.2, Synthesis Filterbank, 2005, 220-221.

ISO/IEC 14496-3: 2005 ( E ) section 4.6.8, Joint Coding, 2005, 150-157.

Aarts, R , et al., "A Unified Approach to Low- and High Frequency Bandwidth Extension", In AES 115th Convention. New York, New York, USA., 1-16.

Arora, M , et al., "High Quality Blind Bandwidth Extension of Audio for Portable Player Applications", Presented at the 120th AES Convention. Paris, France, 1-6.

Dietz, Martin , et al., "Spectral Band Replication, a Novel Approach in Audio Coding", Engineering Society Convention 121, Audio Engineering Society Paper 5553—May 10, 2002, pp. 1-8.

(56) References Cited

OTHER PUBLICATIONS

Disch, S , et al., "An Amplitude-and Frequency-Modulation Vocoder for Audio Signal", Proceedings of the 11th International Conference on Digital Audio Effects (DAFx-08). Espoo, Finland., 1-7.
Duxbury, C , et al., "Separation of Transient Information in Musical Audio Using Multiresolution Analysis Techniques", Proceedings of the Cost G-6 Conference on Digital Audio Effects (DAFX-01). Limerick, Ireland., 1-4.
Fielder, L , et al., "Introduction to Dolby Digital Plus, an Enhancement to the Dolby Digital Coding System", Dolby Laboratories, San Francisco, CA, USA; Audio Engineering Society, Convention Paper 6196, Presented at the 117th Convention; San Francisco, CA, USA, pp. 1-29.
Fielder, Louis D., "Introduction to Dolby Digital Plus, an Enhancement to the Dolby Digital Coding System", AES Convention 117; Oct. 2004, AES, 60 East 42nd Street, Room 2520 New York 10165-2520, USA, (Oct. 1, 2004), XP040506945 [X] 1,3,4, 14-16 p. 11, col. I, line 1-line 22 figure 8.
Flanagan, J , et al., "Phase Vocoder", The Bell System Technical Journal, 1493-1509.
Geiser, Bernd , et al., "Bandwidth Extension for Hierarchical Speech and Audio Coding in ITU-T Rec. G.729.1", IEEE Transactions on Audio, Speech and Language Processing, IEEE Service Center, vol. 15, No. 8—Nov. 2007, pp. 2496-2509.
Henn, F , et al., "Spectral Band Replications (SBR) Technology and its Application in Broadcasting", 112th AES Convention. Munich, Germany., 2003.
Herre, J , et al., "MP3 Surround: Efficient and Compatible Coding of Multi-Channel Audio", Presented at the 116th Conv. Aud. Eng. Soc. Berlin, Germany., 14 Pages.
Hsu, H , et al., "Audio Patch Method in MPEG-4 HE-AAC Decoder", Presented at the 117th AES Convention. San Francisco, CA, USA., 1-11.
Huan, Zhou , et al., "Core Experiment on the eSBR module of USAC", 90. MPEG Meeting; Oct. 26, 2009-Oct. 30, 2009; Xian; (Motion Picture Expert Group of ISO/IECT JTC1/SC29/WG11); Oct. 23, 2009.
ISO/IEC 14496-3 , "Information Technology—Coding of Audio-Visual Objects", ISO/IEC 14496-3, Information Technology—Coding of Audio-Visual Objects (Document broken into 7 parts for IDS upload).
ISO/IEC 14496-3 , "Information technology—Coding of audio-visual objects, Part 3 Audio", Proof Reference No. ISO/IEC 14496-3:2009(E), Fourth Edition, 2009, 1416 pp.
Iyengar, V , et al., "International Standard ISO/IEC 14496-3:2001/FPDAM 1: Bandwidth Extension", Speech Bandwidth Extension Method and Apparatus, 405 pages.
Kayhko , "A Robust Wideband Enhancement for Narrowband Speech Signal", Research Report, Helsinki Univ. of Technology, Laboratory of Acoustics and Audio Signal Processing, 75 Pages, 2001, cited in Kallio, Laura, "Artificial Bandwidth Expansion of Narrowband Speech in Mobile Communications Systems", Master's ThesisHelsinki Univ. of Technology, p. 65, Dec. 9, 2002.
Laroche, J , et al., "Improved Phase Vocoder Timescale Modification of Audio", IEEE Trans. Speech and Audio Processing. vol. 7, No. 3., 323-332.
Laroche, J , et al., "Improved Phase Vocoder Time-Scale Modification of Audio", IEEE Transactions on Speech and Audio Processing. vol. 7, No. 3, 323-332.
Laroche, J , et al., "New Phase-Vocoder Techniques for Pitch-Shifting, Harmonizing and Other Exotic Effects", Proc. IEEE Workshop on App. of Signal Proc. to Signal Proc. to Audio and Acous. New Paltz, New York, USA., 91-94.
Larsen, E , et al., "Audio Bandwidth Extension—Application to Psychoacoustics, Signal Processing and Loudspeaker Design", John Wiley & Sons, Ltd., 313 Pages.
Larsen, E , et al., "Efficient High-Frequency Bandwidth Extension of Music and Speech", In AES 112th Convention. Munich, Germany., 1-5.
Makhoul, J , et al., "Spectral Analysis of Speech by Linear Prediction", IEEE Transactions on Audio and Electroacoustics. vol. AU-21, No. 3., 140-148.
Meltzer, S , et al., "SBR enhanced audio codecs for digital broadcasting such as "Digital Radio Mondiale" (DRM)", AES 112th Convention. Munich, Germany, 4 pages.
Nagel, F , et al., "A Harmonic Bandwidth Extension Method for Audio Codecs", ICASSP International Conference on Acoustics, Speech and Signal Processing. IEEE CNF. Taipei, Taiwan, 145-148.
Nagel, F , et al., "A Phase Vocoder Driven Bandwidth", 126th AES Convention. Munich, Germany., 1-8.
Nagel, F. , et al., "A Phase Vocoder Driven Bandwidth Extension Method with Novel Transient Handling for Audio Codecs", XP040508993; Convention Paper 7711; Presented at the 126th Convention; May 7-10, 2006; Munich, Germany, 1-8.
Neuendorf, M , et al., "A Novel Scheme for Low Bitrate Unified Speech and Audio Coding", Presented at the 126th AES Convention. München, Germany., pp. 1-13.
Neuendorf, M , et al., "Unified Speech and Audio Coding Scheme for High Quality at Lowbitrates", ICASSP, 1-4.
Puckette, M , et al., "Phase-locked Vocoder", IEEE ASSP Conference on Applications of Signal Processing to Audio and Acoustics. Mohonk, New York, USA., 4 Pages.
Ravelli, E , et al., "Fast Implementation For Non-Linear Time-Scaling Of Stereo Signals", Proc. of the 8th Int. Conference on Digital Audio Effects (DAFx'05). Madrid, Spain., 1-4.
Robel, A , et al., "A New Approach To Transient Processing In The Phase Vocoder", Proc. of the 6th Int. Conference on Digital Audio Effects (DAFX-03). London, UK., 1-6.
Robel, A , et al., "Transient Detection and Preservation in the Phase Vocoder", ICMC '03. Singapore. Link provided: citeseer.ist.psu.edu/679246.html, 247-250.
Zhong, Haishan , et al., "Finalization of CE on QMF based harmonic transposer", 94. MPEG Meeting; Nov. 10, 2010-Oct. 15, 2010; Guangzhou; (Motion Picture Expert Group or ISO/IEC JTC1/SC29/WG11); Oct. 28, 2010, pp. 1-17.
Zhou, Huan , et al., "Finalization of CE on QMF based harmonic transposer", 93. MPEG Meeting; Jul. 26, 2010-Jul. 30, 2010; Geneva; (Motion Picture Expert Group of ISO/IEC JTC1/SC29/WG11), Jul. 22, 2010, pp. 1-19.
Ziegler, T , et al., "Enhancing mp3 with SBR: Features and Capabilities of the new mp3PRO Algorithm", Presented in the 112th AES Convention. Munich, Germany., 1-7.

* cited by examiner

| | Ex. | GEN. | S.R. | Ex. |
|---|---|---|---|---|
| M | 32 | big | $f_s/M$ | $f_s/32$ |
| $M_S$ | 12 | small | | |
| $M_A$ | 24 | medi-um | $f_s \cdot \frac{M_S}{M \cdot M_A}$ | $f_s/64$ |
| R | 64 | very large | | |

4.6.18.4.1 Analysis filterbank

A QMF bank is used to split the time domain signal output from the core decoder into 32 subband signals. The output from the filterbank, i.e. the subband samples, are complex-valued and thus oversampled by a factor two compared to a regular QMF bank. The flowchart of this operation is given in Figure 4.41. The filtering involves the following steps, where an array $\mathbf{x}$ consisting of 320 time domain input samples is assumed. A higher index into the array corresponds to older samples.

- Shift the samples in the array $\mathbf{x}$ by 32 positions. The oldest 32 samples are discarded and 32 new samples are stored in positions 0 to 31.
- Multiply the samples of array $\mathbf{x}$ by every other coefficient of window $\mathbf{c}$. The window coefficients can be found in Table 4.A.87.
- Sum the samples according to the formula in the flowchart to create the 64-element array $\mathbf{u}$.
- Calculate 32 new subband samples by the matrix operation $\mathbf{Mu}$, where $$\mathrm{M}(k,n) = 2 \cdot \exp\left(\frac{i \cdot \pi \cdot (k+0.5) \cdot (2 \cdot n - 0.5)}{64}\right), \begin{cases} 0 \le k < 32 \\ 0 \le n < 64 \end{cases}$$

In the equation, exp() denotes the complex exponential function and $i$ is the imaginary unit.

Every loop in the flowchart produces 32 complex-valued subband samples, each representing the output from one filterbank subband. For every SBR frame the filterbank will produce $numTimeSlots \cdot RATE$ subband samples for every subband, corresponding to a time domain signal of length $numTimeSlots \cdot RATE \cdot 32$ samples. In the flowchart $\mathbf{W}$[k][l] corresponds to subband sample l in QMF subband k.

4.6.18.4.2 Synthesis filterbank

Synthesis filtering of the SBR-processed subband signals is achieved using a 64-subband QMF bank. The output from the filterbank is real-valued time domain samples. The process is given by the flowchart inFigure 4.42. The synthesis filtering comprises the following steps, where an array $\mathbf{v}$ consisting of 1280 samples is assumed:

- Shift the samples in the array $\mathbf{v}$ by 128 positions. The oldest 128 samples are discarded.
- The 64 new complex-valued subband samples are multiplied by the matrix $\mathbf{N}$, where $$\mathrm{N}(k,n) = \frac{1}{64} \cdot \exp\left(\frac{i \cdot \pi \cdot (k+0.5) \cdot (2 \cdot n - 255)}{128}\right), \begin{cases} 0 \le k < 64 \\ 0 \le n < 128 \end{cases}$$

In the equation, exp() denotes the complex exponential function and $i$ is the imaginary unit. The real part of the output from this operation is stored in the positions 0 to 127 of array $\mathbf{v}$.
- Extract samples from v according to the flowchart in inFigure 4.42 to create the 640-element array $\mathbf{g}$.
- Multiply the samples of array $\mathbf{g}$ by window $\mathbf{c}$ to produce array $\mathbf{w}$. The window coefficients of $\mathbf{c}$ can be found in Table 4.A.87, and are the same as for the analysis filterbank.
- Calculate 64 new output samples by summation of samples from array w according to the last step in the flowchart of inFigure 4.42

Every SBR frame produces an output of $numTimeSlots \cdot RATE \cdot 64$ time domain samples. In the flowchart of in Figure 4.42 $\mathbf{X}$[k][l] corresponds to subband sample l in the QMF subband k, and every new loop produces 64 time domain samples as output.

FIG. 25A (TAKEN FROM SECTION 4.6.18.4 OF ISO/IEC 14496-3:2005(E))

(CORRESPONDING TO FIG. 4.41 OF ISO/IEC 14496-3:2005(E))

(CORRESPONDING TO FIG. 4.42 OF ISO/IEC 14496-3:2005(E))

APPARATUS AND METHOD FOR PROCESSING AN INPUT AUDIO SIGNAL USING CASCADED FILTERBANKS

CROSS-REFERENCE TO RELATED APPLICATIONS

This application is a continuation of U.S. patent application Ser. No. 18/048,810, filed Oct. 21, 2022, which is a continuation of U.S. patent application Ser. No. 16/878,313, filed May 19, 2020, now U.S. Pat. No. 11,495,236, which is a continuation of U.S. patent application Ser. No. 16/016,284, filed Jun. 22, 2018, now U.S. Pat. No. 10,770,079, which is a continuation of U.S. patent application Ser. No. 15/459,520, filed Mar. 15, 2017, now U.S. Pat. No. 10,032,458, which is a continuation of U.S. patent application Ser. No. 13/604,364, filed Sep. 5, 2012, now U.S. Pat. No. 9,792,915, which is a continuation of International Application No. PCT/EP2011/053315, filed Mar. 4, 2011, which claims priority from U.S. Provisional Application No. 61/312,127, filed Mar. 9, 2010, which are each incorporated herein in its entirety by this reference thereto.

The present invention relates to audio source coding systems which make use of a harmonic transposition method for high frequency reconstruction (HFR), and to digital effect processors, e.g. so-called exciters, where generation of harmonic distortion adds brightness to the processed signal, and to time stretchers, where the duration of a signal is extended while maintaining the spectral content of the original.

BACKGROUND OF THE INVENTION

In PCT WO 98/57436 the concept of transposition was established as a method to recreate a high frequency band from a lower frequency band of an audio signal. A substantial saving in bitrate can be obtained by using this concept in audio coding. In an HFR based audio coding system, a low bandwidth signal is processed by a core waveform coder and the higher frequencies are regenerated using transposition and additional side information of very low bitrate describing the target spectral shape at the decoder side. For low bitrates, where the bandwidth of the core coded signal is narrow, it becomes increasingly important to recreate a high band with perceptually pleasant characteristics. The harmonic transposition defined in PCT WO 98/57436 performs very well for complex musical material in a situation with low crossover frequency. The principle of a harmonic transposition is that a sinusoid with frequency w is mapped to a sinusoid with frequency $T\omega$ where $T>1$ is an integer defining the order of transposition. In contrast to this, a single sideband modulation (SSB) based HFR method maps a sinusoid with frequency $\omega$ to a sinusoid with frequency $\omega+\Delta\omega$ where $\Delta\omega$ is a fixed frequency shift. Given a core signal with low bandwidth, a dissonant ringing artifact can result from SSB transposition.

In order to reach the best possible audio quality, state of the art high quality harmonic HFR methods employ complex modulated filter banks, e.g. a Short Time Fourier Transform (STFT), with high frequency resolution and a high degree of oversampling to reach the needed audio quality. The fine resolution is needed to avoid unwanted intermodulation distortion arising from nonlinear processing of sums of sinusoids. With sufficiently high frequency resolution, i.e. narrow subbands, the high quality methods aim at having a maximum of one sinusoid in each subband. A high degree of oversampling in time is needed to avoid alias type of distortion, and a certain degree of oversampling in frequency is needed to avoid pre-echoes for transient signals. The obvious drawback is that the computational complexity can become high.

Subband block based harmonic transposition is another HFR method used to suppress intermodulation products, in which case a filter bank with coarser frequency resolution and a lower degree of oversampling is employed, e.g. a multichannel QMF bank. In this method, a time block of complex subband samples is processed by a common phase modifier while the superposition of several modified samples forms an output subband sample. This has the net effect of suppressing intermodulation products which would otherwise occur when the input subband signal consists of several sinusoids. Transposition based on block based subband processing has much lower computational complexity than the high quality transposers and reaches almost the same quality for many signals. However, the complexity is still much higher than for the trivial SSB based HFR methods, since a plurality of analysis filter banks, each processing signals of different transposition orders T, are needed in a typical HFR application in order to synthesize the needed bandwidth. Additionally, a common approach is to adapt the sampling rate of the input signals to fit analysis filter banks of a constant size, albeit the filter banks process signals of different transposition orders. Also common is to apply bandpass filters to the input signals in order to obtain output signals, processed from different transposition orders, with non-overlapping power spectral densities.

Storage or transmission of audio signals is often subject to strict bitrate constraints. In the past, coders were forced to drastically reduce the transmitted audio bandwidth when only a very low bitrate was available. Modern audio codecs are nowadays able to code wideband signals by using bandwidth extension (BWE) methods [1-12]. These algorithms rely on a parametric representation of the high-frequency content (HF) which is generated from the low-frequency part (LF) of the decoded signal by means of transposition into the HF spectral region ("patching") and application of a parameter driven post processing. The LF part is coded with any audio or speech coder. For example, the bandwidth extension methods described in [1-4] rely on single sideband modulation (SSB), often also termed the "copy-up" method, for generating the multiple HF patches.

Lately, a new algorithm, which employs a bank of phase vocoders [15-17] for the generation of the different patches, has been presented (see FIG. 20). This method has been developed to avoid the auditory roughness which is often observed in signals subjected to SSB bandwidth extension. However, since the BWE algorithm is performed on the decoder side of a codec chain, computational complexity is a serious issue. State-of-the-art methods, especially the phase vocoder based HBE, comes at the prize of a largely increased computational complexity compared to SSB based methods.

As outlined above, existing bandwidth extension schemes apply only one patching method on a given signal block at a time, be it SSB based patching [1-4] or HBE vocoder based patching [15-17]. Additionally, modern audio coders [19-20] offer the possibility of switching the patching method globally on a time block basis between alternative patching schemes.

SSB copy-up patching introduces unwanted roughness into the audio signal, but is computationally simple and preserves the time envelope of transients. Moreover, the computational complexity is significantly increased over the computational very simple SSB copy-up method.

SUMMARY

According to an embodiment, an apparatus for processing an input audio signal may have a synthesis filterbank for synthesizing an audio intermediate signal from the input audio signal, the input audio signal being represented by a plurality of first subband signals generated by an analysis filterbank, wherein a number of filterbank channels of the synthesis filterbank is smaller than a number of channels of the analysis filterbank; and a further analysis filterbank for generating a plurality of second subband signals from the audio intermediate signal, wherein the further analysis filterbank has a number of channels being different from the number of channels of the synthesis filterbank, so that a sampling rate of a subband signal of the plurality of second subband signals is different from a sampling rate of a first subband signal of the plurality of first subband signals.

According to another embodiment, an apparatus for processing an input audio signal may have an analysis filterbank having a number of analysis filterbank channels, wherein the analysis filterbank is configured for filtering the input audio signal to acquire a plurality of first subband signals; and a synthesis filterbank for synthesizing an audio intermediate signal using a group of first subband signals, where the group has a smaller number of subband signals than the number of filterbank channels of the analysis filterbank, wherein the intermediate audio signal is sub-sampled representation of a bandwidth portion of the input audio signal.

According to another embodiment, a method of processing an input audio signal may have the steps of synthesis filtering using a synthesis filterbank for synthesizing an audio intermediate signal from the input audio signal, the input audio signal being represented by a plurality of first subband signals generated by an analysis filterbank, wherein a number of filterbank channels of the synthesis filterbank is smaller than a number of channels of the analysis filterbank; and analysis filtering using a further analysis filterbank for generating a plurality of second subband signals from the audio intermediate signal, wherein the further analysis filterbank has a number of channels being different from the number of channels of the synthesis filterbank, so that a sampling rate of a subband signal of the plurality of second subband signals is different from a sampling rate of a first subband signal of the plurality of first subband signals.

According to another embodiment, a method for processing an input audio signal may have the steps of analysis filtering using an analysis filterbank having a number of analysis filterbank channels, wherein the analysis filterbank is configured for filtering the input audio signal to acquire a plurality of first subband signals; and synthesis filtering using a synthesis filterbank for synthesizing an audio intermediate signal using a group of first subband signals, where the group has a smaller number of subband signals than the number of filterbank channels of the analysis filterbank, wherein the intermediate audio signal is sub-sampled representation of a bandwidth portion of the input audio signal.

Another embodiment may provide computer program having a program code for performing, when running on a computer, a method of processing an input audio signal, that may have the steps of synthesis filtering using a synthesis filterbank for synthesizing an audio intermediate signal from the input audio signal, the input audio signal being represented by a plurality of first subband signals generated by an analysis filterbank, wherein a number of filterbank channels of the synthesis filterbank is smaller than a number of channels of the analysis filterbank; and analysis filtering using a further analysis filterbank for generating a plurality of second subband signals from the audio intermediate signal, wherein the further analysis filterbank has a number of channels being different from the number of channels of the synthesis filterbank, so that a sampling rate of a subband signal of the plurality of second subband signals is different from a sampling rate of a first subband signal of the plurality of first subband signals.

Another embodiment may provide a computer program having a program code for performing, when running on a computer, a method for processing an input audio signal, that may have the steps of analysis filtering using an analysis filterbank having a number of analysis filterbank channels, wherein the analysis filterbank is configured for filtering the input audio signal to acquire a plurality of first subband signals; and synthesis filtering using a synthesis filterbank for synthesizing an audio intermediate signal using a group of first subband signals, where the group has a smaller number of subband signals than the number of filterbank channels of the analysis filterbank, wherein the intermediate audio signal is sub-sampled representation of a bandwidth portion of the input audio signal.

When it comes to a complexity reduction, sampling rates are of particular importance. This is due to the fact that a high sampling rate means a high complexity and a low sampling rate generally means low complexity due to the reduced number of needed operations. On the other hand, however, the situation in bandwidth extension applications is particularly so that the sampling rate of the core coder output signal will typically be so low that this sampling rate is too low for a full bandwidth signal. Stated differently, when the sampling rate of the decoder output signal is, for example, 2 or 2.5 times the maximum frequency of the core coder output signal, then a bandwidth extension by for example a factor of 2 means that an upsampling operation is needed so that the sampling rate of the bandwidth extended signal is so high that the sampling can "cover" the additionally generated high frequency components.

Additionally, filterbanks such as analysis filterbanks and synthesis filterbanks are responsible for a considerable amount of processing operations. Hence, the size of the filterbanks, i.e. whether the filterbank is a 32 channel filterbank, a 64 channel filterbank or even a filterbank with a higher number of channels will significantly influence the complexity of the audio processing algorithm. Generally, one can say that a high number of filterbank channels needs more processing operations and, therefore, higher complexity than a small number of filterbank channels. In view of this, in bandwidth extension applications and also in other audio processing applications, where different sampling rates are an issue, such as in vocoder-like applications or any other audio effect applications, there is a specific interdependency between complexity and sampling rate or audio bandwidth, which means that operations for up sampling or subband filtering can drastically enhance the complexity without specifically influencing the audio quality in a good sense when the wrong tools or algorithms are chosen for the specific operations.

Embodiments of the present invention rely on a specific cascaded placement of analysis and/or synthesis filterbanks in order to obtain a low complexity resampling without sacrificing audio quality. In an embodiment, an apparatus for processing an input audio signal comprises a synthesis filterbank for synthesizing an audio intermediate signal from the input audio signal, where the input audio signal is represented by a plurality of first subband signals generated by an analysis filterbank placed in processing direction before the synthesis filterbank, wherein a number of filterbank channels of the synthesis filterbank is smaller than a number of channels of the analysis filterbank. The intermediate signal is furthermore processed by a further analysis filterbank for generating a plurality of second subband signals from the audio intermediate signal, wherein the further analysis filterbank has a number of channels being different from the number of channels of the synthesis filterbank so that a sampling rate of a subband signal of the plurality of subband signals is different from a sampling rate of a first subband signal of the plurality of first subband signals generated by the analysis filterbank.

The cascade of a synthesis filterbank and a subsequently connected further analysis filterbank provides a sampling rate conversion and additionally a modulation of the bandwidth portion of the original audio input signal which has been input into the synthesis filterbank to a base band. This time intermediate signal, that has now been extracted from the original input audio signal which can, for example, be the output signal of a core decoder of a bandwidth extension scheme, is now represented advantageously as a critically sampled signal modulated to the base band, and it has been found that this representation, i.e. the resampled output signal, when being processed by a further analysis filterbank to obtain a subband representation allows a low complexity processing of further processing operations which may or may not occur and which can, for example, be bandwidth extension related processing operations such as non-linear subband operations followed by high frequency reconstruction processing and by a merging of the subbands in the final synthesis filterbank.

The present application provides different aspects of apparatuses, methods or computer programs for processing audio signals in the context of bandwidth extension and in the context of other audio applications, which are not related to bandwidth extension. The features of the subsequently described and claimed individual aspects can be partly or fully combined, but can also be used separately from each other, since the individual aspects already provide advantages with respect to perceptual quality, computational complexity and processor/memory resources when implemented in a computer system or micro processor.

Embodiments provide a method to reduce the computational complexity of a subband block based harmonic HFR method by means of efficient filtering and sampling rate conversion of the input signals to the HFR filter bank analysis stages. Further, the bandpass filters applied to the input signals can be shown to be obsolete in a subband block based transposer.

The present embodiments help to reduce the computational complexity of subband block based harmonic transposition by efficiently implementing several orders of subband block based transposition in the framework of a single analysis and synthesis filter bank pair. Depending on the perceptual quality versus computational complexity tradeoff, only a suitable sub-set of orders or all orders of transposition can be performed jointly within a filterbank pair. Furthermore, a combined transposition scheme where only certain transposition orders are calculated directly whereas the remaining bandwidth is filled by replication of available, i.e. previously calculated, transposition orders (e.g. $2^{nd}$ order) and/or the core coded bandwidth. In this case patching can be carried out using every conceivable combination of available source ranges for replication Additionally, embodiments provide a method to improve both high quality harmonic HFR methods as well as subband block based harmonic HFR methods by means of spectral alignment of HFR tools. In particular, increased performance is achieved by aligning the spectral borders of the HFR generated signals to the spectral borders of the envelope adjustment frequency table. Further, the spectral borders of the limiter tool are by the same principle aligned to the spectral borders of the HFR generated signals.

Further embodiments are configured for improving the perceptual quality of transients and at the same time reducing computational complexity by, for example, application of a patching scheme that applies a mixed patching consisting of harmonic patching and copy-up patching.

In specific embodiments, the individual filterbanks of the cascaded filterbank structure are quadrature mirror filterbanks (QMF), which all rely on a lowpass prototype filter or window modulated using a set of modulation frequencies defining the center frequencies of the filterbank channels. Advantageously, all window functions or prototype filters depend on each other in such a way that the filters of the filterbanks with different sizes (filterbank channels) depend on each other as well. Advantageously, the largest filterbank in a cascaded structure of filterbanks comprising, in embodiments, a first analysis filterbank, a subsequently connected filterbank, a further analysis filterbank, and at some later state of processing a final synthesis filter bank, has a window function or prototype filter response having a certain number of window function or prototype filter coefficients. The smaller sized filterbanks are all sub-sampled version of this window function, which means that the window functions for the other filterbanks are sub-sampled versions of the "large" window function. For example, if a filterbank has half the size of the large filterbank, then the window function has half the number of coefficients, and the coefficients of the smaller sized filterbanks are derived by sub-sampling. In this situation, the sub-sampling means that e.g. every second filter coefficient is taken for the smaller filterbank having half the size. However, when there are other relations between the filterbank sizes which are non-integer valued, then a certain kind of interpolation of the window coefficients is performed so that in the end the window of the smaller filterbank is again a sub-sampled version of the window of the larger filterbank.

Embodiments of the present invention are particularly useful in situations where only a portion of the input audio signal is needed for further processing, and this situation particularly occurs in the context of harmonic bandwidth extension. In this context, vocoder-like processing operations are particularly advantageous.

It is an advantage of embodiments that the embodiments provide a lower complexity for a QMF transposer by efficient time and frequency domain operations and an improved audio quality for QMF and DFT based harmonic spectral band replication using spectral alignment.

Embodiments relate to audio source coding systems employing an e.g. subband block based harmonic transposition method for high frequency reconstruction (HFR), and to digital effect processors, e.g. so-called exciters, where generation of harmonic distortion adds brightness to the processed signal, and to time stretchers, where the duration of a signal is extended while maintaining the spectral content of the original. Embodiments provide a method to reduce the computational complexity of a subband block based harmonic HFR method by means of efficient filtering and sampling rate conversion of the input signals prior to the HFR filter bank analysis stages. Further, embodiments show that the conventional bandpass filters applied to the input signals are obsolete in a subband block based HFR system. Additionally, embodiments provide a method to improve both high quality harmonic HFR methods as well as subband block based harmonic HFR methods by means of spectral alignment of HFR tools. In particular, embodiments teach how increased performance is achieved by aligning the spectral borders of the HFR generated signals to the spectral borders of the envelope adjustment frequency table. Further, the spectral borders of the limiter tool are by the same principle aligned to the spectral borders of the HFR generated signals.

BRIEF DESCRIPTION OF THE DRAWINGS

The present invention will now be described by way of illustrative examples, not limiting the scope or spirit of the invention, with reference to the accompanying drawings, in which:

FIG. 25*a* illustrates overviews of certain analysis and synthesis filterbanks of ISO/IEC 54496-3: 2005(E), and particularly an implementation of an analysis filterbank which can be used for the analysis filterbank of FIG. 23 and an implementation of a synthesis filterbank which can be used for the final synthesis filterbank of FIG. 23;

DETAILED DESCRIPTION OF THE INVENTION

The below-described embodiments are merely illustrative and may provide a lower complexity of a QMF transposer by efficient time and frequency domain operations, and improved audio quality of both QMF and DFT based harmonic SBR by spectral alignment. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Figure 23:
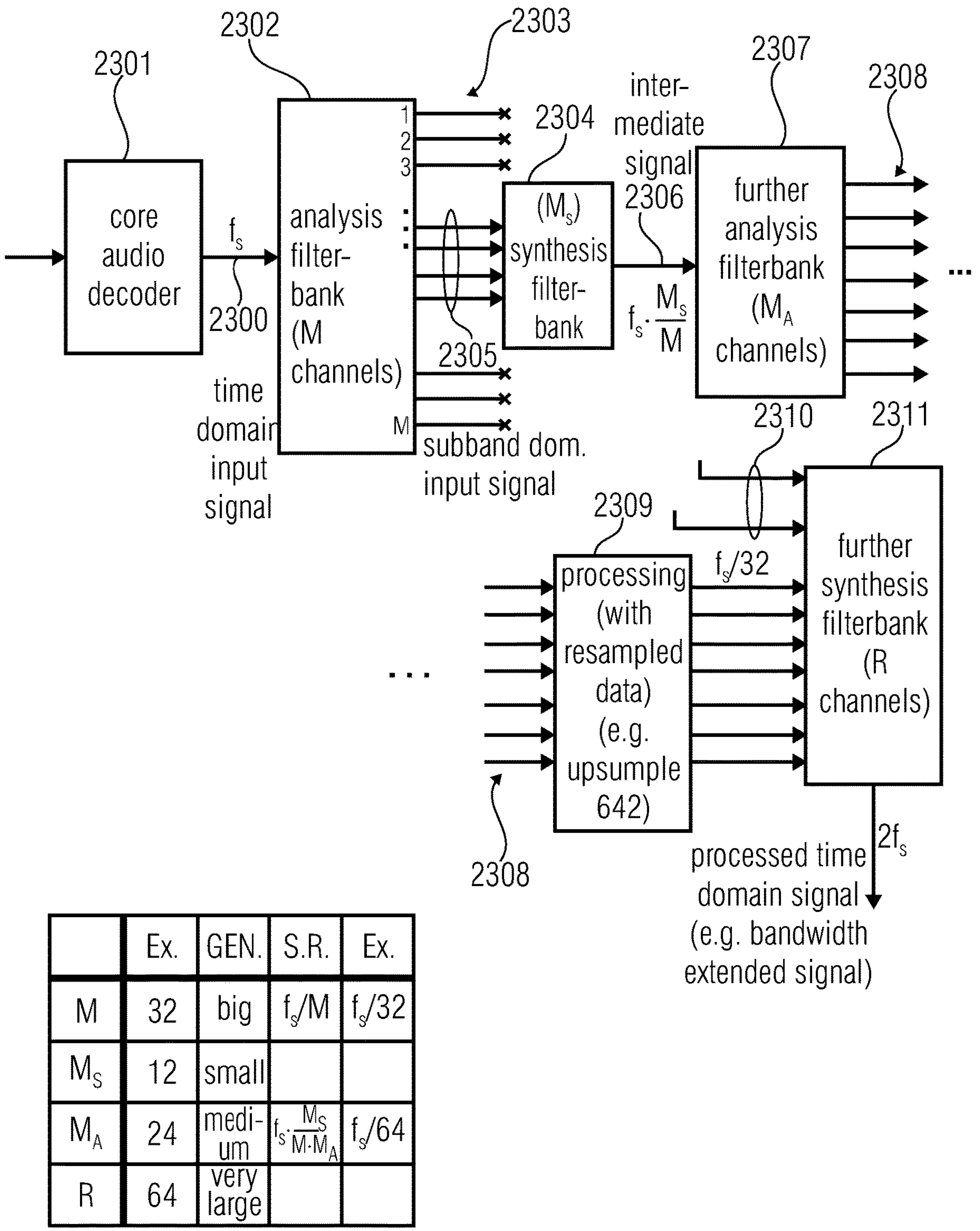
FIG. 23 illustrates an advantageous cascaded structure of analysis and synthesis filterbanks.

FIG. 23 illustrates an advantageous implementation of the apparatus for processing an input audio signal, where the input audio signal can be a time domain input signal on line 2300 output by, for example, a core audio decoder 2301. The input audio signal is input into a first analysis filterbank 2302 which is, for example, an analysis filterbank having M channels. Particularly, the analysis filterbank 2302 therefore outputs M subband signals 2303, which have a sampling rate $f_S=f_S/M$. This means that the analysis filterbank is a critically sampled analysis filterbank. This means that the analysis filterbank 2302 provides, for each block of M input samples on line 2300 a single sample for each subband channel. Advantageously, the analysis filterbank 2302 is a complex modulated filterbank which means that each subband sample has a magnitude and a phase or equivalently a real part and an imaginary part. Hence, the input audio signal on line 2300 is represented by a plurality of first subband signals 2303 which are generated by the analysis filterbank 2302.

A subset of all first subband signals is input into a synthesis filterbank 2304. The synthesis filterbank 2304 has Ms channels, where Ms is smaller than M. Hence, not all the subband signals generated by filterbank 2302 are input into synthesis filterbank 2304, but only a subset, i.e. a certain smaller amount of channels as indicated by 2305. In the FIG. 23 embodiment, the subset 2305 covers a certain intermediate bandwidth, but alternatively, the subset can also cover a bandwidth starting with filterbank channel 1 of the filterbank 2302 until a channel having a channel number smaller than M, or alternatively the subset 2305 can also cover a group of subband signals aligned with the highest channel M and extended to a lower channel having a channel number higher than channel number 1. Alternatively, the channel indexing can be started with zero depending on the actually used notation. Advantageously, however, for bandwidth extension operations a certain intermediate bandwidth represented by the group of subband signals indicated at 2305 is input into the synthesis filterbank 2304.

The other channels not belonging to the group 2305 are not input into the synthesis filterbank 2304. The synthesis filterbank 2304 generates an intermediate audio signal 2306, which has a sampling rate equal to $f_S \cdot M_S/M$. Since $M_S$ is smaller than M, the sampling rate of the intermediate signal 2306 will be smaller than the sampling rate of the input audio signal on line 2300. Therefore, the intermediate signal 2306 represents a downsampled and demodulated signal corresponding to the bandwidth signal represented by subbands 2305, where the signal is demodulated to the base band, since the lowest channel of group 2305 is input into channel 1 of the $M_S$ synthesis filterbank and the highest channel of block 2305 is input into the highest input of block 2304, apart from some zero padding operations for the lowest or the highest channel in order to avoid aliasing problems at the borders of the subset 2305. The apparatus for processing an input audio signal furthermore comprises a further analysis filterbank 2307 for analyzing the intermediate signal 2306, and the further analysis filterbank has $M_A$ channels, where $M_A$ is different from $M_S$ and advantageously is greater than $M_S$. When $M_A$ is greater than $M_S$, then the sampling rate of the subband signals output by the further analysis filterbank 2307 and indicated at 2308 will be lower than the sampling rate of a subband signal 2303. However, when $M_A$ is lower than $M_S$, then the sampling rate of a subband signal 2308 will be higher than a sampling rate of a subband signal of the plurality of first subband signals 2303.

Therefore, the cascade of filterbanks 2304 and 2307 (and advantageously 2302) provides very efficient and high quality upsampling or downsampling operations or generally a very efficient resampling processing tool. The plurality of second subband signals 2308 are advantageously further processed in a processor 2309 which performs the processing with the data resampled by the cascade of filterbanks 2304, 2307 (and advantageously 2302). Additionally, it is advantageous that block 2309 also performs an upsampling operation for bandwidth extension processing operations so that in the end the subbands output by block 2309 are at the same sampling rate as the subbands output by block 2302. Then, in a bandwidth extension processing application, these subbands are input together with additional subbands indicated at 2310, which are advantageously the low band subbands as, for example, generated by the analysis filterbank 2302 into a synthesis filterbank 2311, which finally provides a processed time domain signal, for example a bandwidth extended signal having a sampling rate $2f_S$. This sampling rate output by the block 2311 is in this embodiment 2 times the sampling rate of the signal on line 2300, and this sampling rate output by block 2311 is large enough so that the additional bandwidth generated by the processing in block 2309 can be represented in the processed time domain signal with high audio quality.

Depending on the certain application of the present invention of cascaded filterbanks, the filterbank 2302 can be in a separate device and an apparatus for processing an input audio signal may only comprise the synthesis filterbank 2304 and the further analysis filterbank 2307. Stated differently, the analysis filterbank 2302 can be distributed separately from a "post"-processor comprising blocks 2304, 2307 and, depending on the implementation, blocks 2309 and 2311, too.

In other embodiments, the application of the present invention implementing cascaded filterbanks can be different in that a certain device comprises the analysis filterbank 2302 and the smaller synthesis filterbank 2304, and the intermediate signal is provided to a different processor distributed by a different distributor or via a different distribution channel. Then, the combination of the analysis filterbank 2302 and the smaller synthesis filterbank 2304 represents a very efficient way of downsampling and at the same time demodulating the bandwidth signal represented by the subset 2305 to the base band. This downsampling and demodulation to the base band has been performed without any loss in audio quality, and particularly without any loss in audio information and therefore is a high quality processing.

The table in FIG. 23 illustrates certain exemplary numbers for the different devices.

Advantageously, the analysis filterbank 2302 has 32 channels, the synthesis filterbank has 12 channels, the further analysis filterbank has 2 times the channels of the synthesis filterbank, such as 24 channels, and the final synthesis filterbank 2311 has 64 channels. Generally stated, the number of channels in the analysis filterbank 2302 is big, the number of channels in the synthesis filterbank 2304 is small, the number of channels in the further analysis filterbank 2307 is medium and the number of channels in the synthesis filterbank 2311 is very large. The sampling rates of the subband signals output by the analysis filterbank 2302 is $f_S/M$. The intermediate signal has a sampling rate $f_S \cdot M_S/M$. The subband channels of the further analysis filterbank indicated at 2308 have a sampling rate of $f_S \cdot M_S/(M \cdot M_A)$, and the synthesis filterbank 2311 provides an output signal having a sampling rate of $2f_S$, when the processing in block 2309 doubles the sampling rate. However, when the processing in block 2309 does not double the sampling rate, then the sampling rate output by the synthesis filterbank will be correspondingly lower. Subsequently, further advantageous embodiments related to the present invention are discussed.

Figure 14:
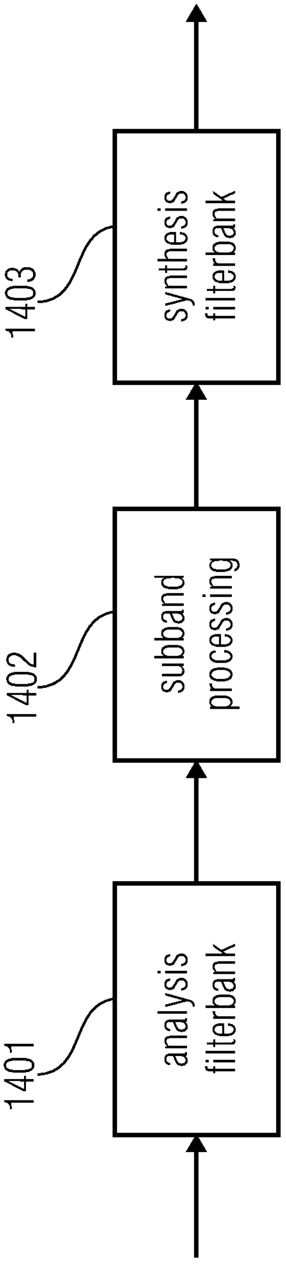
FIG. 14 illustrates the principle of subband block based harmonic transposition.

FIG. 14 illustrates the principle of subband block based transposition. The input time domain signal is fed to an analysis filterbank 1401 which provides a multitude of complex valued subband signals. These are fed to the subband processing unit 1402. The multitude of complex valued output subbands is fed to the synthesis filterbank 1403, which in turn outputs the modified time domain signal. The subband processing unit 1402 performs nonlinear block based subband processing operations such that the modified time domain signal is a transposed version of the input signal corresponding to a transposition order T>1. The notion of a block based subband processing is defined by comprising nonlinear operations on blocks of more than one subband sample at a time, where subsequent blocks are windowed and overlap added to generate the output subband signals.

The filterbanks 1401 and 1403 can be of any complex exponential modulated type such as QMF or a windowed DFT. They can be evenly or oddly stacked in the modulation and can be defined from a wide range of prototype filters or windows. It is important to know the quotient $\Delta f_S/\Delta f_A$ of the following two filter bank parameters, measured in physical units.

$\Delta f_A$: the subband frequency spacing of the analysis filterbank 1401;

$\Delta f_S$: the subband frequency spacing of the synthesis filterbank 1403.

For the configuration of the subband processing 1402 it is needed to find the correspondence between source and target subband indices. It is observed that an input sinusoid of physical frequency Ω will result in a main contribution occurring at input subbands with index $n \approx \Omega/\Delta f_A$. An output sinusoid of the desired transposed physical frequency $T \cdot \Omega$ will result from feeding the synthesis subband with index $m \approx T \cdot \Omega/\Delta f_S$. Hence, the appropriate source subband index values of the subband processing for a given target subband index m is to obey $$n \approx \frac{\Delta f_S}{\Delta f_A} \cdot \frac{1}{T} m. \quad (1)$$

Figure 15:
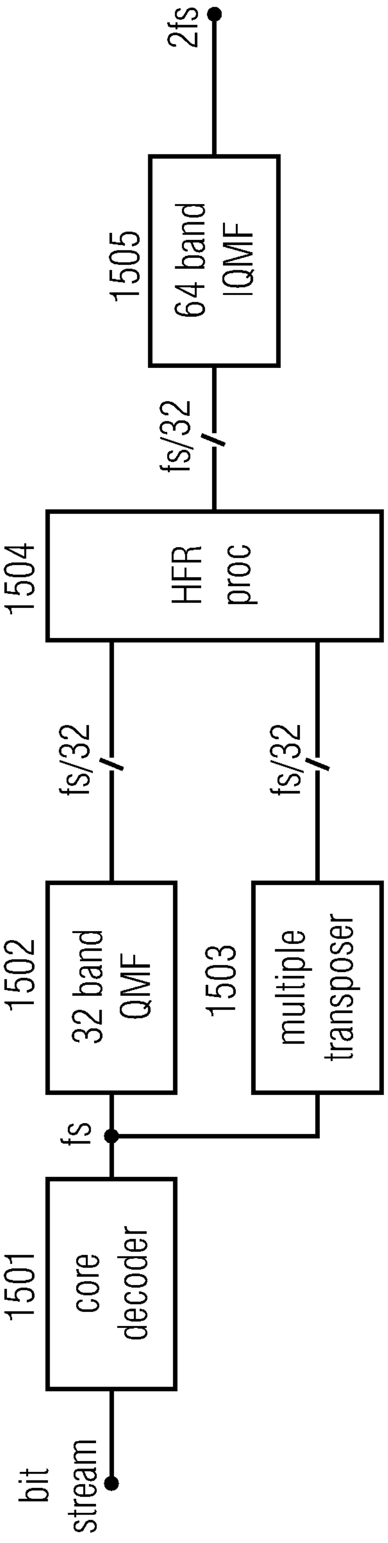
FIG. 15 illustrates an example scenario for the application of subband block based transposition using several orders of transposition in a HFR enhanced audio codec.

FIG. 15 illustrates an example scenario for the application of subband block based transposition using several orders of transposition in a HFR enhanced audio codec. A transmitted bit-stream is received at the core decoder 1501, which provides a low bandwidth decoded core signal at a sampling frequency $f_S$. The low frequency is resampled to the output sampling frequency $2f_S$ by means of a complex modulated 32 band QMF analysis bank 1502 followed by a 64 band QMF synthesis bank (Inverse QMF) 1505. The two filterbanks 1502 and 1505 have the same physical resolution parameters $\Delta f_S = \Delta f_A$ and the HFR processing unit 1504 simply lets through the unmodified lower subbands corresponding to the low bandwidth core signal. The high frequency content of the output signal is obtained by feeding the higher subbands of the 64 band QMF synthesis bank 1505 with the output bands from the multiple transposer unit 1503, subject to spectral shaping and modification performed by the HFR processing unit 1504. The multiple transposer 1503 takes as input the decoded core signal and outputs a multitude of subband signals which represent the 64 QMF band analysis of a superposition or combination of several transposed signal components. The objective is that if the HFR processing is bypassed, each component corresponds to an integer physical transposition of the core signal, (T=2, 3, . . . ).

Figure 16:
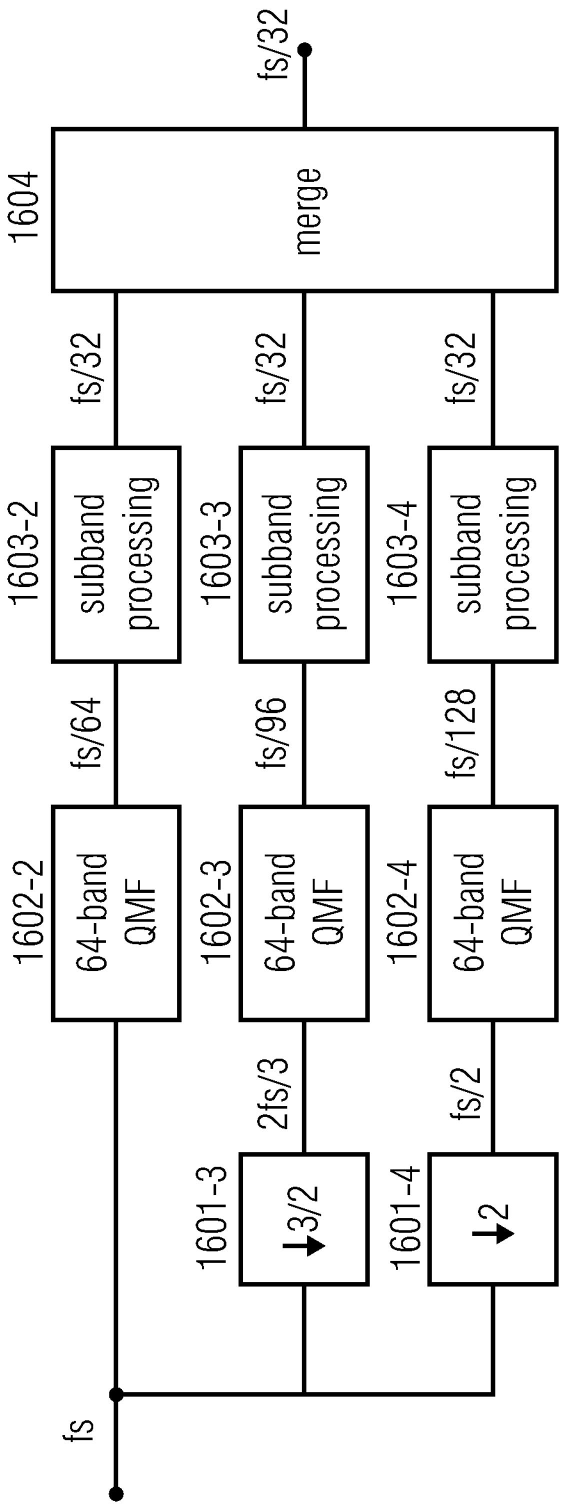
FIG. 16 illustrates a standard example scenario for the operation of a multiple order subband block based transposition applying a separate analysis filter bank per transposition order.

FIG. 16 illustrates a standard example scenario for the operation of a multiple order subband block based transposition 1603 applying a separate analysis filter bank per transposition order. Here three transposition orders T=2,3,4 are to be produced and delivered in the domain of a 64 band QMF operating at output sampling rate 2fs. The merge unit 1604 simply selects and combines the relevant subbands from each transposition factor branch into a single multitude of QMF subbands to be fed into the HFR processing unit.

Consider first the case T=2. The objective is specifically that the processing chain of a 64 band QMF analysis 1602-2, a subband processing unit 1603-2, and a 64 band QMF synthesis 1505 results in a physical transposition of T=2. Identifying these three blocks with 1401, 1402 and 1403 of FIG. 14, one finds that and $\Delta f_S/\Delta f_A=2$ such that (1) results in the specification for 1603-2 that the correspondence between source n and target subbands m is given by n=m.

For the case T=3, the exemplary system includes a sampling rate converter 1601-3 which converts the input sampling rate down by a factor 3/2 from $f_S$ to $2f_S/3$. The objective is specifically that the processing chain of the 64 band QMF analysis 1602-3, the subband processing unit 1603-3, and a 64 band QMF synthesis 1505 results in a physical transposition of T=3. Identifying these three blocks with 1401, 1402 and 1403 of FIG. 14, one finds due to the resampling that $\Delta f_S/\Delta f_A=3$ such that (1) provides the specification for 1603-3 that the correspondence between source n and target subbands m is again given by n=m.

For the case T=4, the exemplary system includes a sampling rate converter 1601-4 which converts the input sampling rate down by a factor two from fs to fs/2. The objective is specifically that the processing chain of the 64 band QMF analysis 1602-4, the subband processing unit 1603-4, and a 64 band QMF synthesis 1505 results in a physical transposition of T=4. Identifying these three blocks with 1401, 1402 and 1403 of FIG. 14, one finds due to the resampling that $\Delta f_S/\Delta f_A=4$ such that (1) provides the specification for 1603-4 that the correspondence between source n and target subbands m is also given by n=m.

Figure 17:
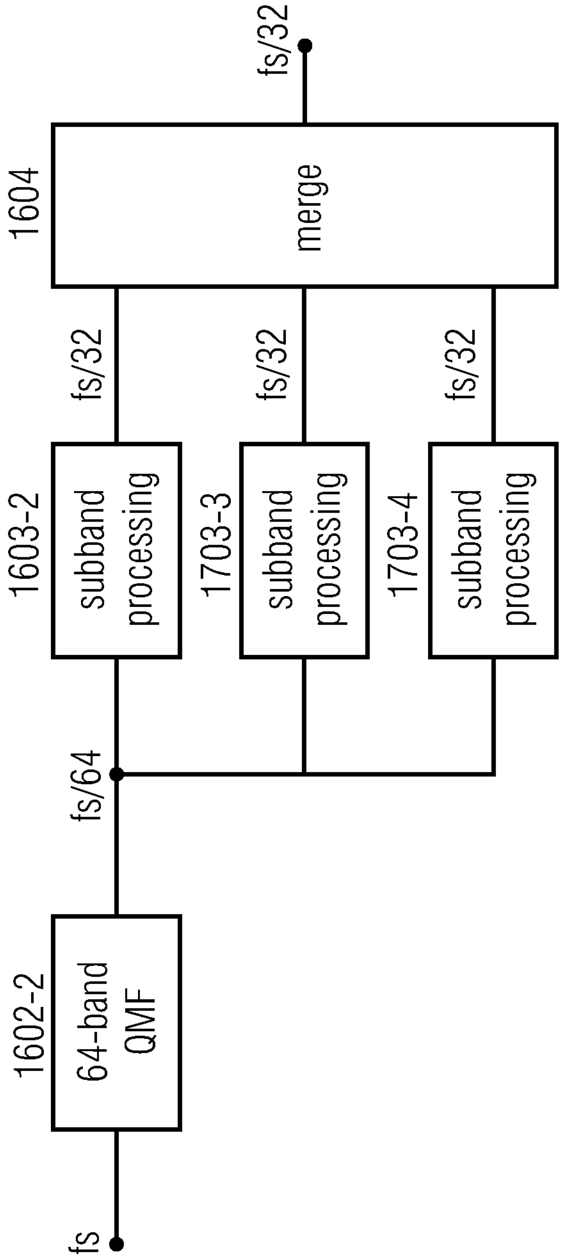
FIG. 17 illustrates an inventive example scenario for the efficient operation of a multiple order subband block based transposition applying a single 64 band QMF analysis filter bank.

FIG. 17 illustrates an inventive example scenario for the efficient operation of a multiple order subband block based transposition applying a single 64 band QMF analysis filter bank. Indeed, the use of three separate QMF analysis banks and two sampling rate converters in FIG. 16 results in a rather high computational complexity, as well as some implementation disadvantages for frame based processing due to the sampling rate conversion 1601-3. The current embodiments teaches to replace the two branches 1601-3→1602-3→1603-3 and 1601-4→1602-4→1603-4 by the subband processing 1703-3 and 1703-4, respectively, whereas the branch 1602-2→1603-2 is kept unchanged compared to FIG. 16. All three orders of transposition will now have to be performed in a filterbank domain with reference to FIG. 14, where $\Delta f_S/\Delta f_A=2$. For the case T=3, the specification for 1703-3 given by (1) is that the correspondence between source n and target subbands m is given by $n \approx 2m/3$. For the case T=4, the specifications for 1703-4 given by (1) is that the correspondence between source n and target subbands m is given by $n \approx 2m$. To further reduce complexity, some transposition orders can be generated by copying already calculated transposition orders or the output of the core decoder.

Figure 1:
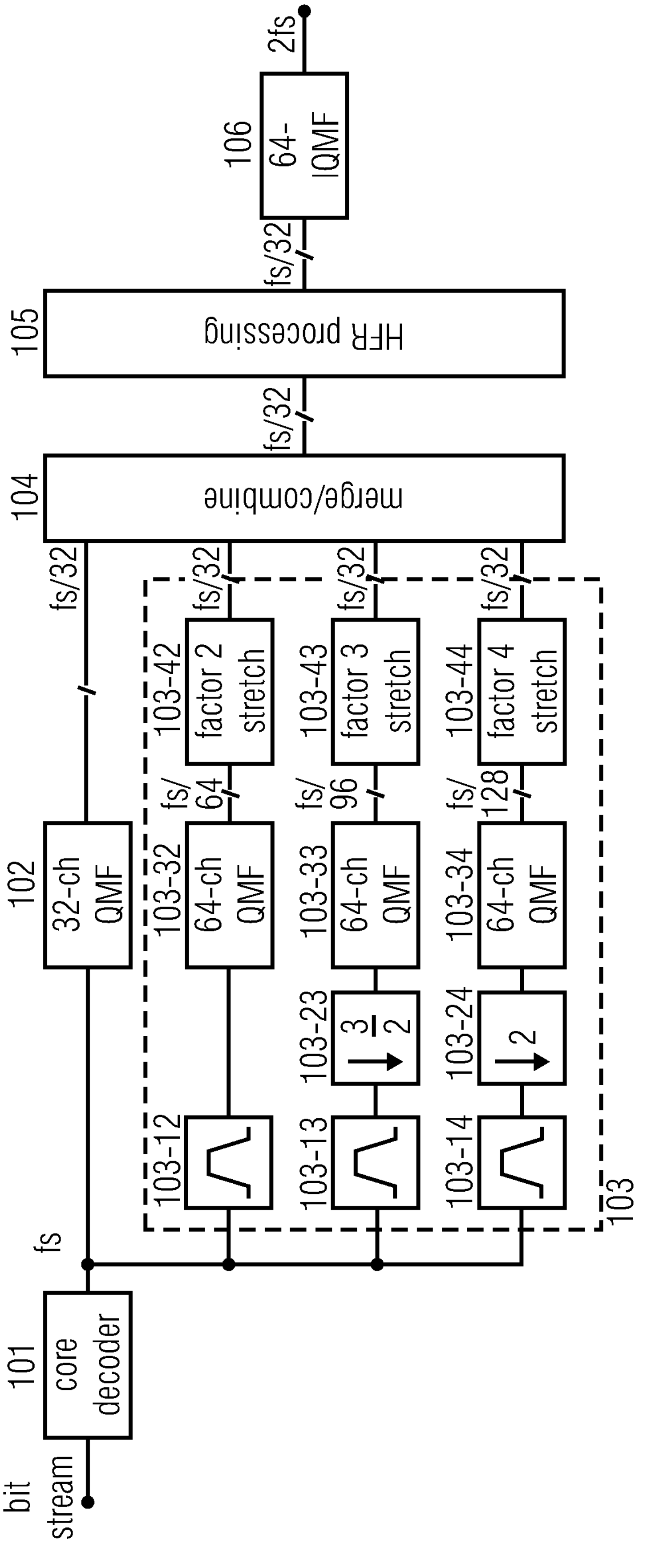
FIG. 1 illustrates the operation of a block based transposer using transposition orders of 2, 3, and 4 in a HFR enhanced decoder framework.

FIG. 1 illustrates the operation of a subband block based transposer using transposition orders of 2, 3, and 4 in a HFR enhanced decoder framework, such as SBR [ISO/IEC 14496-3:2009, "Information technology—Coding of audio-visual objects—Part 3: Audio]. The bitstream is decoded to the time domain by the core decoder 101 and passed to the HFR module 103, which generates a high frequency signal from the base band core signal. After generation, the HFR generated signal is dynamically adjusted to match the original signal as close as possible by means of transmitted side information. This adjustment is performed by the HFR processor 105 on subband signals, obtained from one or several analysis QMF banks. A typical scenario is where the core decoder operates on a time domain signal sampled at half the frequency of the input and output signals, i.e. the HFR decoder module will effectively resample the core signal to twice the sampling frequency. This sample rate conversion is usually obtained by the first step of filtering the core coder signal by means of a 32-band analysis QMF bank 102. The subbands below the so-called crossover frequency, i.e. the lower subset of the 32 subbands that contains the entire core coder signal energy, are combined with the set of subbands that carry the HFR generated signal. Usually, the number of so combined subbands is 64, which, after filtering through the synthesis QMF bank 106, results in a sample rate converted core coder signal combined with the output from the HFR module.

In the subband block based transposer of the HFR module 103, three transposition orders T=2, 3 and 4, are to be produced and delivered in the domain of a 64 band QMF operating at output sampling rate 2fs. The input time domain signal is bandpass filtered in the blocks 103-12, 103-13 and 103-14. This is done in order to make the output signals, processed by the different transposition orders, to have non-overlapping spectral contents. The signals are further downsampled (103-23, 103-24) to adapt the sampling rate of the input signals to fit analysis filter banks of a constant size (in this case 64). It can be noted that the increase of the sampling rate, from fs to 2fs, can be explained by the fact that the sampling rate converters use downsampling factors of T/2 instead of T, in which the latter would result in transposed subband signals having equal sampling rate as the input signal. The downsampled signals are fed to separate HFR analysis filter banks (103-32, 103-33 and 103-34), one for each transposition order, which provide a multitude of complex valued subband signals. These are fed to the non-linear subband stretching units (103-42, 103-43 and 103-44). The multitude of complex valued output subbands are fed to the Merge/Combine module 104 together with the output from the subsampled analysis bank 102. The Merge/Combine unit simply merges the subbands from the core analysis filter bank 102 and each stretching factor branch into a single multitude of QMF subbands to be fed into the HFR processing unit 105.

When the signal spectra from different transposition orders are set to not overlap, i.e. the spectrum of the $T^{th}$ transposition order signal should start where the spectrum from the T−1 order signal ends, the transposed signals need to be of bandpass character. Hence the traditional bandpass filters 103-12-103-14 in FIG. 1. However, through a simple exclusive selection among the available subbands by the Merge/Combine unit 104, the separate bandpass filters are redundant and can be avoided. Instead, the inherent bandpass characteristic provided by the QMF bank is exploited by feeding the different contributions from the transposer branches independently to different subband channels in 104. It also suffices to apply the time stretching only to bands which are combined in 104.

Figure 2:
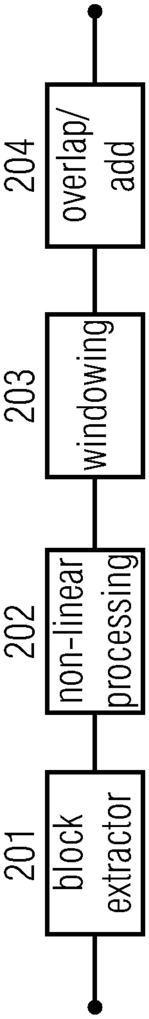
FIG. 2 illustrates the operation of the nonlinear subband stretching units in FIG. 1.

FIG. 2 illustrates the operation of a nonlinear subband stretching unit. The block extractor 201 samples a finite frame of samples from the complex valued input signal. The frame is defined by an input pointer position. This frame undergoes nonlinear processing in 202 and is subsequently windowed by a finite length window in 203. The resulting samples are added to previously output samples in the overlap and add unit 204 where the output frame position is defined by an output pointer position. The input pointer is incremented by a fixed amount and the output pointer is incremented by the subband stretch factor times the same amount. An iteration of this chain of operations will produce an output signal with duration being the subband stretch factor times the input subband signal duration, up to the length of the synthesis window.

While the SSB transposer employed by SBR [ISO/TEC 14496-3:2009, "Information technology—Coding of audio-visual objects—Part 3: Audio] typically exploits the entire base band, excluding the first subband, to generate the high band signal, a harmonic transposer generally uses a smaller part of the core coder spectrum. The amount used, the so-called source range, depends on the transposition order, the bandwidth extension factor, and the rules applied for the combined result, e.g. if the signals generated from different transposition orders are allowed to overlap spectrally or not. As a consequence, just a limited part of the harmonic transposer output spectrum for a given transposition order will actually be used by the HFR processing module 105.

Figure 18:
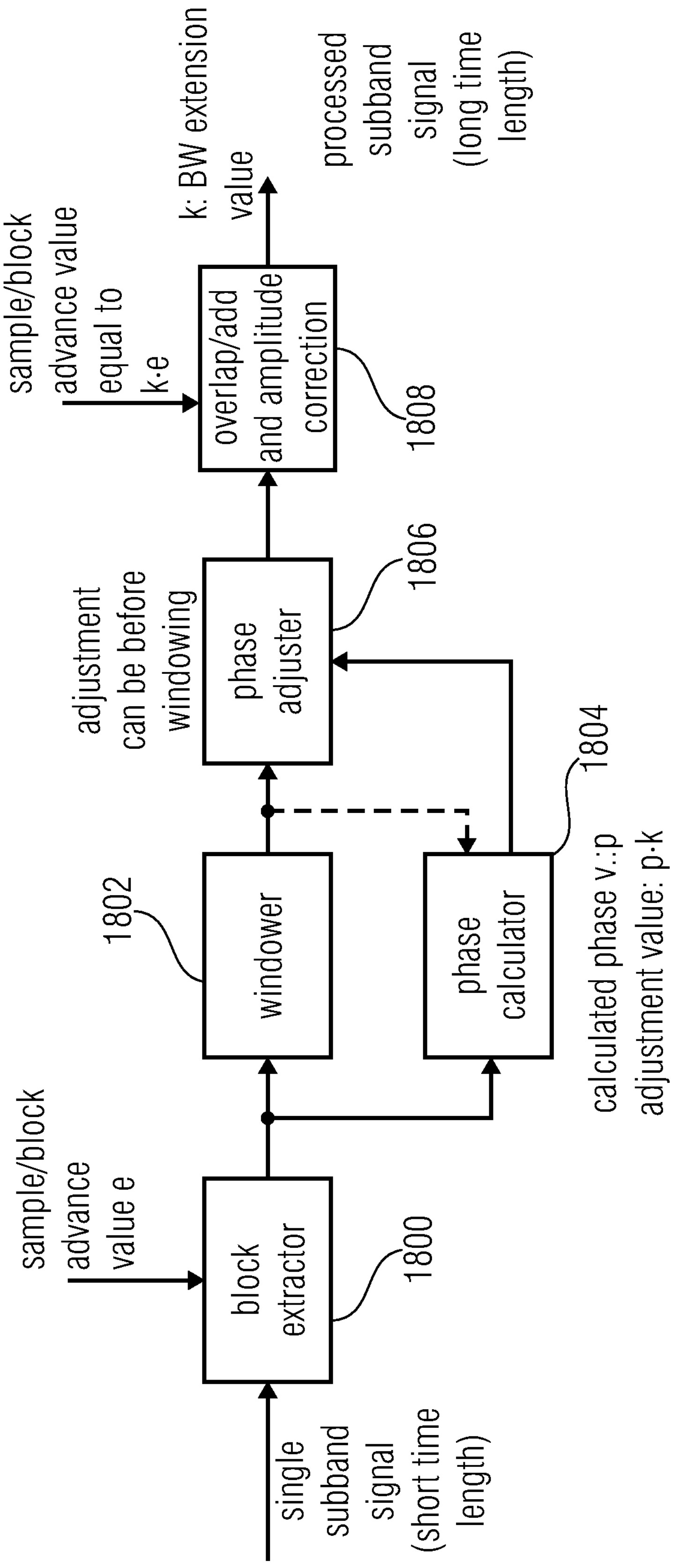
FIG. 18 illustrates another example for forming a subband signal-wise processing.
Figure 19:
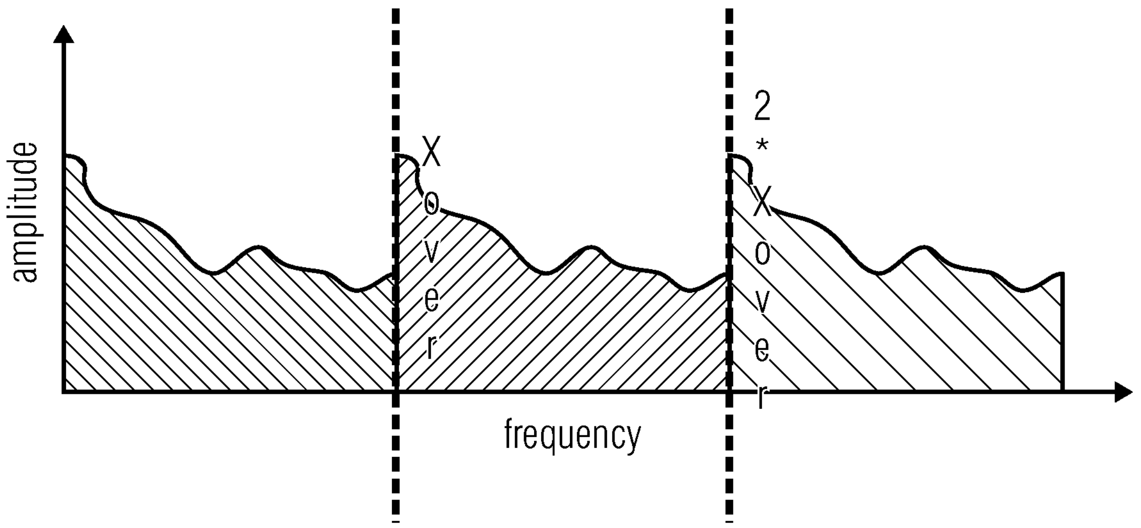
FIG. 19 illustrates a single sideband modulation (SSB) patching.
Figure 20:
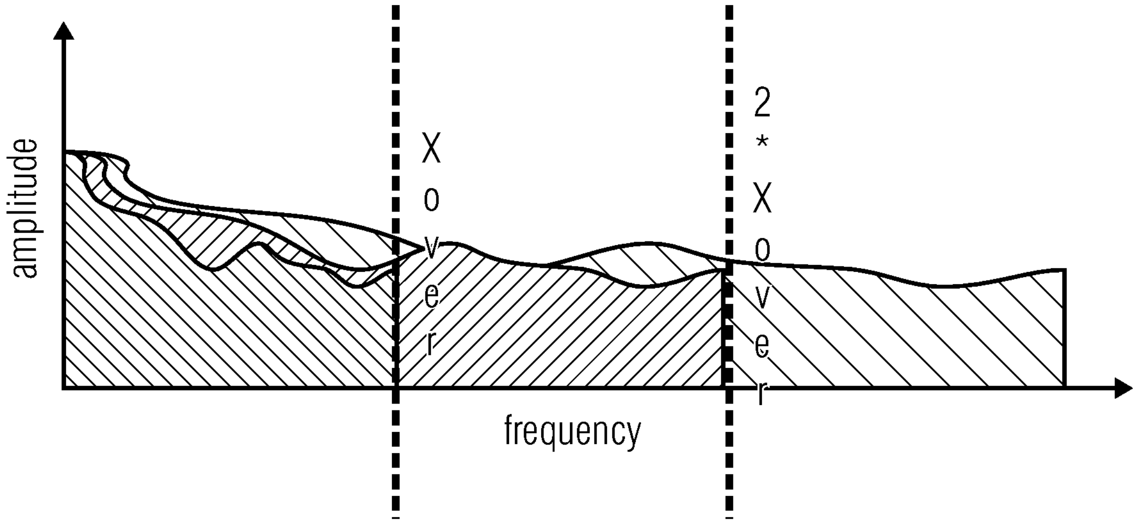
FIG. 20 illustrates a harmonic bandwidth extension (HBE) patching.

FIG. 18 illustrates another embodiment of an exemplary processing implementation for processing a single subband signal. The single subband signal has been subjected to any kind of decimation either before or after being filtered by an analysis filter bank not shown in FIG. 18. Therefore, the time length of the single subband signal is shorter than the time length before forming the decimation. The single subband signal is input into a block extractor 1800, which can be identical to the block extractor 201, but which can also be implemented in a different way. The block extractor 1800 in FIG. 18 operates using a sample/block advance value exemplarily called e. The sample/block advance value can be variable or can be fixedly set and is illustrated in FIG. 18 as an arrow into block extractor box 1800. At the output of the block extractor 1800, there exists a plurality of extracted blocks. These blocks are highly overlapping, since the sample/block advance value e is significantly smaller than the block length of the block extractor. An example is that the block extractor extracts blocks of 12 samples. The first block comprises samples 0 to 11, the second block comprises samples 1 to 12, the third block comprises samples 2 to 13, and so on. In this embodiment, the sample/block advance value e is equal to 1, and there is a 11-fold overlapping.

The individual blocks are input into a windower 1802 for windowing the blocks using a window function for each block. Additionally, a phase calculator 1804 is provided, which calculates a phase for each block. The phase calculator 1804 can either use the individual block before windowing or subsequent to windowing. Then, a phase adjustment value p×k is calculated and input into a phase adjuster 1806. The phase adjuster applies the adjustment value to each sample in the block. Furthermore, the factor k is equal to the bandwidth extension factor. When, for example, the bandwidth extension by a factor 2 is to be obtained, then the phase p calculated for a block extracted by the block extractor 1800 is multiplied by the factor 2 and the adjustment value applied to each sample of the block in the phase adjustor 1806 is p multiplied by 2. This is an exemplary value/rule. Alternatively, the corrected phase for synthesis is k*p, p+(k−1)*p.

So in this example the correction factor is either 2, if multiplied or 1*p if added. Other values/rules can be applied for calculating the phase correction value.

In an embodiment, the single subband signal is a complex subband signal, and the phase of a block can be calculated by a plurality of different ways. One way is to take the sample in the middle or around the middle of the block and to calculate the phase of this complex sample. It is also possible to calculate the phase for every sample.

Although illustrated in FIG. 18 in the way that a phase adjustor operates subsequent to the windower, these two blocks can also be interchanged, so that the phase adjustment is performed to the blocks extracted by the block extractor and a subsequent windowing operation is performed. Since both operations, i.e., windowing and phase adjustment are real-valued or complex-valued multiplications, these two operations can be summarized into a single operation using a complex multiplication factor, which, itself, is the product of a phase adjustment multiplication factor and a windowing factor.

The phase-adjusted blocks are input into an overlap/add and amplitude correction block 1808, where the windowed and phase-adjusted blocks are overlap-added. Importantly, however, the sample/block advance value in block 1808 is different from the value used in the block extractor 1800. Particularly, the sample/block advance value in block 1808 is greater than the value e used in block 1800, so that a time stretching of the signal output by block 1808 is obtained. Thus, the processed subband signal output by block 1808 has a length which is longer than the subband signal input into block 1800. When the bandwidth extension of two is to be obtained, then the sample/block advance value is used, which is two times the corresponding value in block 1800. This results in a time stretching by a factor of two. When, however, other time stretching factors are needed, then other sample/block advance values can be used so that the output of block 1808 has a needed time length.

For addressing the overlap issue, an amplitude correction is advantageously performed in order to address the issue of different overlaps in block 1800 and 1808. This amplitude correction could, however, be also introduced into the windower/phase adjustor multiplication factor, but the amplitude correction can also be performed subsequent to the overlap/processing.

In the above example with a block length of 12 and a sample/block advance value in the block extractor of one, the sample/block advance value for the overlap/add block 1808 would be equal to two, when a bandwidth extension by a factor of two is performed. This would still result in an overlap of five blocks. When a bandwidth extension by a factor of three is to be performed, then the sample/block advance value used by block 1808 would be equal to three, and the overlap would drop to an overlap of three. When a four-fold bandwidth extension is to be performed, then the overlap/add block 1808 would have to use a sample/block advance value of four, which would still result in an overlap of more than two blocks.

Figure 3:
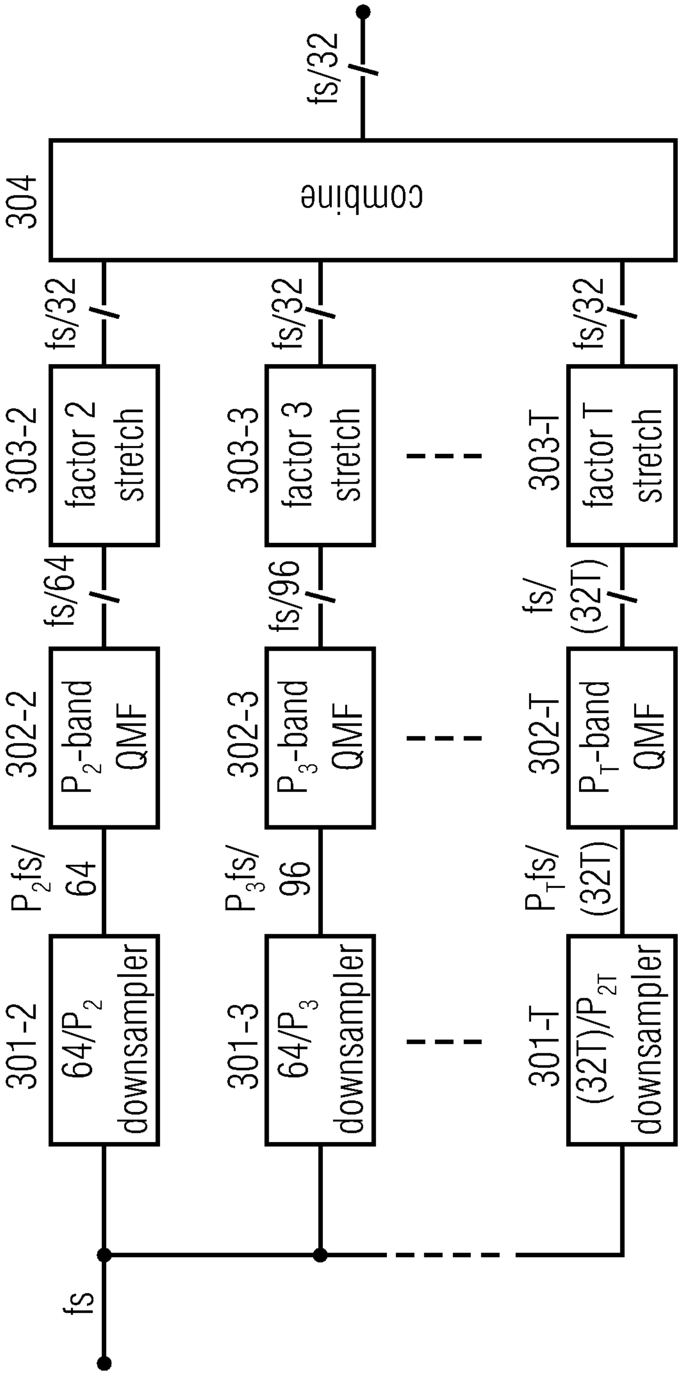
FIG. 3 illustrates an efficient implementation of the block based transposer of FIG. 1, where the resamplers and bandpass filters preceding the HFR analysis filter banks are implemented using multi-rate time domain resamplers and QMF based bandpass filters.

Large computational savings can be achieved by restricting the input signals to the transposer branches to solely contain the source range, and this at a sampling rate adapted to each transposition order. The basic block scheme of such a system for a subband block based HFR generator is illustrated in FIG. 3. The input core coder signal is processed by dedicated downsamplers preceding the HFR analysis filter banks.

The essential effect of each downsampler is to filter out the source range signal and to deliver that to the analysis filter bank at the lowest possible sampling rate. Here, lowest possible refers to the lowest sampling rate that is still suitable for the downstream processing, not necessarily the lowest sampling rate that avoids aliasing after decimation. The sampling rate conversion may be obtained in various manners. Without limiting the scope of the invention, two examples will be given: the first shows the resampling performed by multi-rate time domain processing, and the second illustrates the resampling achieved by means of QMF subband processing.

Figure 4:
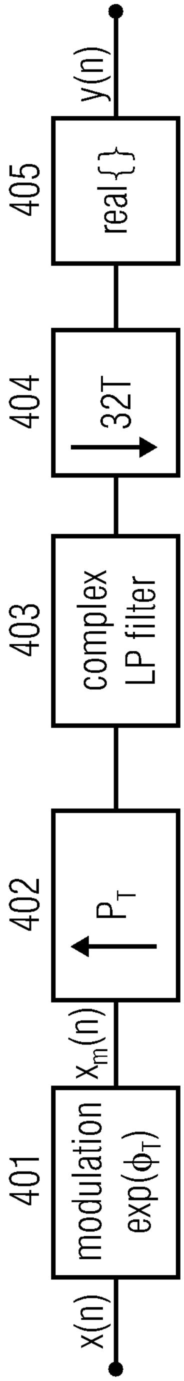
FIG. 4 illustrates an example of building blocks for an efficient implementation of a multi-rate time domain resampler of FIG. 3.
Figure 5A:
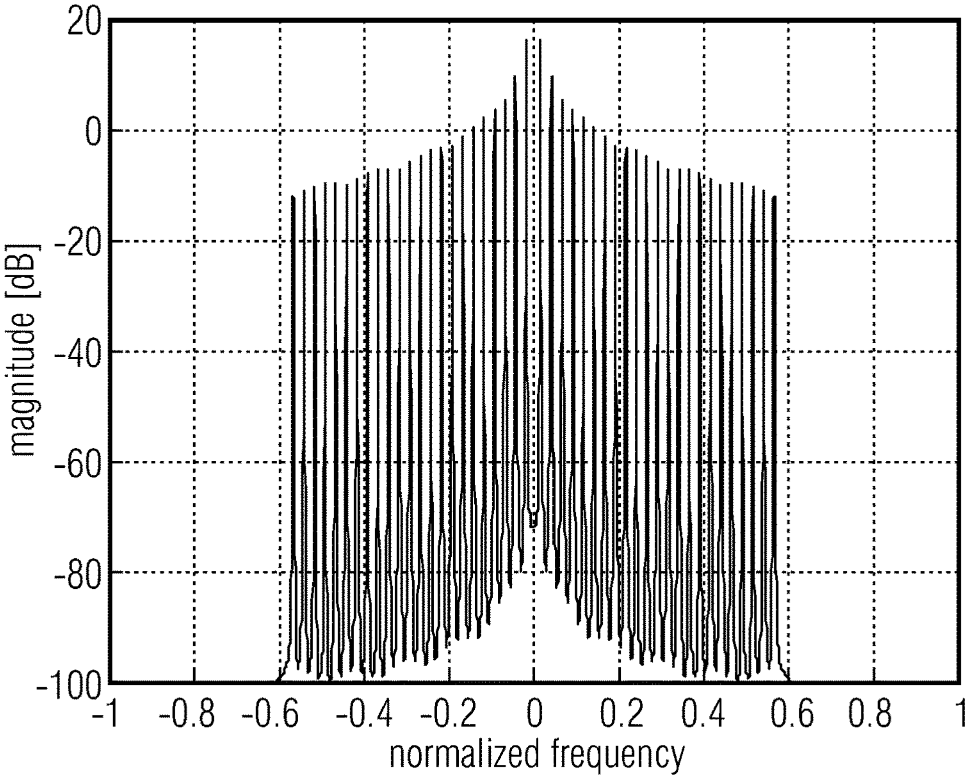
FIGS. 5*a*-5*f* illustrate the effect on an example signal processed by the different blocks of FIG. 4 for a transposition order of 2.
Figure 5B:
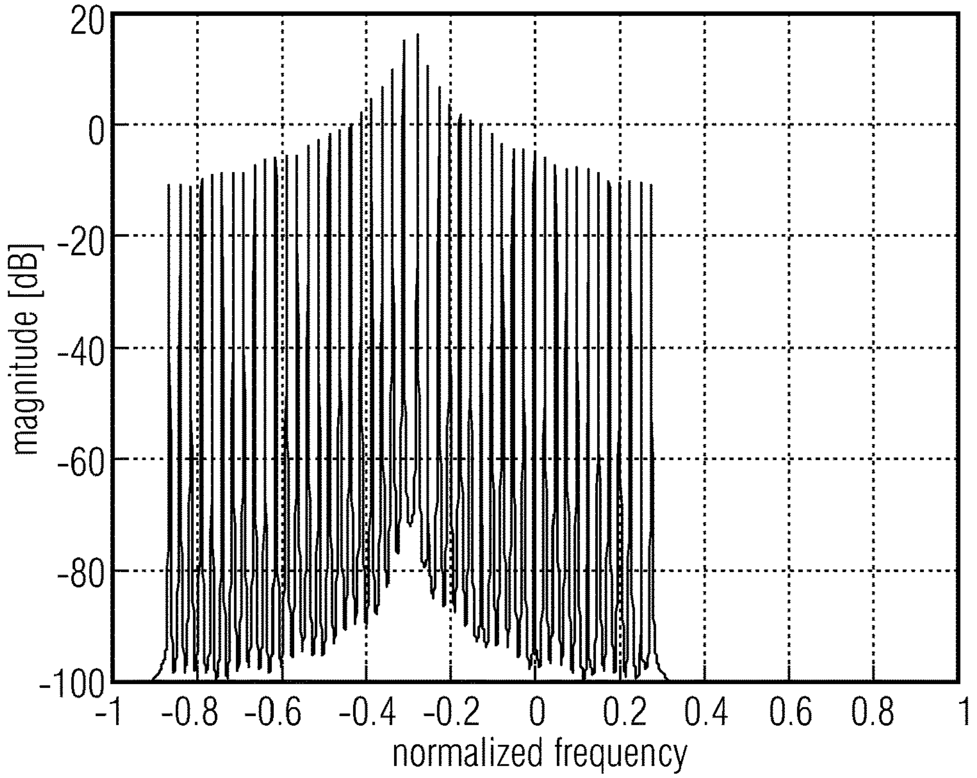
Figure 5C:
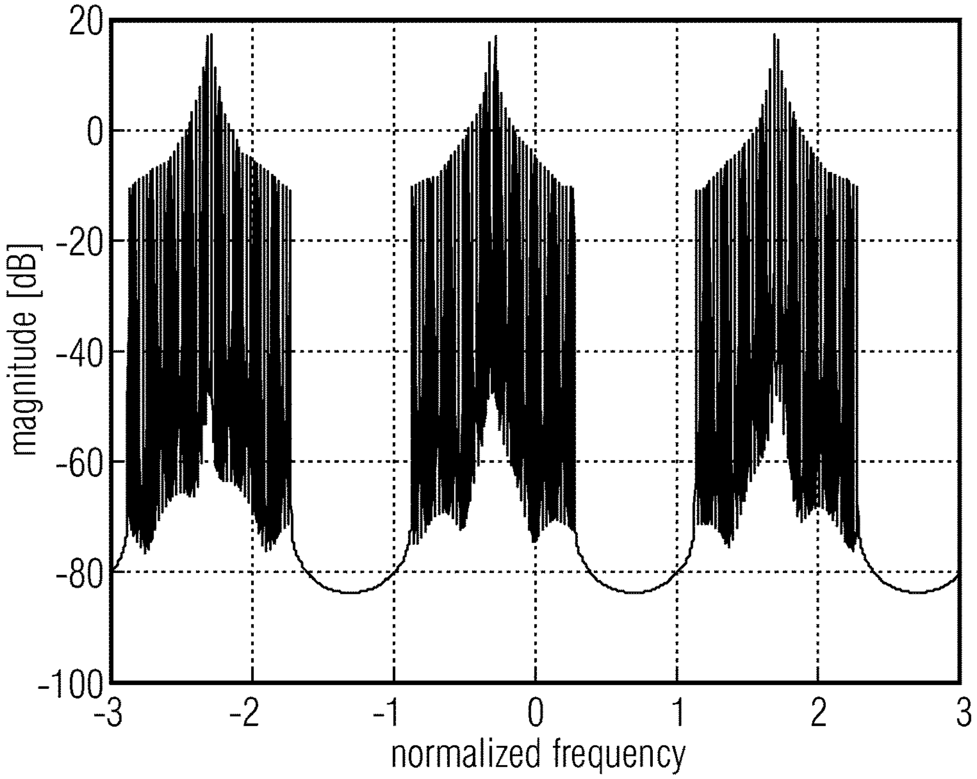
Figure 5D:
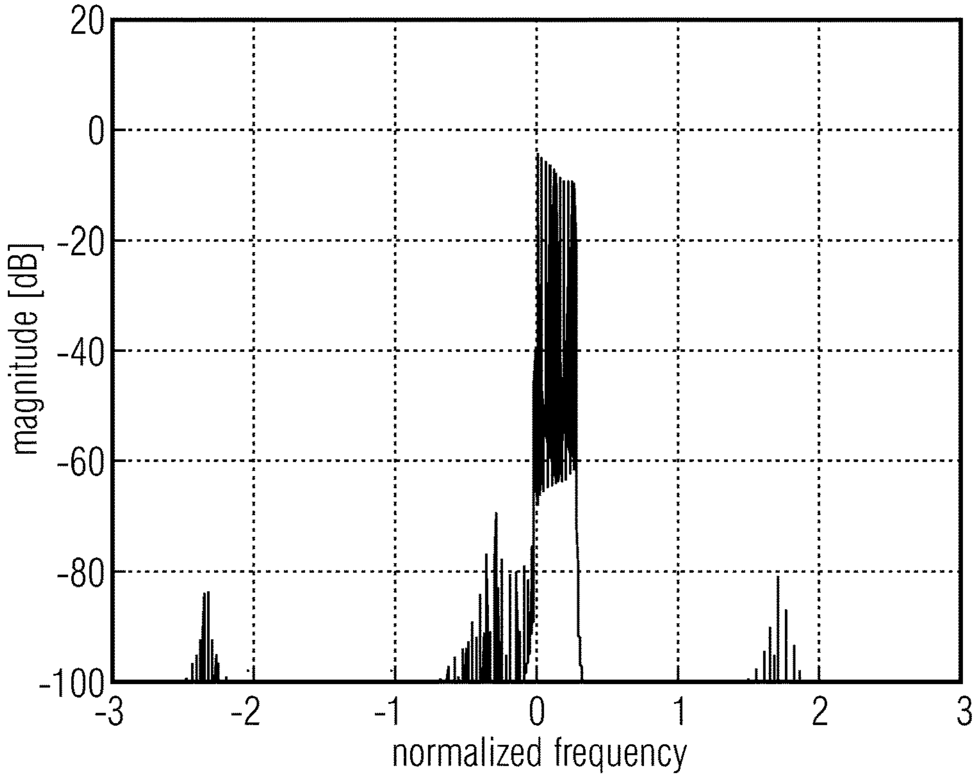
Figure 5E:
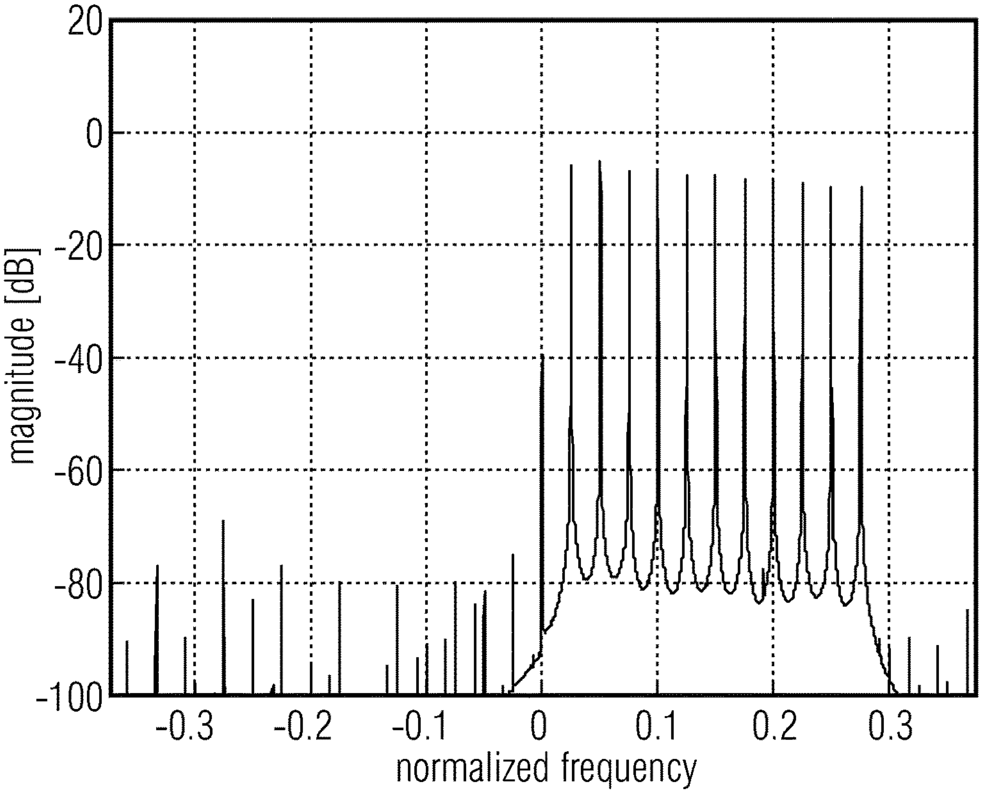
Figure 5F:
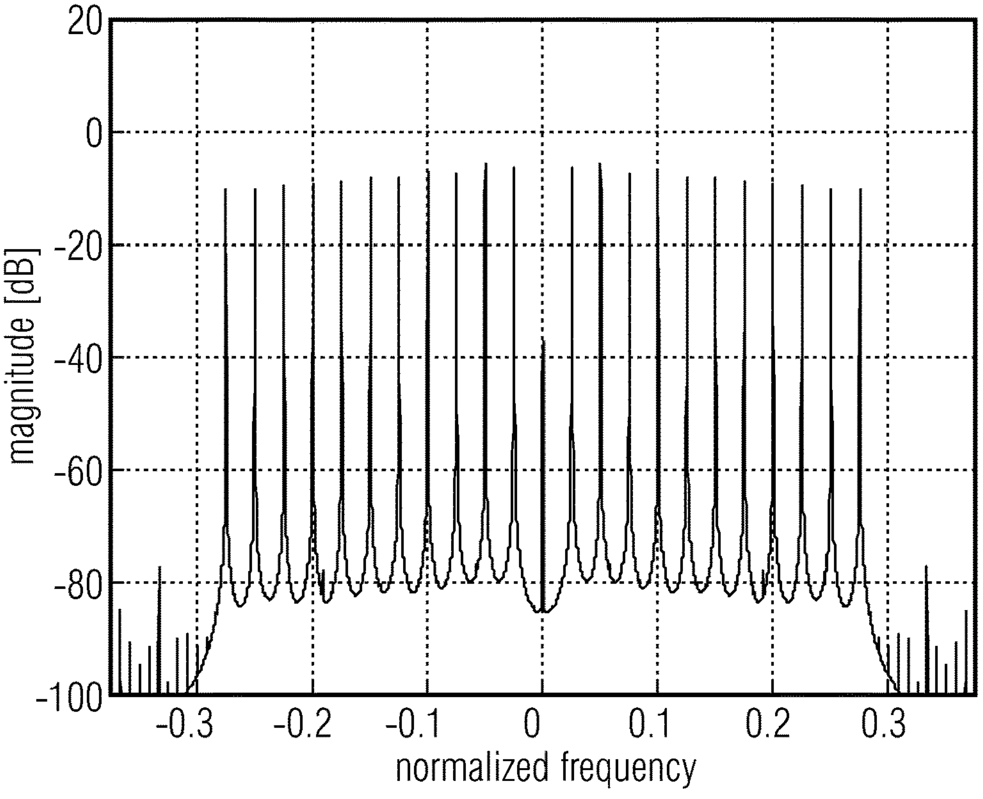

FIG. 4 shows an example of the blocks in a multi-rate time domain downsampler for a transposition order of 2. The input signal, having a bandwidth B Hz, and a sampling frequency $f_s$, is modulated by a complex exponential (401) in order to frequency-shift the start of the source range to DC frequency as $$x_m(n) = x(n) \cdot \exp\left(-i2\pi f_s \frac{B}{2}\right)$$

Examples of an input signal and the spectrum after modulation is depicted in FIGS. 5(*a*) and (*b*). The modulated signal is interpolated (402) and filtered by a complex-valued lowpass filter with passband limits 0 and B/2 Hz (403). The spectra after the respective steps are shown in FIGS. 5(*c*) and (*d*). The filtered signal is subsequently decimated (404) and the real part of the signal is computed (405). The results after these steps are shown in FIGS. 5(*e*) and (*f*). In this particular example, when T=2, B=0.6 (on a normalized scale, i.e. fs=2), $P_2$ is chosen as 24, in order to safely cover the source range. The downsampling factor gets $$\frac{32T}{P_2} = \frac{64}{24} = \frac{8}{3}$$

where the fraction has been reduced by the common factor 8. Hence, the interpolation factor is 3 (as seen from FIG. 5(*c*)) and the decimation factor is 8. By using the Noble Identities ["Multirate Systems And Filter Banks," P. P. Vaidyanathan, 1993, Prentice Hall, Englewood Cliffs], the decimator can be moved all the way to the left, and the interpolator all the way to the right in FIG. 4. In this way, the modulation and filtering are done on the lowest possible sampling rate and computational complexity is further decreased.

Figure 6:
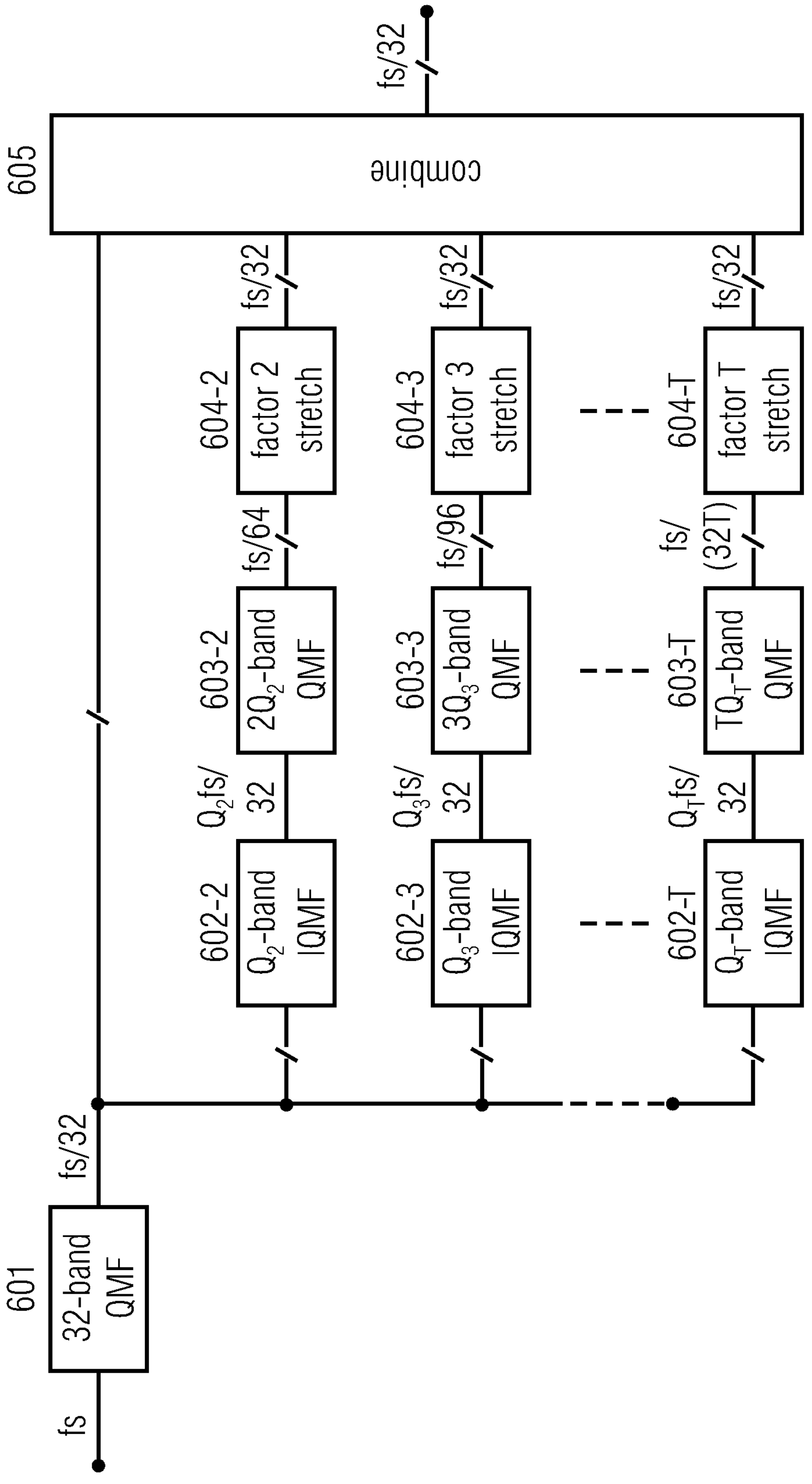
FIG. 6 illustrates an efficient implementation of the block based transposer of FIG. 1, where the resamplers and bandpass filters preceding the HFR analysis filter banks are replaced by small subsampled synthesis filter banks operating on selected subbands from a 32-band analysis filter bank.
Figure 7:
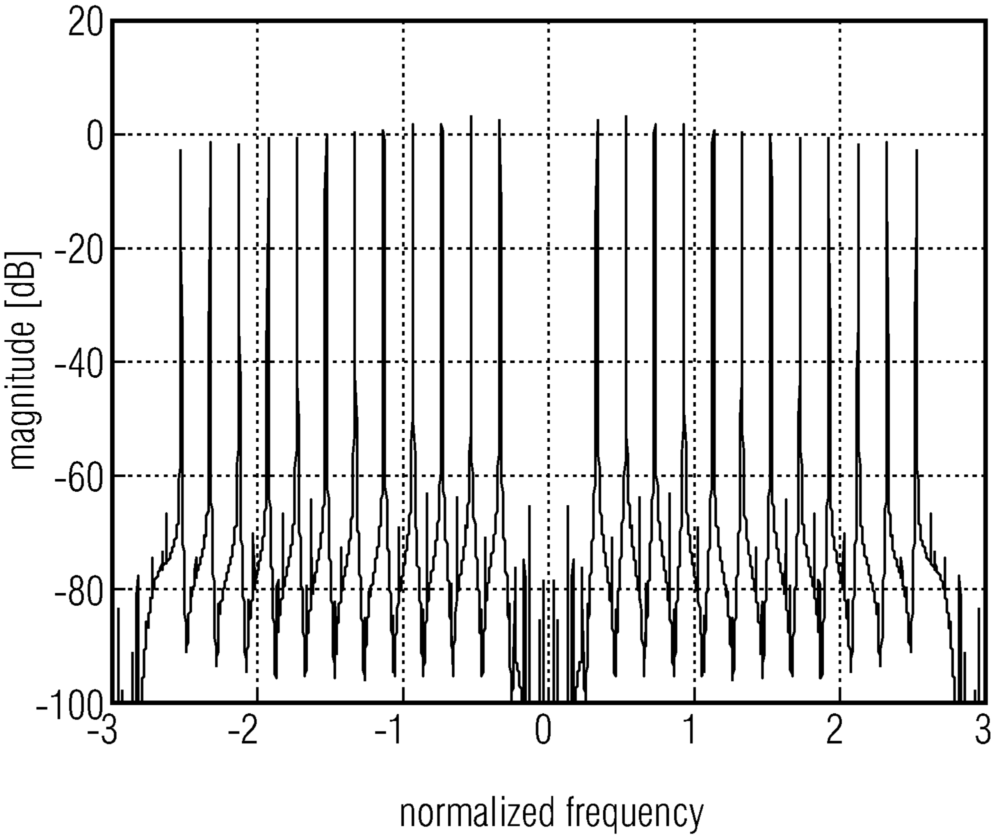
FIG. 7 illustrates the effect on an example signal processed by a subsampled synthesis filter bank of FIG. 6 for a transposition order of 2.
Figure 8A:
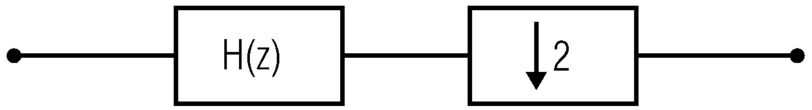
FIGS. 8*a*-8*e* illustrate the implementing blocks of an efficient multi-rate time domain downsampler of a factor 2.
Figure 8B:
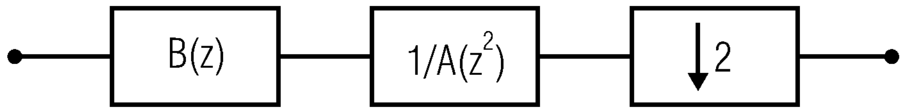
Figure 8C:
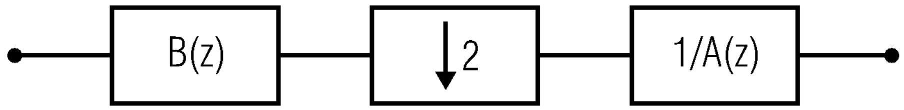
Figure 8D:
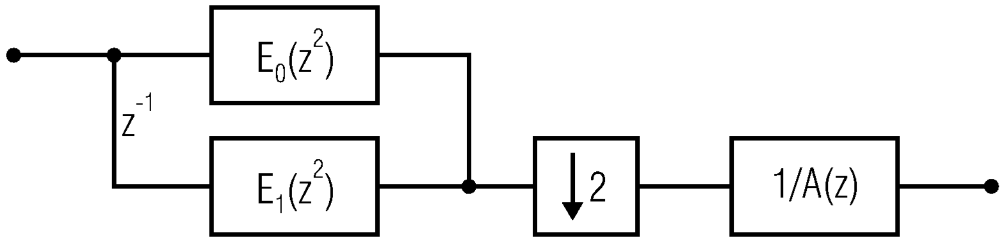
Figure 8E:
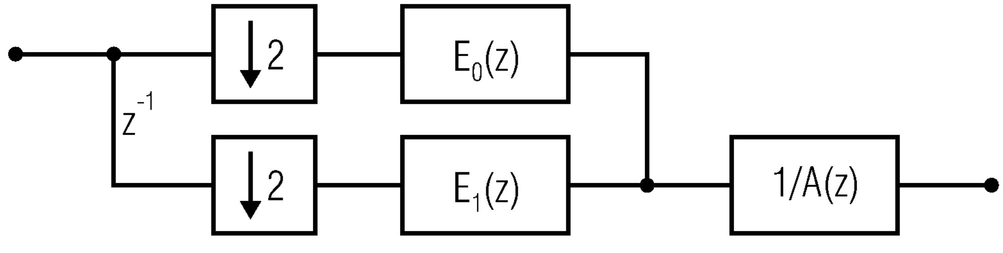
Figure 9A:
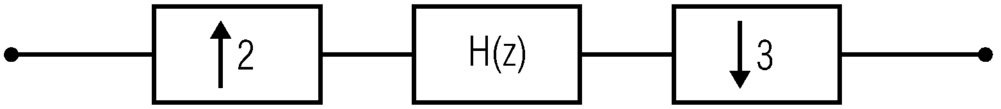
FIGS. 9*a*-9*e* illustrate the implementing blocks of an efficient multi-rate time domain downsampler of a factor 3/2.
Figure 9B:
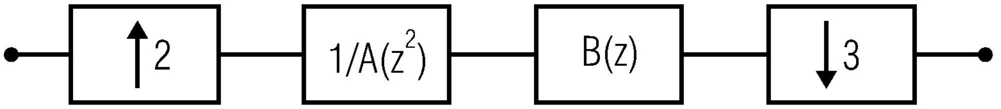
Figure 9C:
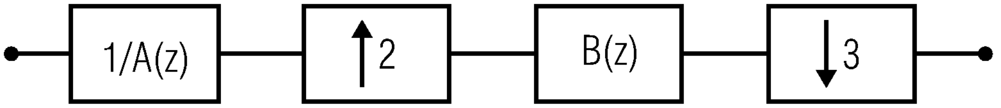
Figure 9D:
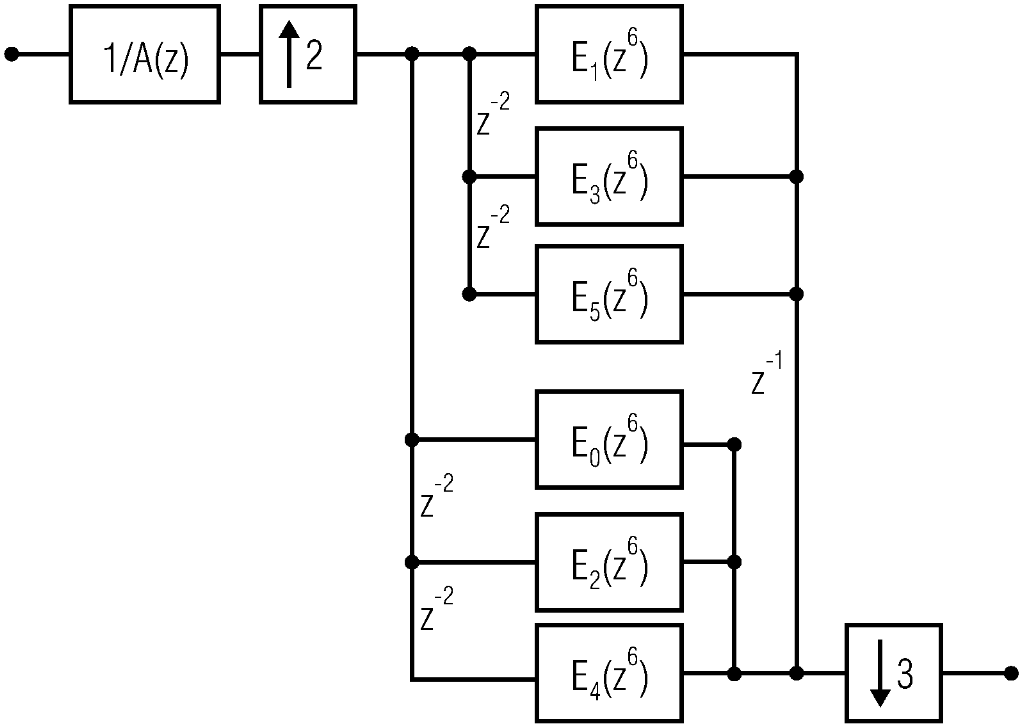
Figure 9E:
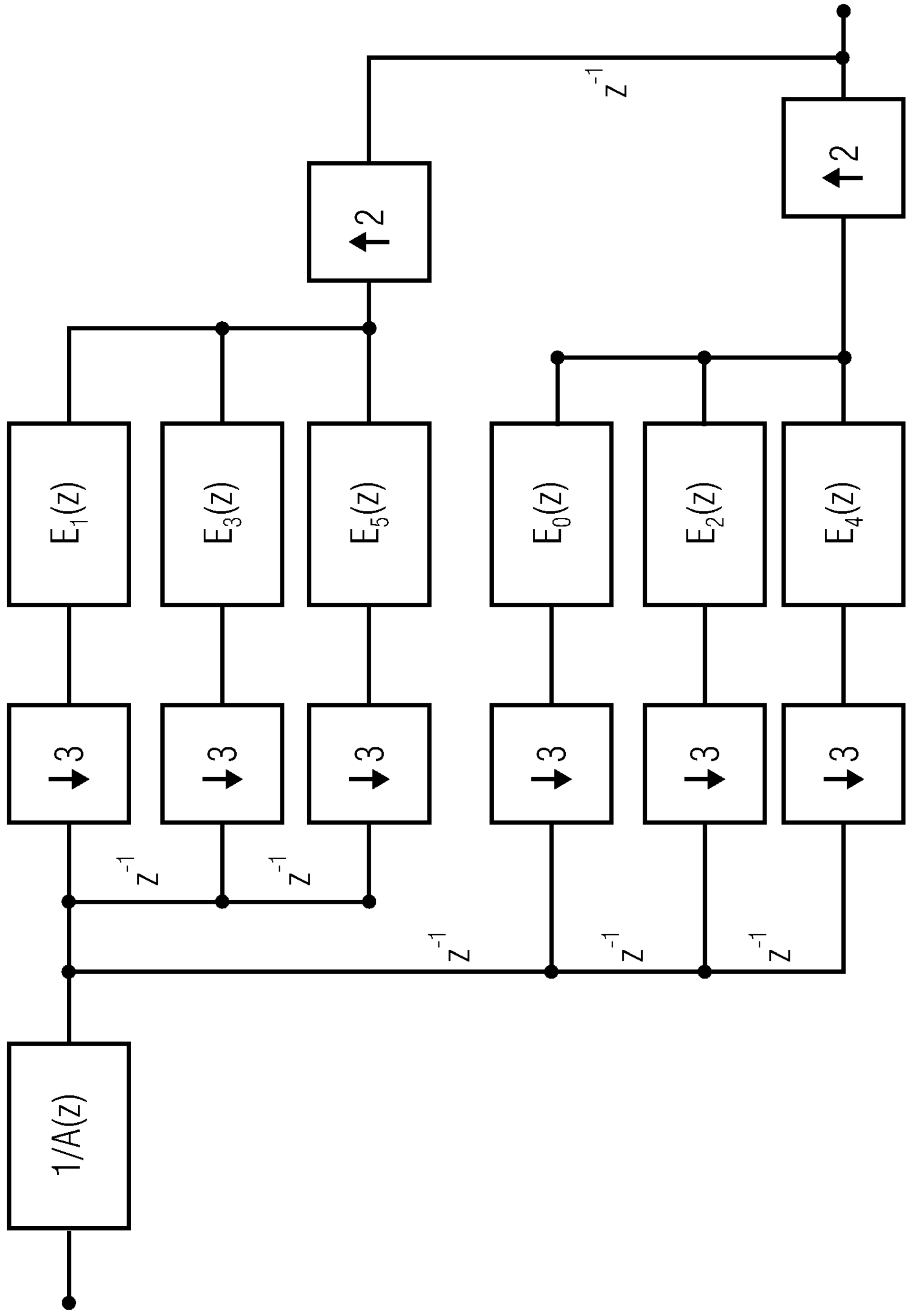

Another approach is to use the subband outputs from the subsampled 32-band analysis QMF bank 102 already present in the SBR HFR method. The subbands covering the source ranges for the different transposer branches are synthesized to the time domain by small subsampled QMF banks preceding the HFR analysis filter banks. This type of HFR system is illustrated in FIG. 6. The small QMF banks are obtained by subsampling the original 64-band QMF bank, where the prototype filter coefficients are found by linear interpolation of the original prototype filter. Following the notation in FIG. 6, the synthesis QMF bank preceding the $2^{nd}$ order transposer branch has $Q_2$=12 bands (the subbands with zero-based indices from 8 to 19 in the 32-band QMF). To prevent aliasing in the synthesis process, the first (index 8) and last (index 19) bands are set to zero. The resulting spectral output is shown in FIG. 7. Note that the block based transposer analysis filter bank has $2Q_2$=24 bands, i.e. the same number of bands as in the multi-rate time domain downsampler based example (FIG. 3).

When FIG. 6 and FIG. 23 are compared, it becomes clear that element 601 of FIG. 6 corresponds to the analysis filterbank 2302 of FIG. 23. Furthermore, the synthesis filterbank 2304 of FIG. 23 corresponds to element 602-2, and the further analysis filterbank 2307 of FIG. 23 corresponds to element 603-2. Block 604-2 corresponds to block 2309 and the combiner 605 may correspond to the synthesis filterbank 2311, but in other embodiments, the combiner can be configured to output subband signals and, then, a further synthesis filterbank connected to the combiner can be used.

However, depending on the implementation, a certain high frequency reconstruction as discussed in the context of FIG. 26 later on can be performed before synthesis filtering by synthesis filterbank 2311 or combiner 205, or can be performed subsequent to synthesis filtering in synthesis filterbank 2311 of FIG. 23 or subsequent to the combiner in block 605 of FIG. 6.

The other branches extending from 602-3 to 604-3 or extending from 602-T to 604-T are not illustrated in FIG. 23, but can be implemented in a similar manner, but with different sizes of filterbanks where T in FIG. 6 corresponds to a transposition factor. However, as discussed in the context of FIGS. 27*a* and 27*b*, the transposition by a transposition factor of 3 and the transposition by a transposition factor of 4 can be introduced into the processing branch consisting of element 602-2 to 604-2 so that block 604-2 does not only provide a transposition by a factor of 2 but also a transposition by a factor of 3 and a factor of 4, together with a certain synthesis filterbank is used as discussed in the context of FIGS. 26 and 27.

In the FIG. 6 embodiment, $Q_2$ corresponds to $M_S$ and $M_S$ is equal to, for example, 12. Furthermore, the size of the further analysis filterbank 603-2 corresponding to element 2307 is equal to $2M_S$ such as 24 in the embodiment.

Furthermore, as outlined before, the lowest subband channel and the highest subband channel of the synthesis filterbank 2304 can be fed with zeroes in order to avoid aliasing problems.

The system outlined in FIG. 1 can be viewed as a simplified special case of the resampling outlined in FIGS. 3 and 4. In order to simplify the arrangement, the modulators are omitted. Further, all HFR analysis filtering are obtained using 64-band analysis filter banks. Hence, $P_2=P_3=P_4=64$ of FIG. 3, and the downsampling factors are 1, 1.5 and 2 for the $2^{nd}$, $3^{rd}$ and $4^{th}$ order transposer branches respectively.

Figure 25B:
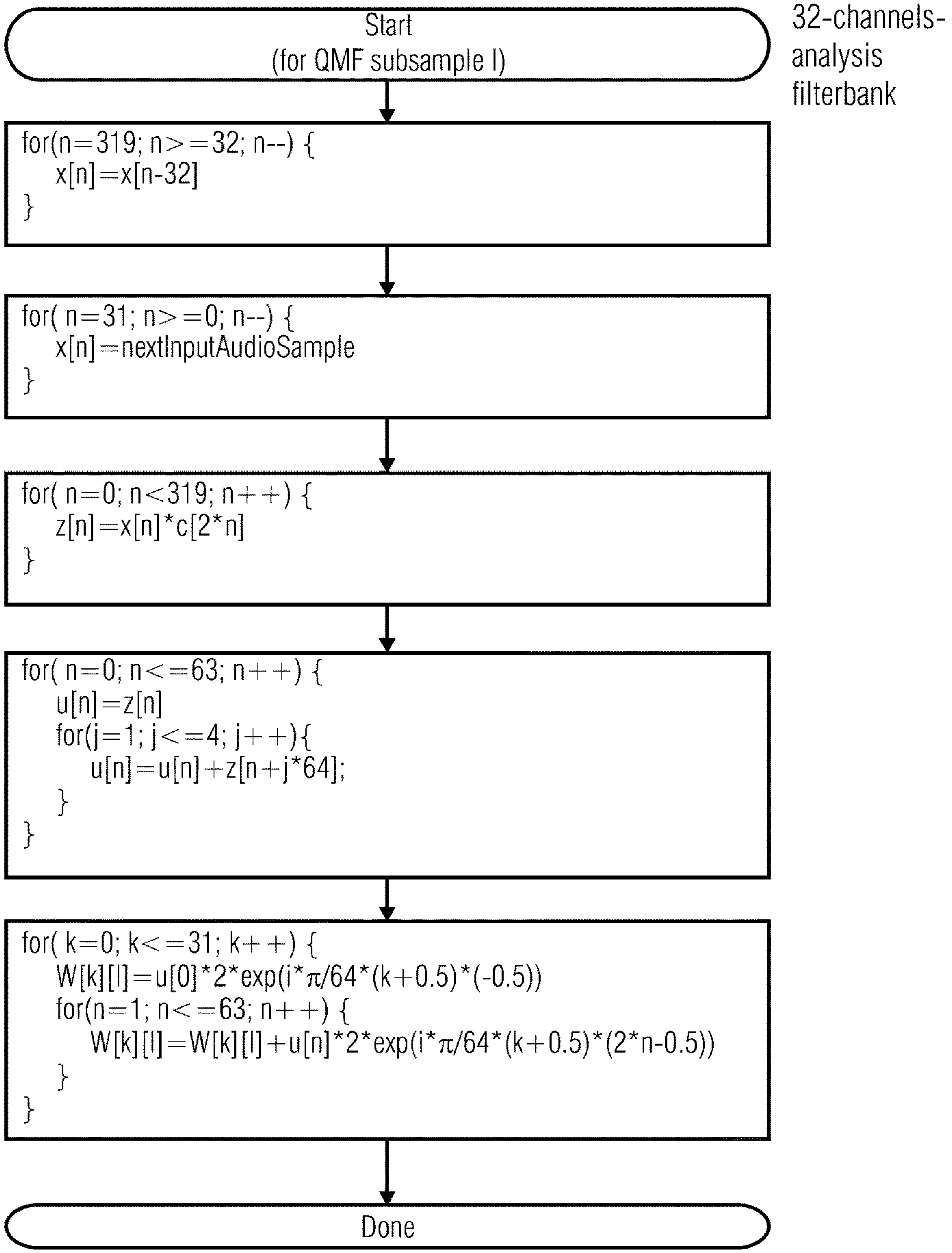
FIG. 25*b* illustrates an implementation as a flowchart of the analysis filterbank of FIG. 25*a;*

It is an advantage of the present invention that in the context of the inventive critical sampling processing, the subband signals from the 32-band analysis QMF bank corresponding to block 2302 of FIG. 23 or 601 of FIG. 6 as applied, but at least for the analysis filterbank 2302, the implementation illustrated in FIGS. 25*a* and 25*b* is advantageous due to the robustness, stability and high quality provided by this MPEG-4 analysis filterbank having 32 channels at least in the context of bandwidth extension applications such as spectral bandwidth replication, or stated generally, high frequency reconstruction processing applications.

The synthesis filterbank 2304 is configured for synthesizing a subset of the subbands covering the source range for a transposer. This synthesis is done for synthesizing the intermediate signal 2306 in the time domain Advantageously, the synthesis filterbank 2304 is a small sub-sampled real-valued QMF bank.

The time domain output 2306 of this filterbank is then fed to a complex-valued analysis QMF bank of twice the filterbank size. This QMF bank is illustrated by block 2307 of FIG. 23. This procedure enables a substantial saving in computational complexity as only the relevant source range is transformed to the QMF subband domain having doubled frequency resolution. The small QMF banks are obtained by sub-sampling of the original 64-band QMF bank, where the prototype filter coefficients are obtained by linear interpolation of the original prototype filter. Advantageously, the prototype filter associated with the MPEG-4 synthesis filterbank having 640 samples is used, where the MPEG-4 analysis filterbank has a window of 320 window samples.

Figure 24A:
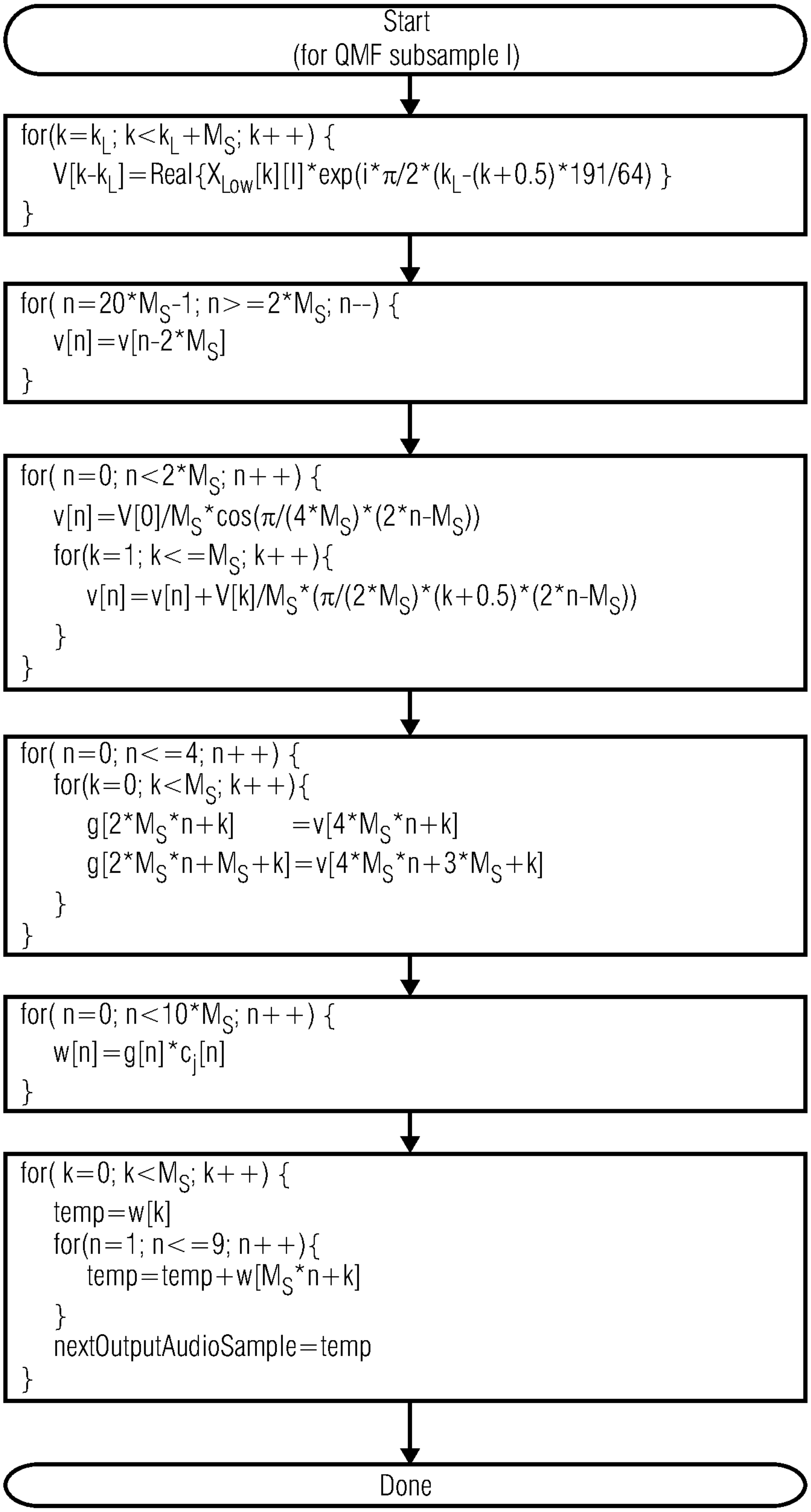
FIG. 24*a* illustrates an advantageous implementation of the small synthesis filterbank of FIG. 23.
Figure 24B:
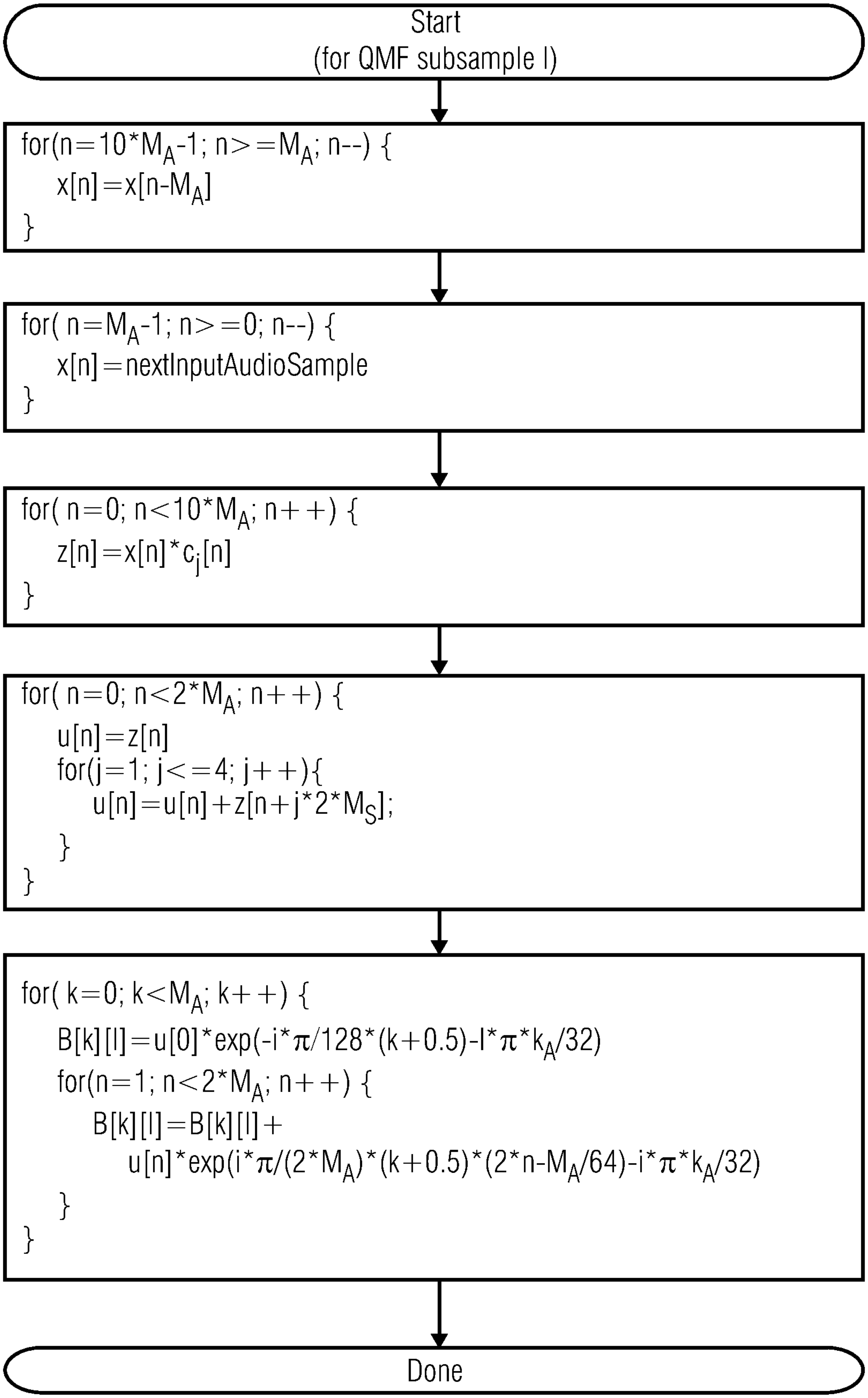
FIG. 24*b* illustrates an advantageous implementation of the further analysis filterbank of FIG. 23.

The processing of the sub-sampled filterbanks is described in FIGS. 24*a* and 24*b*, illustrating flowcharts. The following variables are first determined:

$$M_S=4\cdot\text{floor}\{(f_{TableLow},(0)+4)/8+1\}$$

$$k_L=\text{startSubband2}kL(f_{Table\ Low}(0))$$

where $M_S$ is the size of the sub-sampled synthesis filter bank and $k_L$ represents the subband index of the first channel from the 32-band QMF bank to enter the sub-sampled synthesis filter bank. The array startSubband2kL is listed in Table 1. The function floor{x} rounds the argument x to the nearest integer towards minus infinity.

TABLE 1

| y = startSubband2kL(x) | | | | | | | | | | | | | | | | |
|---|---|---|---|---|---|---|---|---|---|---|---|---|---|---|---|---|
| x | 0 | 1 | 2 | 3 | 4 | 5 | 6 | 7 | 8 | 9 | 10 | 11 | 12 | 13 | 14 | 15 |
| y | 0 | 0 | 0 | 0 | 0 | 0 | 0 | 2 | 2 | 2 | 4 | 4 | 4 | 4 | 4 | 6 |
| x | 16 | 17 | 18 | 19 | 20 | 21 | 22 | 23 | 24 | 25 | 26 | 27 | 28 | 29 | 30 | 31 |
| y | 6 | 6 | 8 | 8 | 8 | 8 | 8 | 10 | 10 | 10 | 12 | 12 | 12 | 12 | 12 | 12 |

defined in MPEG4 (ISO/IEC 14496-3) can be used. The definition of this analysis filterbank in the MPEG-4 Standard is illustrated in the upper portion of FIG. 25*a* and is illustrated as a flowchart in FIG. 25*b*, which is also taken from the MPEG-4 Standard. The SBR (spectral bandwidth replication) portion of this standard is incorporated herein by reference. Particularly, the analysis filterbank 2302 of FIG. 23 or the 32-band QMF 601 of FIG. 6 can be implemented as illustrated in FIG. 25*a*, upper portion and the flowchart in FIG. 25*b*.

Figure 25C:
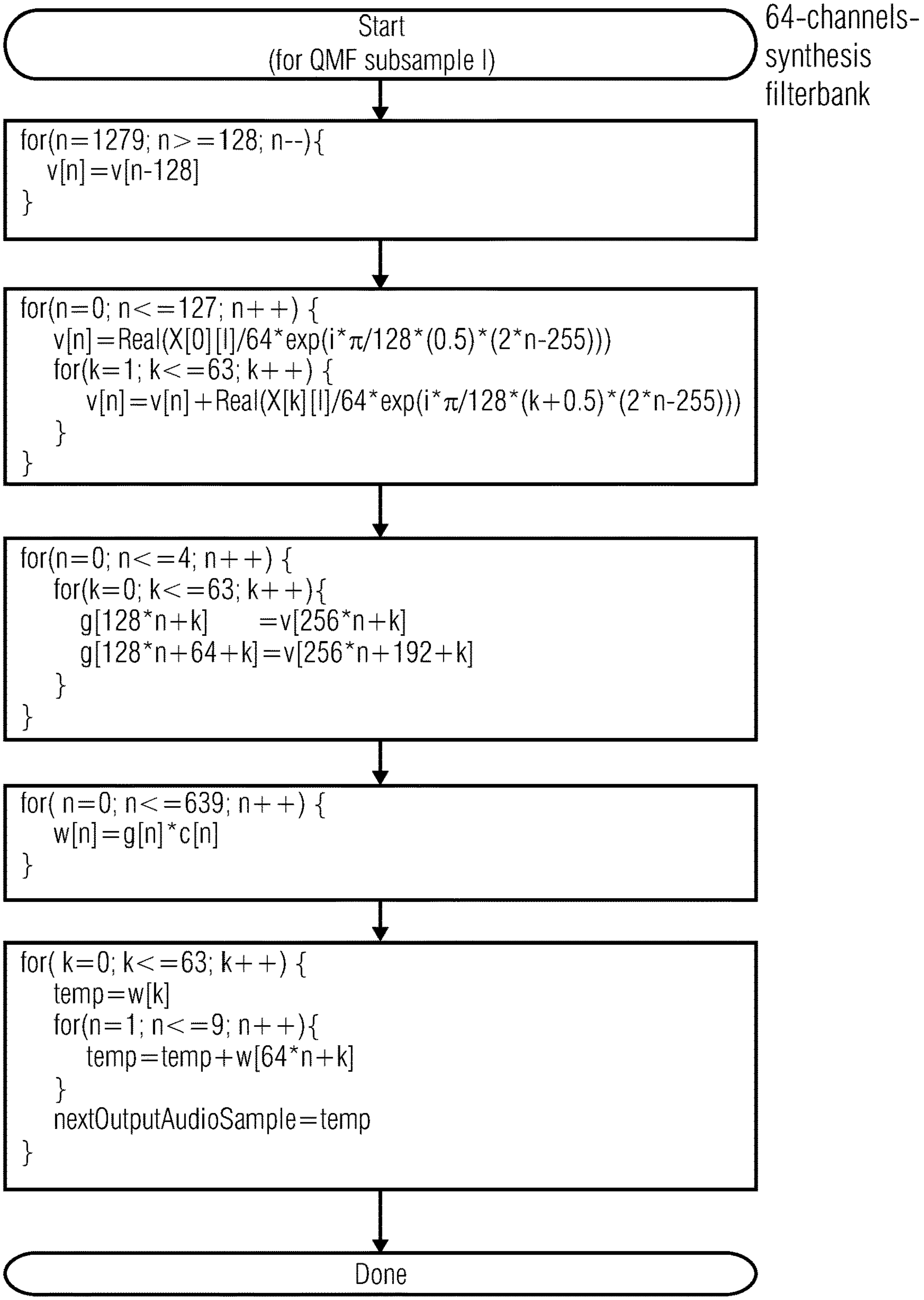
FIG. 25*c* illustrates an advantageous implementation of the synthesis filterbank of FIG. 25*a;*

Furthermore, the synthesis filterbank illustrated in block 2311 of FIG. 23 can also be implemented as indicated in the lower portion of FIG. 25*a* and as illustrated in the flowchart of FIG. 25*c*. However, any other filterbank definitions can be Hence, the value $M_S$ defines the size of the synthesis filterbank 2304 of FIG. 23 and $K_L$ is the first channel of the subset 2305 indicated at FIG. 23. Specifically, the value in the equation $f_{tableLow}$ is defined in ISO/IEC 14496-3, section 4.6.18.3.2 which is also incorporated herein by reference. It is to be noted that the value $M_S$ goes in increments of 4, which means that the size of the synthesis filterbank 2304 can be 4, 8, 12, 16, 20, 24, 28, or 32.

Advantageously, the synthesis filterbank 2304 is a real-valued synthesis filter bank. To this end, a set of $M_S$ real-valued subband samples is calculated from the $M_S$ new complex-valued subband samples according to the first step of FIG. 24*a*. To this end, the following equation is used $$V(k-k_L)=\mathrm{Re}\left\{X_{Low}(k)\cdot\exp\left(i\frac{\pi}{2}\left(k_L-\frac{(k+0.5)\cdot 191}{64}\right)\right)\right\},\ k_L\le k<k_L+M_S$$

In the equation, exp( ) denotes the complex exponential function, i is the imaginary unit and $k_L$ has been defined before.

Shift the samples in the array v by $2M_S$ positions. The oldest $2M_S$ samples are discarded.

The $M_S$ real-valued subband samples are multiplied by the matrix N, i.e. the matrix-vector product N·V is computed, where $$N(k,n)=\frac{1}{M_S}\cdot\cos\left(\frac{\pi\cdot(k+0.5)\cdot(2\cdot n-M_S)}{2M_S}\right),\ \begin{cases}0\le k<M_S\\0\le n<2M_S\end{cases}$$

The output from this operation is stored in the positions 0 to $2M_S-1$ of array v.

Extract samples from v according to the flowchart in FIG. 24*a* to create the $10M_S$-element array g.

Multiply the samples of array g by window $c_i$ to produce array w. The window coefficients ci are obtained by linear interpolation of the coefficients c, i.e. through the equation $$c(n)=\rho(n)c(\mu(n)+1)+(1-\rho(n))c(\mu(n)),\ 0\le n<10M_S$$

where μ(n) and ρ(n) are defined as the integer and fractional parts of $64\cdot n/M_S$, respectively. The window coefficients of c can be found in Table 4.A.87 of ISO/IEC 14496-3:2009

Hence, the synthesis filterbank has a prototype window function calculator for calculating a prototype window function by sub sampling or interpolating using a stored window function for a filterbank having a different size.

Calculate $M_S$ new output samples by summation of samples from array w according to the last step in the flowchart of in FIG. 24*a.*

Subsequently, the advantageous implementation of the further analysis filterbank 2307 in FIG. 23 is illustrated together with the flowchart in FIG. 24*b*.

Shift the samples in the array x by $2M_S$ positions according to the first step of FIG. 24*b*. The oldest $2M_S$ samples are discarded and $2M_S$ new samples are stored in positions 0 to $2M_S-1$.

Multiply the samples of array x by the coefficients of window $c_{2i}$. The window coefficients $c_{2i}$ are obtained by linear interpolation of the coefficients c, i.e. through the equation $$c_{2i}(n)=\rho(n)c(\mu(n)+1)+(1-\rho(n))c(\mu(n)),\ 0\le n<20M_S$$

where μ(n) and ρ(n) are defined as the integer and fractional parts of $32\cdot n/M_S$, respectively. The window coefficients of c can be found in Table 4.A.87 of ISO/IEC 14496-3:2009.

Hence, the further analysis filterbank 2307 has a prototype window function calculator for calculating a prototype window function by subsampling or interpolating using a stored window function for a filterbank having a different size.

Sum the samples according to the formula in the flowchart in FIG. 24*b* to create the $4M_S$-element array u.

Calculate $2M_S$ new complex-valued subband samples by the matrix-vector multiplication M·u, where $$M(k,n)=\exp\left(\frac{i\cdot\pi\cdot(k+0.5)\cdot(2\cdot n-4\cdot M_S)}{4M_S}\right),\ \begin{cases}0\le k<2M_S\\0\le n<4M_S\end{cases}$$

In the equation, exp( ) denotes the complex exponential function, and i is the imaginary unit.

A block diagram of a factor 2 downsampler is shown in FIG. 8(*a*). The now real-valued low pass filter can be written H(z)=B(z)/A(z), where B(z) is the non-recursive part (FIR) and A(z) is the recursive part (IIR). However, for an efficient implementation, using the Noble Identities to decrease computational complexity, it is beneficial to design a filter where all poles have multiplicity 2 (double poles) as $A(z^2)$. Hence the filter can be factored as shown in FIG. 8(*b*). Using Noble Identity 1, the recursive part may be moved past the decimator as in FIG. 8(*c*). The non-recursive filter B(z) can be implemented using standard 2-component polyphase decomposition as $$B(z)=\sum_{n=0}^{N_z}b(n)z^{-n}=\sum_{l=0}^{1}z^{-l}E_l(z^2),\ \text{when } E_l(z)=\sum_{n=0}^{N_z/2}b(2\cdot n+l)z^{-n}$$

Hence, the downsampler may be structured as in FIG. 8(*d*). After using Noble Identity 1, the FIR part is computed at the lowest possible sampling rate as shown in FIG. 8(*e*). From FIG. 8(*e*) it is easy to see that the FIR operation (delay, decimators and polyphase components) can be viewed as a window-add operation using an input stride of two samples. For two input samples, one new output sample will be produced, effectively resulting in a downsampling of a factor 2.

A block diagram of the factor 1.5=3/2 downsampler is shown in FIG. 9(*a*). The real-valued low pass filter can again be written H(z)=B(z)/A(z), where B(z) is the non-recursive part (FIR) and A(z) is the recursive part (IIR). As before, for an efficient implementation, using the Noble Identities to decrease computational complexity, it is beneficial to design a filter where all poles either have multiplicity 2 (double poles) or multiplicity 3 (triple poles) as $A(z^2)$ or $A(z^3)$ respectively. Here, double poles are chosen as the design algorithm for the low pass filter is more efficient, although the recursive part actually gets 1.5 times more complex to implement compared to the triple pole approach. Hence the filter can be factored as shown in FIG. 9(*b*). Using Noble Identity 2, the recursive part may be moved in front of the interpolator as in FIG. 9(*c*). The non-recursive filter B(z) can be implemented using standard 2·3=6 component polyphase decomposition as $$B(z)=\sum_{n=0}^{N_z}b(n)z^{-n}=\sum_{l=0}^{1}z^{-l}E_l(z^6),\ \text{where } E_l(z)=\sum_{n=0}^{N_z/6}b(6\cdot n+l)z^{-n}$$

Hence, the downsampler may be structured as in FIG. 9(*d*). After using both Noble Identity 1 and 2, the FIR part is computed at the lowest possible sampling rate as shown in FIG. 9(*e*). From FIG. 9(*e*) it is easy to see that the even-indexed output samples are computed using the lower group of three polyphase filters ($E_0(Z)$, $E_2(Z)$, $E_4(Z)$) while the odd-indexed samples are computed from the higher group ($E_1(Z)$, $E_3(Z)$, $E_5(Z)$). The operation of each group (delay chain, decimators and polyphase components) can be viewed as a window-add operation using an input stride of three samples. The window coefficients used in the upper group are the odd indexed coefficients, while the lower group uses the even index coefficients from the original filter B(z). Hence, for a group of three input samples, two new output samples will be produced, effectively resulting in a downsampling of a factor 1.5.

The time domain signal from the core decoder (101 in FIG. 1) may also be subsampled by using a smaller subsampled synthesis transform in the core decoder. The use of a smaller synthesis transform offers even further decreased computational complexity. Depending on the cross-over frequency, i.e. the bandwidth of the core coder signal, the ratio of the synthesis transform size and the nominal size Q (Q<1), results in a core coder output signal having a sampling rate Qfs. To process the subsampled core coder signal in the examples outlined in the current application, all the analysis filter banks of FIG. 1 (102, 103-32, 103-33 and 103-34) need to scaled by the factor Q, as well as the downsamplers (301-2, 301-3 and 301-T) of FIG. 3, the decimator 404 of FIG. 4, and the analysis filter bank 601 of FIG. 6. Apparently, Q has to be chosen so that all filter bank sizes are integers.

Figures 10A, 10B, 10C:
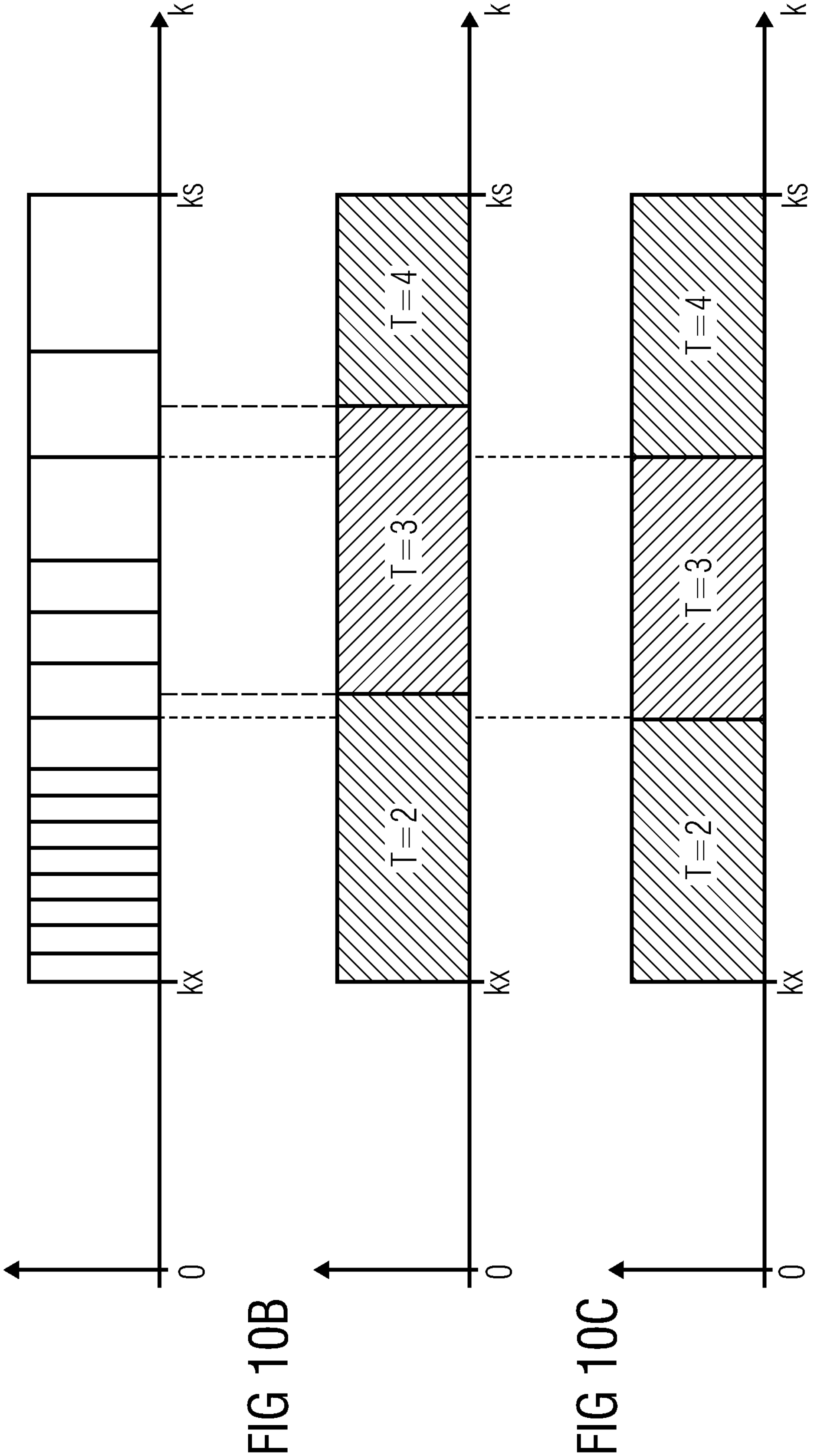
FIGS. 10*a*-10*c* illustrate the alignment of the spectral borders of the HFR transposer signals to the borders of the envelope adjustment frequency bands in a HFR enhanced coder.

FIGS. 10*a*-10*c* illustrate the alignment of the spectral borders of the HFR transposer signals to the spectral borders of the envelope adjustment frequency table in a HFR enhanced coder, such as SBR [ISO/TEC 14496-3:2009, "Information technology—Coding of audio-visual objects—Part 3: Audio]. FIG. 10(*a*) shows a stylistic graph of the frequency bands comprising the envelope adjustment table, the so-called scale-factor bands, covering the frequency range from the cross-over frequency $k_x$ to the stop frequency $k_s$. The scale-factor bands constitute the frequency grid used in a HFR enhanced coder when adjusting the energy level of the regenerated high-band frequency, i.e. the frequency envelope. In order to adjust the envelope, the signal energy is averaged over a time/frequency block constrained by the scale-factor band borders and selected time borders. If the signals generated by different transposition orders are unaligned to the scale-factor bands, as illustrated in FIG. 10(*b*), artifacts may arise if the spectral energy drastically changes in the vicinity of a transposition band border, since the envelope adjustment process will maintain the spectral structure within one scale-factor band. Hence, the proposed solution is to adapt the frequency borders of the transposed signals to the borders of the scale-factor bands as shown in FIG. 10(*c*). In the figure, the upper border of the signals generated by transposition orders of 2 and 3 (T=2, 3) are lowered a small amount, compared to FIG. 10(*b*), in order to align the frequency borders of the transposition bands to existing scale-factor band borders.

A realistic scenario showing the potential artifacts when using unaligned borders is depicted in FIG. 11. FIG. 11(*a*) again shows the scale-factor band borders. FIG. 11(*b*) shows the unadjusted HFR generated signals of transposition orders T=2, 3 and 4 together with the core decoded base band signal. FIG. 11(*c*) shows the envelope adjusted signal when a flat target envelope is assumed. The blocks with checkered areas represent scale-factor bands with high intra-band energy variations, which may cause anomalies in the output signal.

Figures 11A, 11B, 11C:
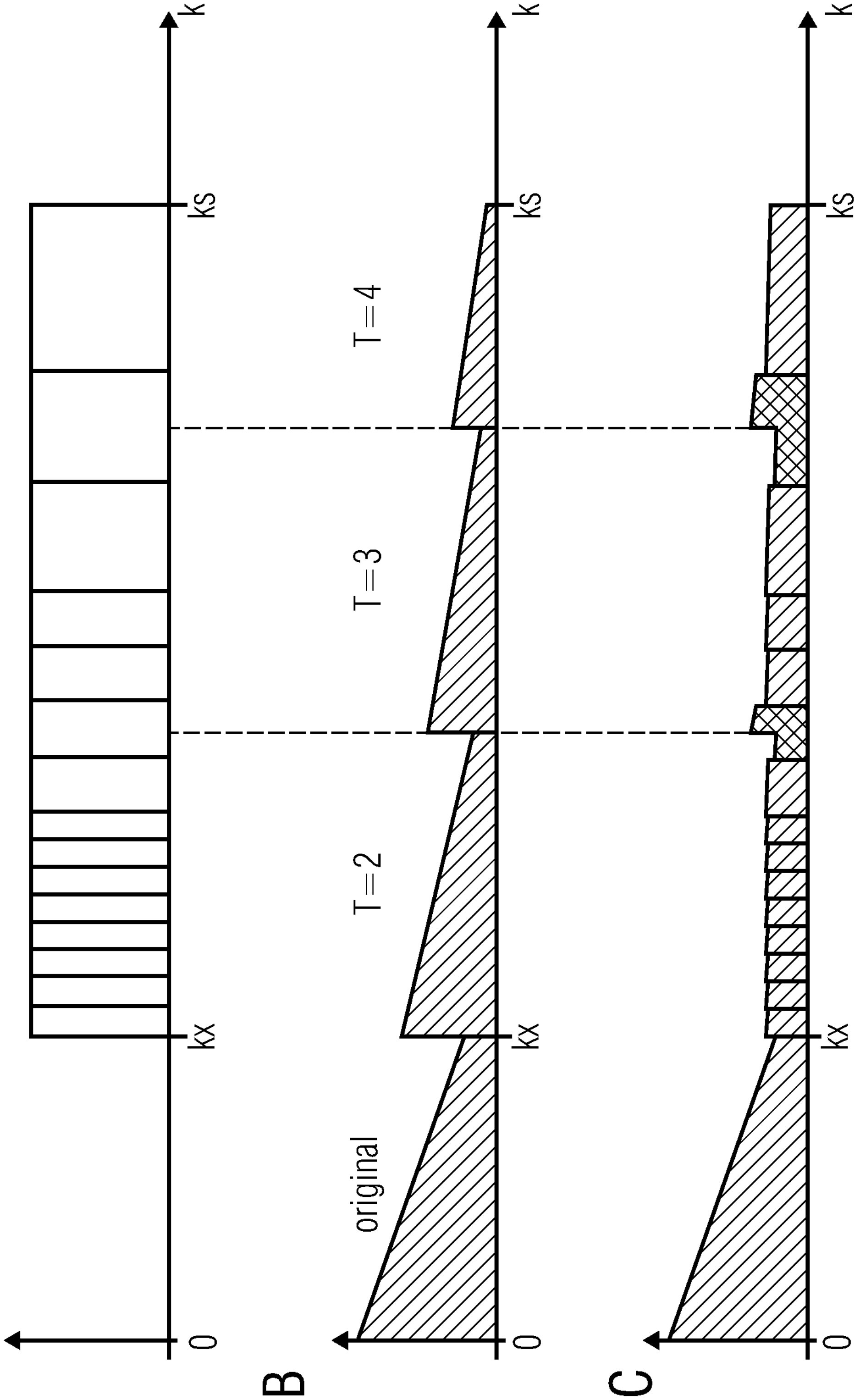
FIGS. 11*a*-11*c* illustrate a scenario where artifacts emerge due to unaligned spectral borders of the HFR transposer signals.
Figure 12A:
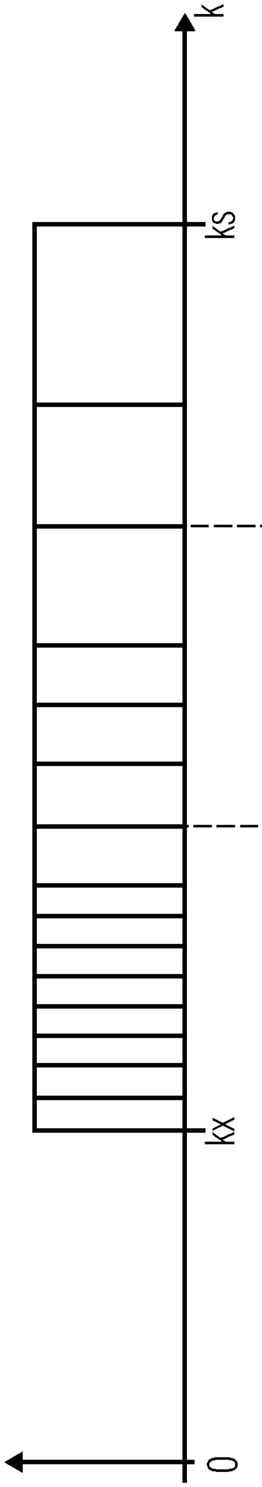
FIGS. 12*a*-12*c* illustrate a scenario where the artifacts of FIGS. 11*a*-11*c* are avoided as a result of aligned spectral borders of the HFR transposer signals.
Figure 12B:
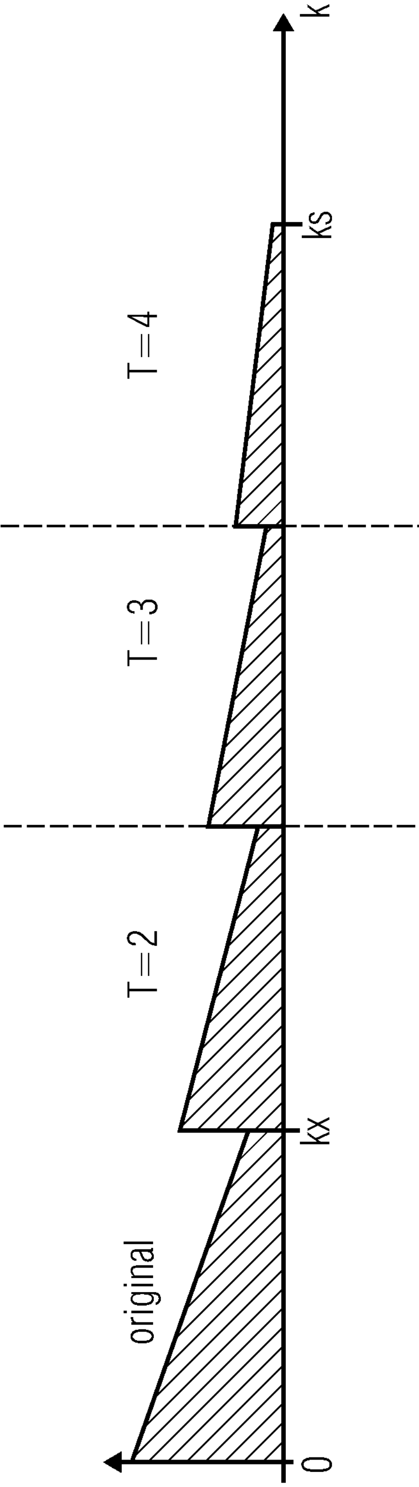
Figure 12C:
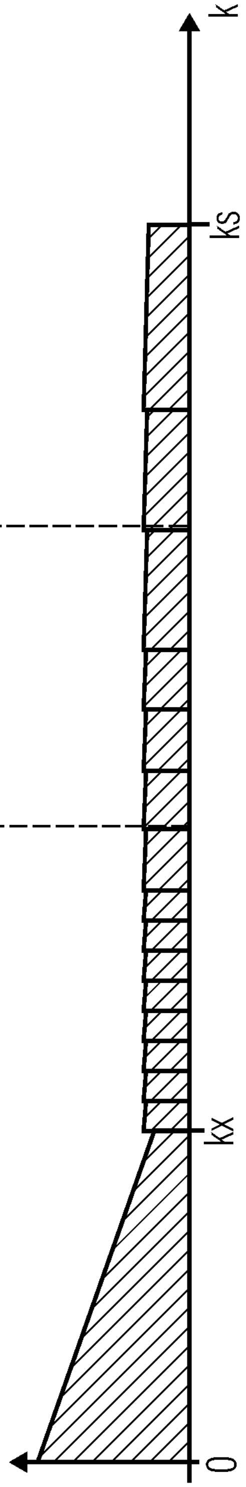

FIGS. 12*a*-12*c* illustrate the scenario of FIGS. 11*a*-11*c*, but this time using aligned borders. FIG. 12(*a*) shows the scale-factor band borders, FIG. 12(*b*) depicts the unadjusted HFR generated signals of transposition orders T=2, 3 and 4 together with the core decoded base band signal and, in line with FIG. 11(*c*), FIG. 12(*c*) shows the envelope adjusted signal when a flat target envelope is assumed. As seen from this figure, there are no scale-factor bands with high intra-band energy variations due to misalignment of the transposed signal bands and the scale-factor bands, and hence the potential artifacts are diminished.

Figures 13A, 13B, 13C:
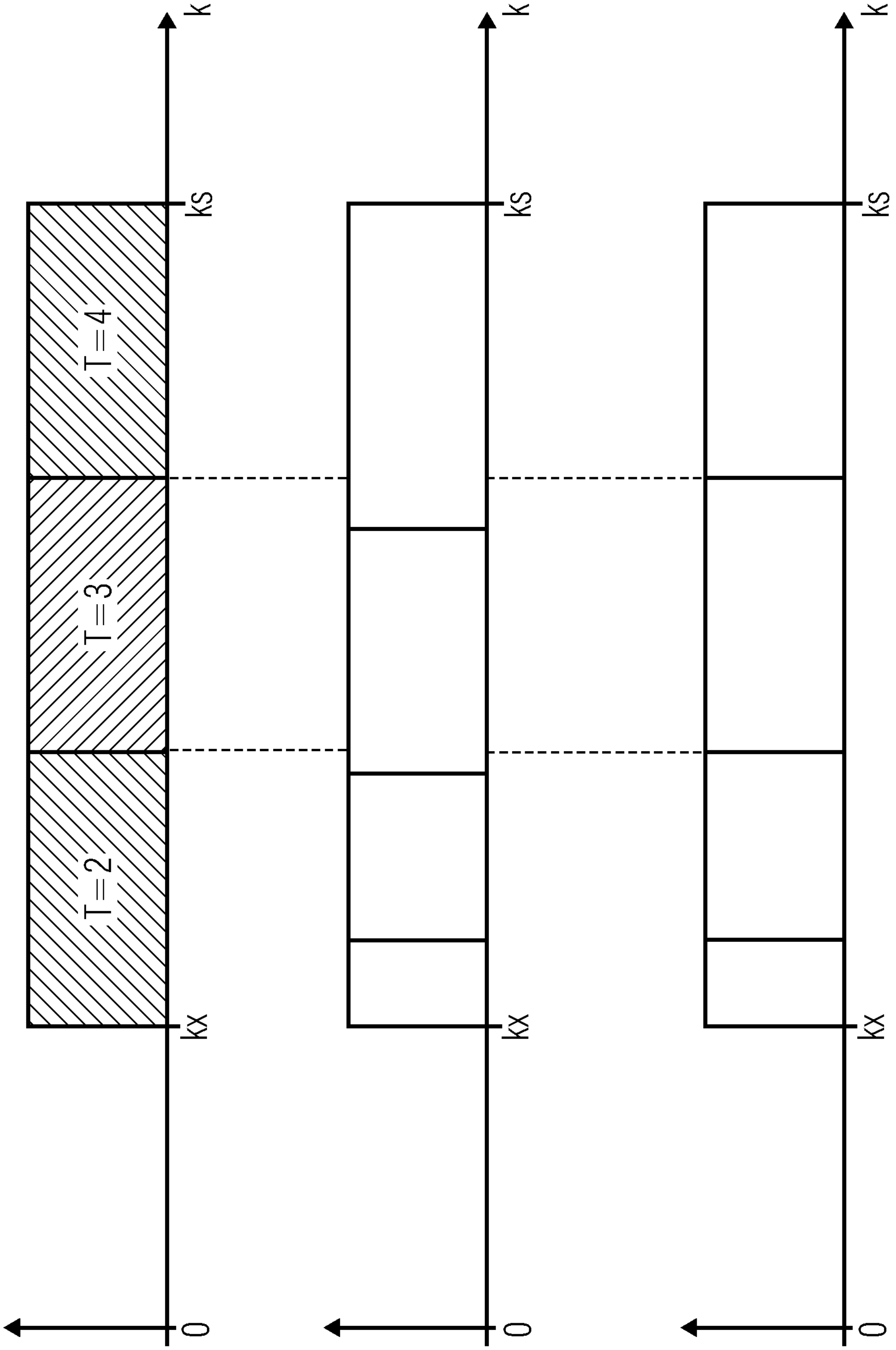
FIGS. 13*a*-13*c* illustrate the adaption of spectral borders in the limiter tool to the spectral borders of the HFR transposer signals.

FIGS. 13*a*-13*c* illustrate the adaption of the HFR limiter band borders, as described in e.g. SBR [ISO/TEC 14496-3:2009, "Information technology—Coding of audio-visual objects—Part 3: Audio] to the harmonic patches in a HFR enhanced coder. The limiter operates on frequency bands having a much coarser resolution than the scale-factor bands, but the principle of operation is very much the same. In the limiter, an average gain-value for each of the limiter bands is calculated. The individual gain values, i.e. the envelope gain values calculated for each of the scale-factor bands, are not allowed to exceed the limiter average gain value by more than a certain multiplicative factor. The objective of the limiter is to suppress large variations of the scale-factor band gains within each of the limiter bands. While the adaption of the transposer generated bands to the scale-factor bands ensures small variations of the intra-band energy within a scale-factor band, the adaption of the limiter band borders to the transposer band borders, according to the present invention, handles the larger scale energy differences between the transposer processed bands. FIG. 13(*a*) shows the frequency limits of the HFR generated signals of transposition orders T=2, 3 and 4. The energy levels of the different transposed signals can be substantially different. FIG. 13(*b*) shows the frequency bands of the limiter which typically are of constant width on a logarithmic frequency scale. The transposer frequency band borders are added as constant limiter borders and the remaining limiter borders are recalculated to maintain the logarithmic relations as close as possible, as for example illustrated in FIG. 13(*c*). Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Figure 21:
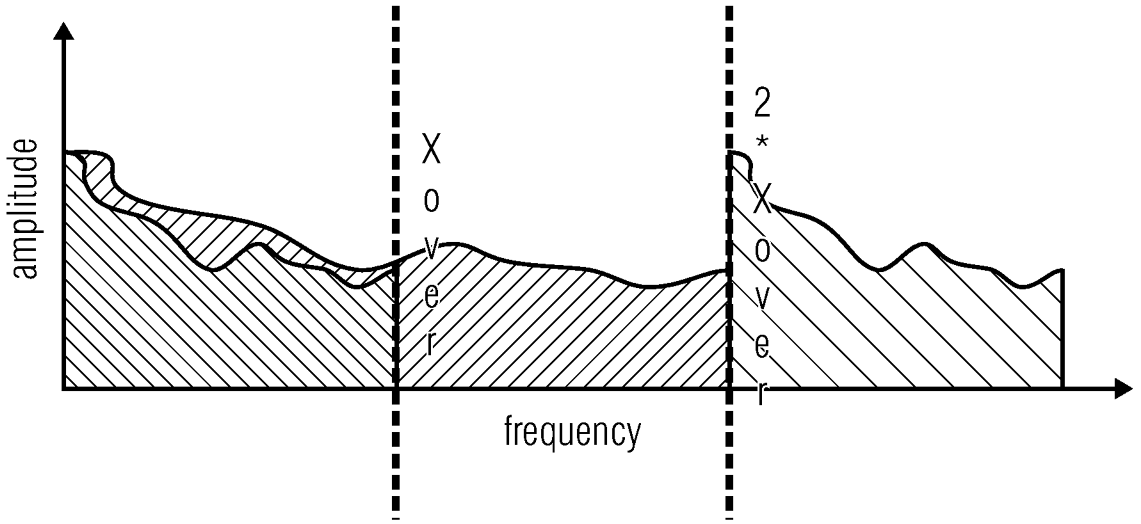
FIG. 21 illustrates a mixed patching, where the first patching is generated by frequency spreading and the second patch is generated by an SSB copy-up of a low-frequency portion.
Figure 22:
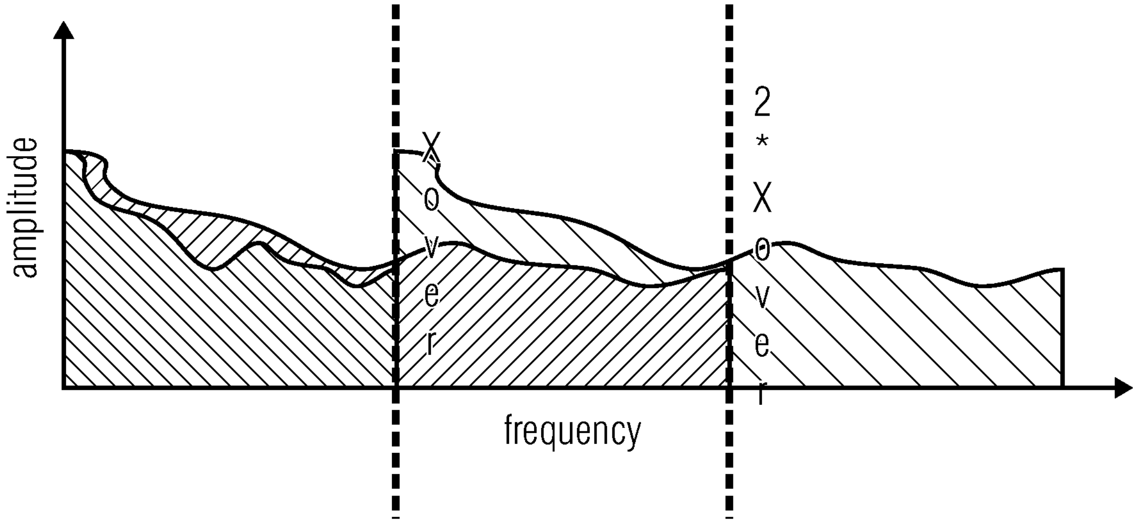
FIG. 22 illustrates an alternative mixed patching utilizing the first HBE patch for an SSB copy-up operation to generate a second patch.

Further embodiments employ a mixed patching scheme which is shown in FIG. 21, where the mixed patching method within a time block is performed. For full coverage of the different regions of the HF spectrum, a BWE comprises several patches. In HBE, the higher patches need high transposition factors within the phase vocoders, which particularly deteriorate the perceptual quality of transients.

Thus embodiments generate the patches of higher order that occupy the upper spectral regions advantageously by computationally efficient SSB copy-up patching and the lower order patches covering the middle spectral regions, for which the preservation of the harmonic structure is desired, advantageously by HBE patching. The individual mix of patching methods can be static over time or, advantageously, be signaled in the bitstream.

For the copy-up operation, the low frequency information can be used as shown in FIG. 21. Alternatively, the data from patches that were generated using HBE methods can be used as illustrated in FIG. 21. The latter leads to a less dense tonal structure for higher patches. Besides these two examples, every combination of copy-up and HBE is conceivable.

The advantages of the proposed concepts are

Improved perceptual quality of transients

Reduced computational complexity

Figure 26:
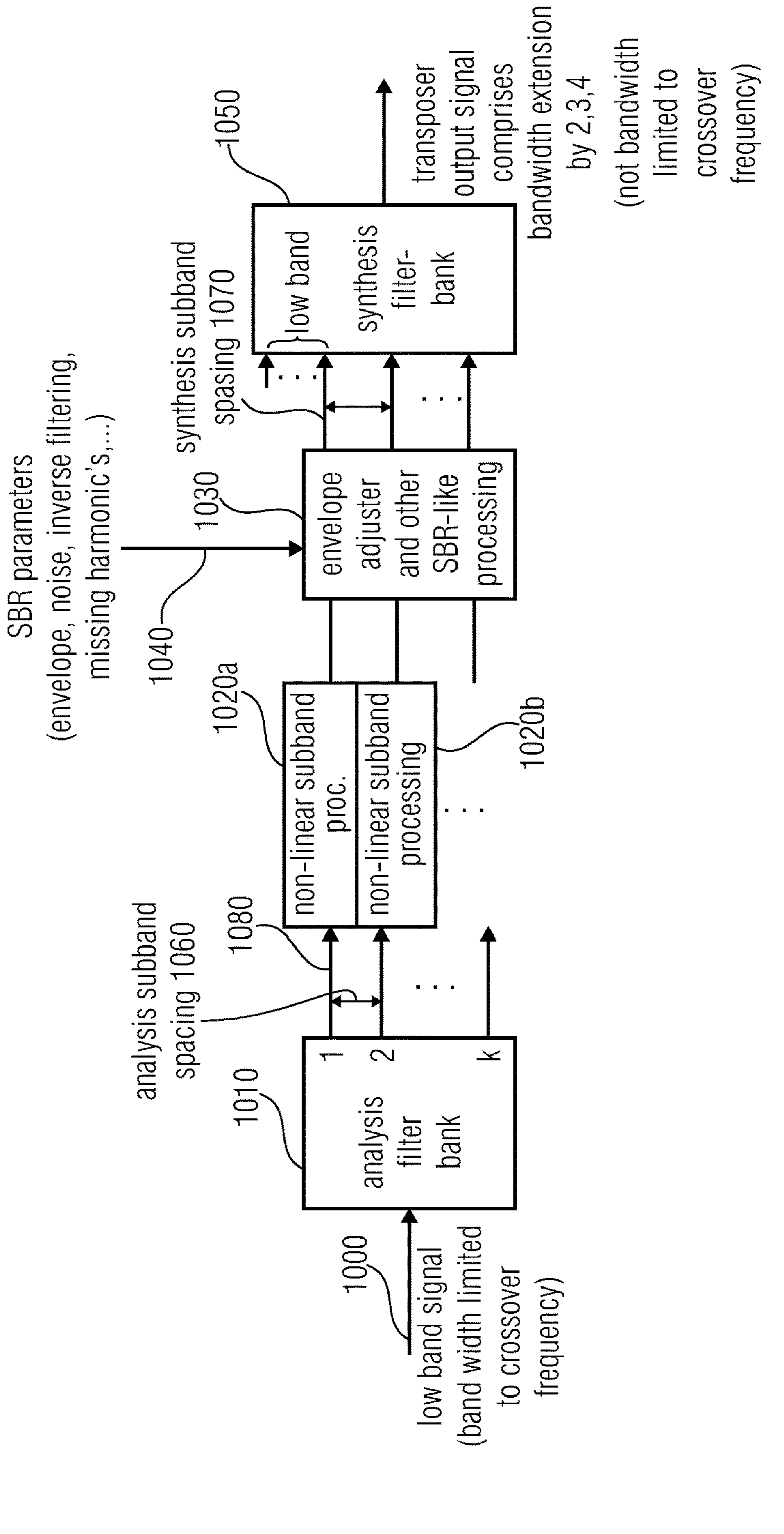
FIG. 26 illustrates an overview of the framework in the context of bandwidth extension processing.

FIG. 26 illustrates an advantageous processing chain for the purpose of bandwidth extension, where different processing operations can be performed within the non-linear subband processing indicated at blocks 1020*a*, 1020*b*. The cascade of filterbanks 2302, 2304, 2307 is represented in FIG. 26 by block 1010. Furthermore, block 2309 may correspond to elements 1020*a*, 1020*b* and the envelope adjuster 1030 can be placed between block 2309 and block 2311 of FIG. 23 or can be placed subsequent to the processing in block 2311. In this implementation, the band-selective processing of the processed time domain signal such as the bandwidth extended signal is performed in the time domain rather than in the subband domain, which exists before the synthesis filterbank 2311.

FIG. 26 illustrates an apparatus for generating a bandwidth extended audio signal from a lowband input signal 1000 in accordance with a further embodiment. The apparatus comprises an analysis filterbank 1010, a subband-wise non-linear subband processor 1020*a*, 1020*b*, a subsequently connected envelope adjuster 1030 or, generally stated, a high frequency reconstruction processor operating on high frequency reconstruction parameters as, for example, input at parameter line 1040. The envelope adjuster, or as generally stated, the high frequency reconstruction processor processes individual subband signals for each subband channel and inputs the processed subband signals for each subband channel into a synthesis filterbank 1050. The synthesis filterbank 1050 receives, at its lower channel input signals, a subband representation of the lowband core decoder signal. Depending on the implementation, the lowband can also be derived from the outputs of the analysis filterbank 1010 in FIG. 26. The transposed subband signals are fed into higher filterbank channels of the synthesis filterbank for performing high frequency reconstruction.

The filterbank 1050 finally outputs a transposer output signal which comprises bandwidth extensions by transposition factors 2, 3, and 4, and the signal output by block 1050 is no longer bandwidth-limited to the crossover frequency, i.e. to the highest frequency of the core coder signal corresponding to the lowest frequency of the SBR or HFR generated signal components.

In the FIG. 26 embodiment, the analysis filterbank performs a two times over sampling and has a certain analysis subband spacing 1060. The synthesis filterbank 1050 has a synthesis subband spacing 1070 which is, in this embodiment, double the size of the analysis subband spacing which results in a transposition contribution as will be discussed later in the context of FIGS. 27*a* and 27*b*.

Figure 27A:
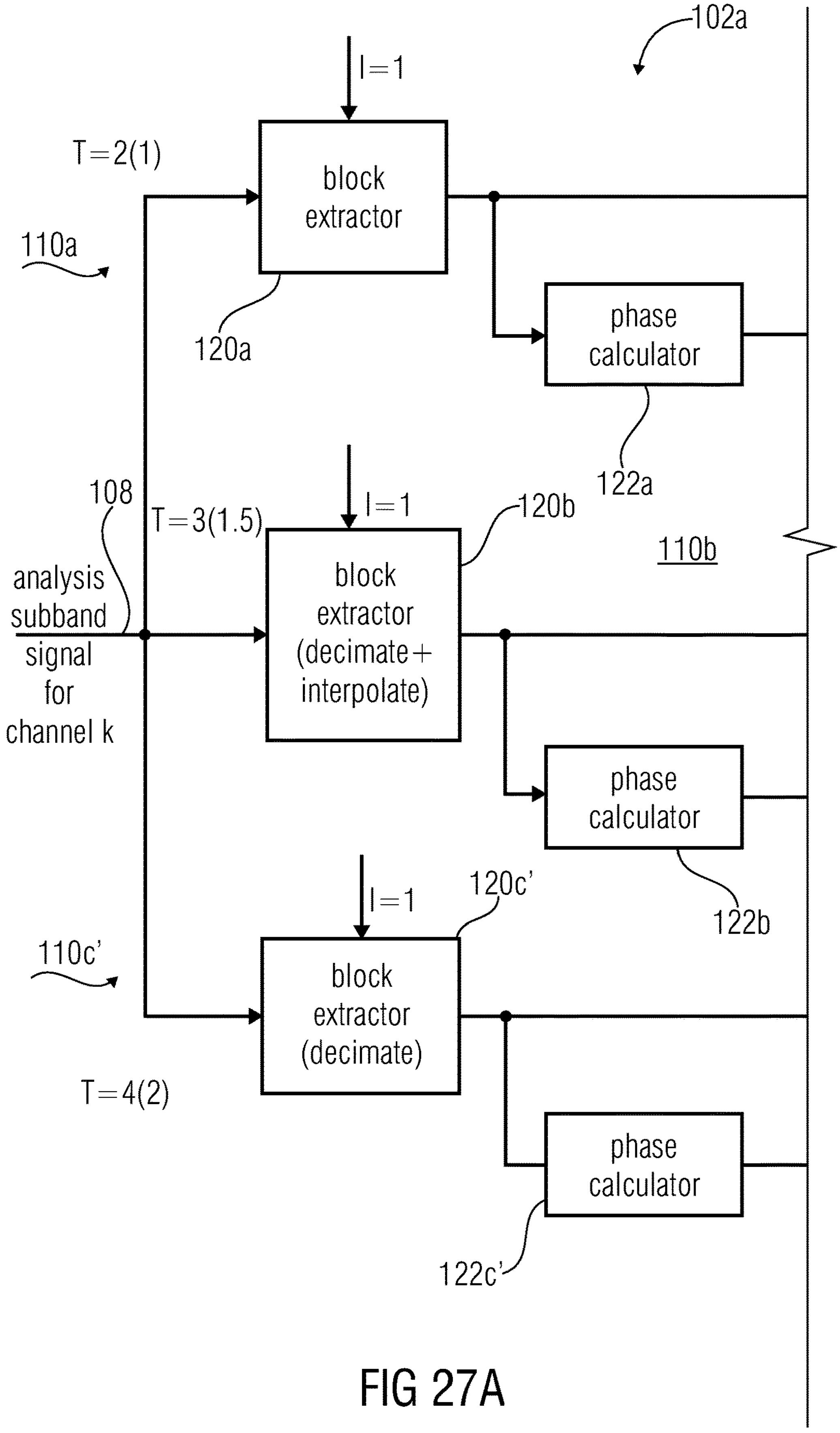
FIGS. 27*a*-27*b* illustrate an advantageous implementation of a processing of subband signals output by the further analysis filterbank of FIG. 23.
Figure 27B:
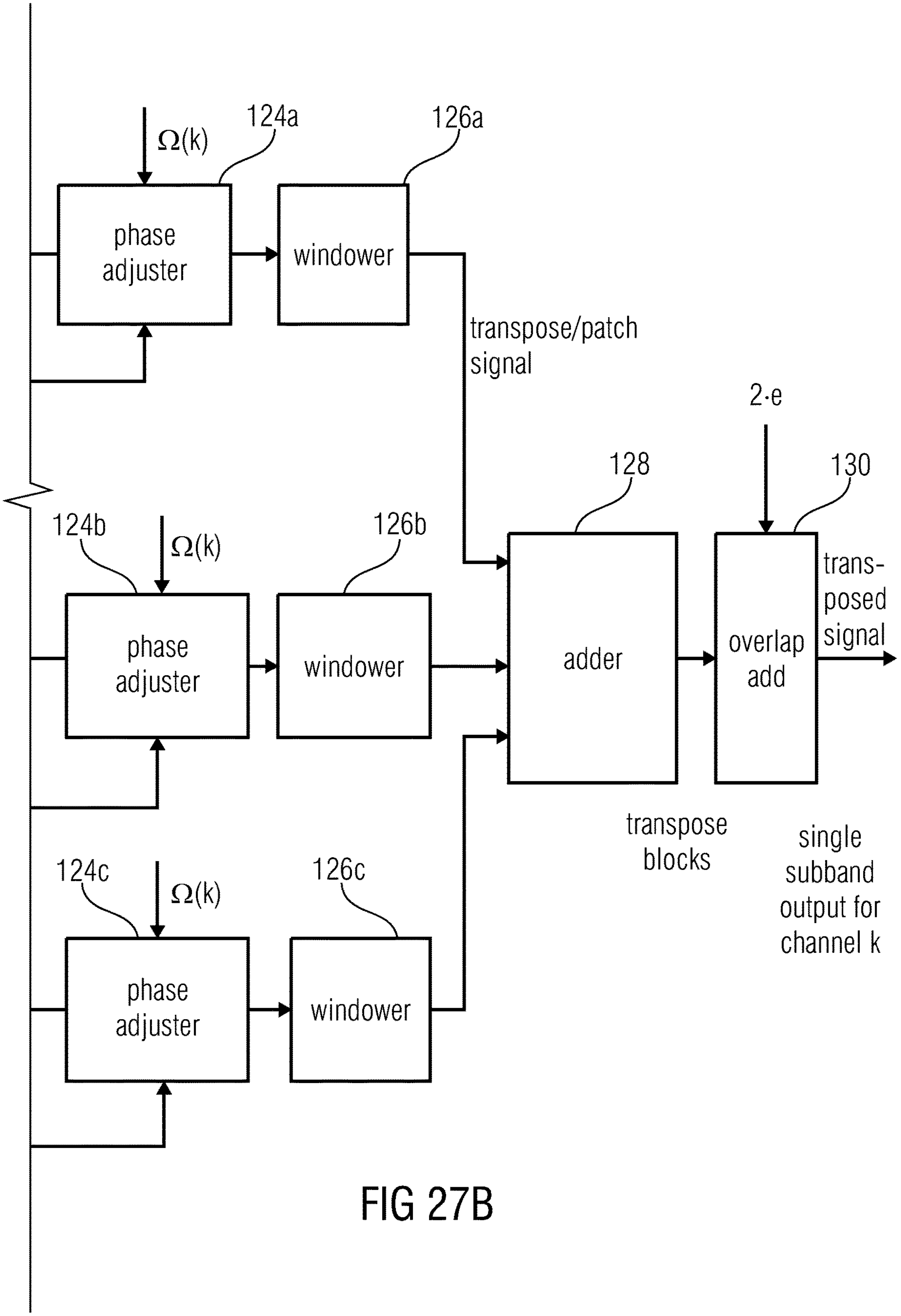

FIGS. 27*a* and 27*b* illustrate a detailed implementation of an advantageous embodiment of a non-linear subband processor 1020*a* in FIG. 26. The circuit illustrated in FIGS. 27*a* and 27*b* receives as an input a single subband signal 108, which is processed in three "branches": The upper branch 110*a* is for a transposition by a transposition factor of 2. The branch in the middle of FIGS. 27*a* and 27*b* indicated at 110*b* is for a transposition by a transposition factor of 3, and the lower branch in FIGS. 27*a* and 27*b* is for a transposition by a transposition factor of 4 and is indicated by reference numeral 110*c*. However, the actual transposition obtained by each processing element in FIGS. 27*a* and 27*b* is only 1 (i.e. no transposition) for branch 110*a*. The actual transposition obtained by the processing element illustrated in FIGS. 27*a* and 27*b* for the medium branch 110*b* is equal to 1.5 and the actual transposition for the lower branch 110*c* is equal to 2. This is indicated by the numbers in brackets to the left of FIG. 27*a*, where transposition factors T are indicated. The transpositions of 1.5 and 2 represent a first transposition contribution obtained by having a decimation operations in branches 110*b*, 110*c* and a time stretching by the overlap-add processor. The second contribution, i.e. the doubling of the transposition, is obtained by the synthesis filterbank 105, which has a synthesis subband spacing 107 that is two times the analysis filterbank subband spacing. Therefore, since the synthesis filterbank has two times the analysis subband spacing, any decimations functionality does not take place in branch 110*a*.

Branch 110*b*, however, has a decimation functionality in order to obtain a transposition by 1.5. Due to the fact that the synthesis filterbank has two times the physical subband spacing of the analysis filterbank, a transposition factor of 3 is obtained as indicated in FIG. 27*a* to the left of the block extractor for the second branch 110*b*.

Analogously, the third branch has a decimation functionality corresponding to a transposition factor of 2, and the final contribution of the different subband spacing in the analysis filterbank and the synthesis filterbank finally corresponds to a transposition factor of 4 of the third branch 110*c*.

Particularly, each branch has a block extractor 120*a*, 120*b*, 120*c* and each of these block extractors can be similar to the block extractor 1800 of FIG. 18. Furthermore, each branch has a phase calculator 122*a*, 122*b* and 122*c*, and the phase calculator can be similar to phase calculator 1804 of FIG. 18. Furthermore, each branch has a phase adjuster 124*a*, 124*b*, 124*c* and the phase adjuster can be similar to the phase adjuster 1806 of FIG. 18. Furthermore, each branch has a windower 126*a*, 126*b*, 126*c*, where each of these windowers can be similar to the windower 1802 of FIG. 18. Nevertheless, the windowers 126*a*, 126*b*, 126*c* can also be configured to apply a rectangular window together with some "zero padding". The transpose or patch signals from each branch 110*a*, 110*b*, 110*c*, in the embodiment of FIGS. 27*a* and 27*b*, is input into the adder 128, which adds the contribution from each branch to the current subband signal to finally obtain so-called transpose blocks at the output of adder 128. Then, an overlap-add procedure in the overlap-adder 130 is performed, and the overlap-adder 130 can be similar to the overlap/add block 1808 of FIG. 18. The overlap-adder applies an overlap-add advance value of 2·e, where e is the overlap-advance value or "stride value" of the block extractors 120*a*, 120*b*, 120*c*, and the overlap-adder 130 outputs the transposed signal which is, in the embodiment of FIGS. 27*a* and 27*b*, a single subband output for channel k, i.e. for the currently observed subband channel. The processing illustrated in FIGS. 27*a* and 27*b* is performed for each analysis subband or for a certain group of analysis subbands and, as illustrated in FIG. 26, transposed subband signals are input into the synthesis filterbank 1050 after being processed by block 1030 to finally obtain the transposer output signal illustrated in FIG. 26 at the output of block 1050.

In an embodiment, the block extractor 120*a* of the first transposer branch 110*a* extracts 10 subband samples and subsequently a conversion of these 10 QMF samples to polar coordinates is performed. This output, generated by the phase adjuster 124*a*, is then forwarded to the windower 126*a*, which extends the output by zeroes for the first and the last value of the block, where this operation is equivalent to a (synthesis) windowing with a rectangular window of length 10. The block extractor 120*a* in branch 110*a* does not perform a decimation. Therefore, the samples extracted by the block extractor are mapped into an extracted block in the same sample spacing as they were extracted.

However, this is different for branches 110*b* and 110*c*. The block extractor 120*b* advantageously extracts a block of 8 subband samples and distributes these 8 subband samples in the extracted block in a different subband sample spacing. The non-integer subband sample entries for the extracted block are obtained by an interpolation, and the thus obtained QMF samples together with the interpolated samples are converted to polar coordinates and are processed by the phase adjuster. Then, again, windowing in the windower 126*b* is performed in order to extend the block output by the phase adjuster 124*b* by zeroes for the first two samples and the last two samples, which operation is equivalent to a (synthesis) windowing with a rectangular window of length 8.

The block extractor 120*c* is configured for extracting a block with a time extent of 6 subband samples and performs a decimation of a decimation factor 2, performs a conversion of the QMF samples into polar coordinates and again performs an operation in the phase adjuster 124*b,* and the output is again extended by zeroes, however now for the first three subband samples and for the last three subband samples. This operation is equivalent to a (synthesis) windowing with a rectangular window of length 6.

The transposition outputs of each branch are then added to form the combined QMF output by the adder 128, and the combined QMF outputs are finally superimposed using overlap-add in block 130, where the overlap-add advance or stride value is two times the stride value of the block extractors 120*a,* 120*b,* 120*c* as discussed before.

An embodiment comprises a method for decoding an audio signal by using subband block based harmonic transposition, comprising the filtering of a core decoded signal through an M-band analysis filter bank to obtain a set of subband signals; synthesizing a subset of said subband signals by means of subsampled synthesis filter banks having a decreased number of subbands, to obtain subsampled source range signals.

An embodiment relates to a method for aligning the spectral band borders of HFR generated signals to spectral borders utilized in a parametric process.

An embodiment relates to a method for aligning the spectral borders of the HFR generated signals to the spectral borders of the envelope adjustment frequency table comprising: the search for the highest border in the envelope adjustment frequency table that does not exceed the fundamental bandwidth limits of the HFR generated signal of transposition factor T; and using the found highest border as the frequency limit of the HFR generated signal of transposition factor T.

An embodiment relates to a method for aligning the spectral borders of the limiter tool to the spectral borders of the HFR generated signals comprising: adding the frequency borders of the HFR generated signals to the table of borders used when creating the frequency band borders used by the limiter tool; and forcing the limiter to use the added frequency borders as constant borders and to adjust the remaining borders accordingly.

An embodiment relates to combined transposition of an audio signal comprising several integer transposition orders in a low resolution filter bank domain where the transposition operation is performed on time blocks of subband signals.

A further embodiment relates to combined transposition, where transposition orders greater than 2 are embedded in an order 2 transposition environment.

A further embodiment relates to combined transposition, where transposition orders greater than 3 are embedded in an order 3 transposition environment, whereas transposition orders lower than 4 are performed separately.

A further embodiment relates to combined transposition, where transposition orders (e.g. transposition orders greater than 2) are created by replication of previously calculated transposition orders (i.e. especially lower orders) including the core coded bandwidth. Every conceivable combination of available transposition orders and core bandwidth is possible without restrictions.

An embodiment relates to reduction of computational complexity due to the reduced number of analysis filter banks which are needed for transposition.

An embodiment relates to an apparatus for generating a bandwidth extended signal from an input audio signal, comprising: a patcher for patching an input audio signal to obtain a first patched signal and a second patched signal, the second patched signal having a different patch frequency compared to the first patched signal, wherein the first patched signal is generated using a first patching algorithm, and the second patched signal is generated using a second patching algorithm; and a combiner for combining the first patched signal and the second patched signal to obtain the bandwidth extended signal.

A further embodiment relates to this apparatus according, in which the first patching algorithm is a harmonic patching algorithm, and the second patching algorithm is a non-harmonic patching algorithm.

A further embodiment relates to a preceding apparatus, in which the first patching frequency is lower than the second patching frequency or vice versa.

A further embodiment relates to a preceding apparatus, in which the input signal comprises a patching information; and in which the patcher is configured for being controlled by the patching information extracted from the input signal to vary the first patching algorithm or the second patching algorithm in accordance with the patching information.

A further embodiment relates to a preceding apparatus, in which the patcher is operative to patch subsequent blocks of audio signal samples, and in which the patcher is configured to apply the first patching algorithm and the second patching algorithm to the same block of audio samples.

A further embodiment relates to a preceding apparatus, in which a patcher comprises, in arbitrary orders, a decimator controlled by a bandwidth extension factor, a filter bank, and a stretcher for a filter bank subband signal.

A further embodiment relates to a preceding apparatus, in which the stretcher comprises a block extractor for extracting a number of overlapping blocks in accordance with an extraction advance value; a phase adjuster or windower for adjusting subband sampling values in each block based on a window function or a phase correction; and an overlap/adder for performing an overlap-add-processing of windowed and phase adjusted blocks using an overlap advance value greater than the extraction advance value.

A further embodiment relates to an apparatus for bandwidth extending an audio signal comprising: a filter bank for filtering the audio signal to obtain downsampled subband signals; a plurality of different subband processors for processing different subband signals in different manners, the subband processors performing different subband signal time stretching operations using different stretching factors; and a merger for merging processed subbands output by the plurality of different subband processors to obtain a bandwidth extended audio signal.

A further embodiment relates to an apparatus for downsampling an audio signal, comprising: a modulator; an interpolator using an interpolation factor; a complex low-pass filter; and a decimator using a decimation factor, wherein the decimation factor is higher than the interpolation factor.

An embodiment relates to an apparatus for downsampling an audio signal, comprising: a first filter bank for generating a plurality of subband signals from the audio signal, wherein a sampling rate of the subband signal is smaller than a sampling rate of the audio signal; at least one synthesis filter bank followed by an analysis filter bank for performing a sample rate conversion, the synthesis filter bank having a number of channels different from a number of channels of the analysis filter bank; a time stretch processor for processing the sample rate converted signal; and a combiner for combining the time stretched signal and a low-band signal or a different time stretched signal.

A further embodiment relates to an apparatus for downsampling an audio signal by a non-integer downsampling factor, comprising: a digital filter; an interpolator having an interpolation factor; a poly-phase element having even and odd taps; and a decimator having a decimation factor being greater than the interpolation factor, the decimation factor and the interpolation factor being selected such that a ratio of the interpolation factor and the decimation factor is non-integer.

An embodiment relates to an apparatus for processing an audio signal, comprising: a core decoder having a synthesis transform size being smaller than a nominal transform size by a factor, so that an output signal is generated by the core decoder having a sampling rate smaller than a nominal sampling rate corresponding to the nominal transform size; and a post processor having one or more filter banks, one or more time stretchers and a merger, wherein a number of filter bank channels of the one or more filter banks is reduced compared to a number as determined by the nominal transform size.

A further embodiment relates to an apparatus for processing a low-band signal, comprising: a patch generator for generating multiple patches using the low-band audio signal; an envelope adjustor for adjusting an envelope of the signal using scale factors given for adjacent scale factor bands having scale factor band borders, wherein the patch generator is configured for performing the multiple patches, so that a border between the adjacent patches coincides with a border between adjacent scale factor bands in the frequency scale.

An embodiment relates to an apparatus for processing a low-band audio signal, comprising: a patch generator for generating multiple patches using the low band audio signal; and an envelope adjustment limiter for limiting envelope adjustment values for a signal by limiting in adjacent limiter bands having limiter band borders, wherein the patch generator is configured for performing the multiple patches so that a border between adjacent patches coincides with a border between adjacent limiter bands in a frequency scale.

The inventive processing is useful for enhancing audio codecs that rely on a bandwidth extension scheme. Especially, if an optimal perceptual quality at a given bitrate is highly important and, at the same time, processing power is a limited resource.

Most prominent applications are audio decoders, which are often implemented on hand-held devices and thus operate on a battery power supply.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

Clause 1. A further embodiment includes an apparatus for processing an input audio signal (2300), including:

a synthesis filterbank (2304) for synthesizing an audio intermediate signal (2306) from the input audio signal (2300), the input audio signal (2300) being represented by a plurality of first subband signals (2303) generated by an analysis filterbank (2302), wherein a number of filterbank channels (Ms) of the synthesis filterbank (2304) is smaller than a number of channels (M) of the analysis filterbank (2302); and a further analysis filterbank (2307) for generating a plurality of second subband signals (2308) from the audio intermediate signal (2306), wherein the further analysis filterbank (2307) has a number of channels (MA) being different from the number of channels of the synthesis filterbank (2304), so that a sampling rate of a subband signal of the plurality of second subband signals (2308) is different from a sampling rate of a first subband signal of the plurality of first subband signals (2303).

A further embodiment includes an apparatus as in clause 1, in which the synthesis filterbank (2304) is a real-valued filterbank.

A further embodiment includes an apparatus as in clause 1, in which the number of first subband signals of the plurality of first subband signals (2303) is greater than or equal to 24, and in which the number of filterbank channels of the synthesis filterbank (2304) is lower than or equal to 22.

A further embodiment includes an apparatus as in one of the immediately preceding three embodiments, in which the synthesis filterbank (2304) is configured for only processing a sub-group (2305) of all first subband signals (2303) of the plurality of first subband signals representing the full bandwidth input audio signal (2300), and in which the synthesis filterbank (2304) is configured for generating the audio intermediate signal (2306) as a band segment of the full bandwidth input audio signal (2300) modulated to the base band.

A further embodiment includes an apparatus as in one of the immediately preceding four embodiments, further including:

the analysis filterbank (2302) for receiving a time domain representation of the input audio signal (2300) and for analysing the time domain representation to obtain the plurality of first subband signals (2303), wherein a sub-group (2305) of the plurality of first subband signals (2303) is input into the synthesis filterbank (2304), and wherein the remaining subband signals of the plurality of first subband signals are not input into the synthesis filterbank (2304).

A further embodiment includes an apparatus as in one of the immediately preceding five embodiments, in which the analysis filterbank (2302) is a complex- valued filterbank, in which the synthesis filterbank (2304) comprises a real-value calculator for calculating real-valued subband signals from the first subband signals, wherein the real-valued subband signals calculated by the real-value calculator are further processed by the synthesis filterbank (2304) to obtain the audio intermediate signal (2306).

A further embodiment includes an apparatus as in one of the immediately preceding six embodiments, in which the further analysis filterbank (2307) is a complex- valued filterbank and is configured to generate the plurality of second subband signals (2308) as complex subband signals.

A further embodiment includes an apparatus as in one of the immediately preceding seven embodiments, in which the synthesis filterbank (2304), the further analysis filterbank (2307) or the analysis filterbank (2302) are configured to use sub-sampled versions of the same filterbank window.

A further embodiment includes an apparatus as in one of the immediately preceding eight embodiments, further comprising:

a subband signal processor (2309) for processing the plurality of second subbands (2308); and a further synthesis filterbank (2311) for filtering a plurality of processed subbands, wherein the further synthesis filterbank (2311), the synthesis filterbank (2304), the analysis filterbank (2302) or the further analysis filterbank (2307) are configured to use sub-sampled versions of the same filterbank window, or wherein the further synthesis filterbank (2311) is configured to apply a synthesis window, and wherein the further analysis filterbank (2307), the synthesis filterbank (2304) or the analysis filterbank (2302) are configured to apply a sub-sampled version of the synthesis window used by the further synthesis filterbank (2311).

A further embodiment includes an apparatus as in one of the immediately preceding nine embodiments, further including a subband processor (2309) for performing a non-linear processing operation per subband to obtain a plurality of processed subbands;

a high frequency reconstruction processor (1030) for adjusting an input signal, based on transmitted parameters (1040); and a further synthesis filterbank (2311, 1050) for combining the input audio signal (2300) and the plurality of processed subband signals, wherein the high frequency reconstruction processor (1030) is configured for processing an output of the further synthesis filterbank (1050, 2311) or for processing the plurality of processed subbands, before the plurality of processed subbands is input into the further synthesis filterbank (2311, 1050).

A further embodiment includes an apparatus as in one of the immediately preceding ten embodiments, wherein the further analysis filterbank (2307) or the synthesis filterbank (2304) has a prototype window function calculator for calculating a prototype window function by subsampling or interpolating using a stored window function for a filterbank having a different size using information on a number of channels for the further analysis filterbank (2307) or the synthesis filterbank (2304).

A further embodiment includes an apparatus as in one of the immediately preceding eleven embodiments, in which the synthesis filterbank (2304) is configured for setting to zero an input into a lowest and into a highest filterbank channel of the synthesis filterbank (2304).

A further embodiment includes an apparatus as in one of the immediately preceding twelve embodiments, being configured for performing a block based harmonic transposition, wherein the synthesis filterbank (2304) is a subsampled filterbank.

A further embodiment includes an apparatus as in one of the immediately preceding thirteen embodiments, further comprising a subband processor (2309) for processing the plurality of second subbands (2308), wherein the subband processor (2309, 1020*a*, 1020*b*) comprises, in arbitrary orders, a decimator controlled by a bandwidth extension factor, and a stretcher for a subband signal, wherein the stretcher comprises a block extractor (1800, 120*a*, 120*b*, 120*c*) for extracting a number of overlapping blocks in accordance with an extracting advance value; a phase adjuster (1806, 124*a*, 124*b*, 124*c*) or windower (1802, 126*a*, 126*b*, 126*c*) for adjusting subband sampling values in each block based on a window function or a phase correction; and an overlap-adder (1808, 130) for performing an overlap-add-processing of windowed and phase adjusted blocks using an overlap advance value greater than the extraction advance value.

A further embodiment includes an apparatus as in one of the immediately preceding fourteen embodiments, further including a subband processor (2309), wherein the subband processor (2309, 1020*a*, 1020*b*) comprises:

a plurality of different processing branches (110*a*, 110*b*, 110*c*) for different transposition factors to obtain a transpose signal, wherein each processing branch is configured for extracting (120*a*, 120*b*, 120*c*) blocks of subband samples;

an adder (128) for adding the transpose signals to obtain transpose blocks; and an overlap-adder (130) for overlap-adding time consecutive transpose blocks using a block advance value being greater than a block advance value used for extracting (120*a*, 120*b*, 120*c*) blocks in the plurality of different processing branches (110*a*, 110*b*, 110*c*).

A further embodiment includes an apparatus as in one of the immediately preceding fifteen embodiments, further including:

the analysis filterbank (2302), wherein the synthesis filterbank (2304) and the further analysis filterbank (2307) are configured to perform a sample rate conversion, a time stretch processor (100*a*, 100*b*, 100*c*) for processing the sample rate converted signal; and a combiner (2311, 605) for combining processed subband signals generated by the time stretch processor to obtain a processed time domain signal.

A further embodiment includes an apparatus as in one of the immediately preceding sixteen embodiments, in which the number of channels of the further analysis filterbank (2307) is greater than the number of channels of the synthesis filterbank (2304).

A further embodiment includes an apparatus for processing an input audio signal (2300), comprising:

an analysis filterbank (2302) having a number (M) of analysis filterbank channels, wherein the analysis filterbank (2302) is configured for filtering the input audio signal (2300) to obtain a plurality of first subband signals (2303); and a synthesis filterbank (2304) for synthesizing an audio intermediate signal (2306) using a group (2305) of first subband signals (2303), where the group comprises a smaller number of subband signals than the number of filterbank channels of the analysis filterbank (2302), wherein the intermediate audio signal (2306) is sub-sampled representation of a bandwidth portion of the input audio signal (2300).

A further embodiment includes an apparatus as in the immediately preceding embodiment, in which the analysis filterbank (2302) is critically sampled complex QMF filterbank, and in which the synthesis filterbank (2304) is a critically sampled real-valued QMF filterbank.

A further embodiment includes a method of processing an input audio signal (2300), including:

synthesis filtering using a synthesis filterbank (2304) for synthesizing an audio intermediate signal (2306) from the input audio signal (2300), the input audio signal (2300) being represented by a plurality of first subband signals (2303) generated by an analysis filterbank (2302), wherein a number of filterbank channels (Ms) of the synthesis filterbank (2304) is smaller than a number of channels (M) of the analysis filterbank (2302); and analysis filtering using a further analysis filterbank (2307) for generating a plurality of second subband signals (2308) from the audio intermediate signal (2306), wherein the further analysis filterbank (2307) has a number of channels (MA) being different from the number of channels of the synthesis filterbank (2304), so that a sampling rate of a subband signal of the plurality of second subband signals (2308) is different from a sampling rate of a first subband signal of the plurality of first subband signals (2303).

A further embodiment includes a method for processing an input audio signal (2300), including:

analysis filtering using an analysis filterbank (2302) having a number (M) of analysis filterbank channels, wherein the analysis filterbank (2302) is configured for filtering the input audio signal (2300) to obtain a plurality of first subband signals (2303); and synthesis filtering using a synthesis filterbank (2304) for synthesizing an audio intermediate signal (2306) using a group (2305) of first subband signals (2303), where the group comprises a smaller number of subband signals than the number of filterbank channels of the analysis filterbank (2302), wherein the intermediate audio signal (2306) is sub-sampled representation of a bandwidth portion of the input audio signal (2300).

A further embodiment includes a computer program having a program code for performing, when running on a computer, a method in accordance with of the two immediately preceding embodiments.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Literature

[1] M. Dietz, L. Liljeryd, K. Kjörling and O. Kunz, "Spectral Band Replication, a novel approach in audio coding," in 112th AES Convention, Munich, May 2002.

[2] S. Meltzer, R. Böhm and F. Henn, "SBR enhanced audio codecs for digital broadcasting such as "Digital Radio Mondiale" (DRM)," in 112th AES Convention, Munich, May 2002.

[3] T. Ziegler, A. Ehret, P. Ekstrand and M. Lutzky, "Enhancing mp3 with SBR: Features and Capabilities of the new mp3PRO Algorithm," in 112th AES Convention, Munich, May 2002.

[4] International Standard ISO/IEC 14496-3:2001/FPDAM 1, "Bandwidth Extension," ISO/IEC, 2002. Speech bandwidth extension method and apparatus Vasu Iyengar et al

[5] E. Larsen, R. M. Aarts, and M. Danessis. Efficient high-frequency bandwidth extension of music and speech. In AES 112th Convention, Munich, Germany, May 2002.

[6] R. M. Aarts, E. Larsen, and O. Ouweltjes. A unified approach to low- and high frequency bandwidth extension. In AES 115th Convention, New York, USA, October 2003.

[7] K. Käyhkö. A Robust Wideband Enhancement for Narrowband Speech Signal. Research Report, Helsinki University of Technology, Laboratory of Acoustics and Audio Signal Processing, 2001.

[8] E. Larsen and R. M. Aarts. Audio Bandwidth Extension—Application to psychoacoustics, Signal Processing and Loudspeaker Design. John Wiley & Sons, Ltd, 2004.

[9] E. Larsen, R. M. Aarts, and M. Danessis. Efficient high-frequency bandwidth extension of music and speech. In AES 112th Convention, Munich, Germany, May 2002.

[10] J. Makhoul. Spectral Analysis of Speech by Linear Prediction. IEEE Transactions on Audio and Electroacoustics, AU-21(3), June 1973.

[11] U.S. patent application Ser. No. 08/951,029, Ohmori, et al. Audio band width extending system and method

[12] U.S. Pat. No. 6,895,375, Malah, D & Cox, R. V.: System for bandwidth extension of Narrow-band speech

[13] Frederik Nagel, Sascha Disch, "A harmonic bandwidth extension method for audio codecs," ICASSP International Conference on Acoustics, Speech and Signal Processing, IEEE CNF, Taipei, Taiwan, April 2009

[14] Frederik Nagel, Sascha Disch, Nikolaus Rettelbach, "A phase vocoder driven bandwidth extension method with novel transient handling for audio codecs," 126th AES Convention, Munich, Germany, May 2009

[15] M. Puckette. Phase-locked Vocoder. IEEE ASSP Conference on Applications of Signal Processing to Audio and Acoustics, Mohonk 1995.", Röbel, A.: Transient detection and preservation in the phase vocoder; citeseer.ist.psu.edu/679246.html

[16] Laroche L., Dolson M.: "Improved phase vocoder timescale modification of audio", IEEE Trans. Speech and Audio Processing, vol. 7, no. 3, pp. 323--332,

[17] U.S. Pat. No. 6,549,884 Laroche, J. & Dolson, M.: Phase-vocoder pitch-shifting

[18] Herre, J.; Faller, C.; Ertel, C.; Hilpert, J.; Hölzer, A.; Spenger, C, "MP3 Surround: Efficient and Compatible Coding of Multi-Channel Audio," 116th Conv. Aud. Eng. Soc., May 2004

[19] Neuendorf, Max; Gournay, Philippe; Multrus, Markus; Lecomte, Jérémie; Bessette, Bruno; Geiger, Ralf; Bayer, Stefan; Fuchs, Guillaume; Hilpert, Johannes; Rettelbach, Nikolaus; Salami, Redwan; Schuller, Gerald; Lefebvre, Roch; Grill, Bernhard: Unified Speech and Audio Coding Scheme for High Quality at Lowbitrates, ICASSP 2009, April 19-24, 2009, Taipei, Taiwan

[20] Bayer, Stefan; Bessette, Bruno; Fuchs, Guillaume; Geiger, Ralf; Gournay, Philippe; Grill, Bernhard; Hilpert, Johannes; Lecomte, Jérémie; Lefebvre, Roch; Multrus, Markus; Nagel, Frederik; Neuendorf, Max; Rettelbach, Nikolaus; Robilliard, Julien; Salami, Redwan; Schuller, Gerald: A Novel Scheme for Low Bitrate Unified Speech and Audio Coding, 126th AES Convention, May 7, 2009, München

What is claimed is:

1. Apparatus for resampling an audio signal, comprising a first filter bank for generating a plurality of subband signals from the audio signal, wherein a sampling rate of the subband signals is smaller than a sampling rate of the audio signal;

at least one synthesis filter bank followed by an analysis filter bank for performing a sample rate conversion to obtain a sample rate converted signal, the synthesis filter bank having a number of channels different from a number of channels of the analysis filter bank, wherein the at least one synthesis filter bank has a synthesis filter bank output, wherein the analysis filter bank has an analysis filter bank input, and wherein the synthesis filter bank output is connected to the analysis filter bank input;

a time stretch processor for processing the sample rate converted signal to obtain a time stretched signal; and a combiner for combining the time stretched signal and a low-band signal or a different time stretched signal.

2. Apparatus of claim 1, wherein the audio signal is a core decoded audio signal, wherein the first filter bank is an M-band analysis filter bank, and wherein the at least one synthesis filter bank is a subsampled synthesis filter bank having a decreased number of subbands.

3. Apparatus of claim 1, wherein the time stretch processor comprises a block extractor, is configured for performing a non-linear processing and a windowing, and comprises an overlap/add unit.

4. Apparatus of claim 1, wherein the first filter bank has 32 bands, wherein a sampling rate of the subband signals is 1/32 of a sampling rate of the audio signal, wherein the at least one synthesis filter bank has $Q_2$ bands, $Q_2$ being an integer, wherein the analysis filter bank has $2Q_2$ bands, so that a sampling rate of subband signals output by the analysis filter bank is 1/64 of the sampling rate of the audio signal, and wherein the time stretch processor is configured to perform a factor 2 stretch, so that the time stretched signal has a sampling rate equal to 1/32 of the sampling rate of the audio signal.

5. Apparatus of claim 1, wherein the first filter bank, the at least one synthesis filter bank, and the analysis filter bank are QMF filter banks.

6. Method for resampling an audio signal, comprising:

generating, using a first filter bank, a plurality of subband signals from the audio signal, wherein a sampling rate of the subband signals is smaller than a sampling rate of the audio signal;

performing a sample rate conversion using at least one synthesis filter bank followed by an analysis filter bank to obtain a sample rate converted signal, the at least one synthesis filter bank having a number of channels different from a number of channels of the analysis filter bank, wherein the at least one synthesis filter bank has a synthesis filter bank output, wherein the analysis filter bank has an analysis filter bank input, and wherein a signal at the synthesis filter bank output is fed into to the analysis filter bank input;

processing, using a time stretch processor, the sample rate converted signal to obtain a time stretched signal; and combining the time stretched signal and a low-band signal or a different time stretched signal.

7. Non-transitory storage medium having stored thereon a computer program for performing, when running on a computer, a method for resampling an audio signal, the method comprising:

generating, using a first filter bank, a plurality of subband signals from the audio signal, wherein a sampling rate of the subband signals is smaller than a sampling rate of the audio signal;

performing a sample rate conversion using at least one synthesis filter bank followed by an analysis filter bank to obtain a sample rate converted signal, the at least one synthesis filter bank having a number of channels different from a number of channels of the analysis filter bank, wherein the at least one synthesis filter bank has a synthesis filter bank output, wherein the analysis filter bank has an analysis filter bank input, and wherein a signal at the synthesis filter bank output is fed into to the analysis filter bank input;

processing, using a time stretch processor, the sample rate converted signal to obtain a time stretched signal; and combining the time stretched signal and a low-band signal or a different time stretched signal.

* * * * *